United States Patent
Watanabe et al.

(10) Patent No.: US 8,431,274 B2
(45) Date of Patent: Apr. 30, 2013

(54) SOLID OXIDE FUEL CELL DEVICE

(75) Inventors: Naoki Watanabe, Kitakyushu (JP);
Yousuke Akagi, Kitakyushu (JP);
Shuichiro Saigan, Kitakyushu (JP);
Nobuo Isaka, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 88 days.

(21) Appl. No.: 13/262,020

(22) PCT Filed: Mar. 31, 2010

(86) PCT No.: PCT/JP2010/055907
§ 371 (c)(1),
(2), (4) Date: Sep. 29, 2011

(87) PCT Pub. No.: WO2010/114040
PCT Pub. Date: Oct. 7, 2010

(65) Prior Publication Data
US 2012/0015262 A1   Jan. 19, 2012

(30) Foreign Application Priority Data

Mar. 31, 2009   (JP) .................................. 2009-087414

(51) Int. Cl.
*H01M 8/06* (2006.01)
*H01M 8/18* (2006.01)
*H01M 8/04* (2006.01)

(52) U.S. Cl.
USPC ........... 429/412; 429/423; 429/429; 429/442; 429/433

(58) Field of Classification Search .................. 429/412, 429/423, 429, 442, 433
See application file for complete search history.

(56) References Cited

U.S. PATENT DOCUMENTS

| 2002/0059753 A1 | 5/2002 | Ichikawa |
| 2009/0291335 A1 | 11/2009 | Anzai |

FOREIGN PATENT DOCUMENTS

| EP | 1207133 A2 | 5/2002 |
| EP | 1840997 A1 | 10/2007 |
| JP | 2003-095611 A | 4/2003 |
| JP | 2004-319420 A | 11/2004 |
| JP | 2004-338975 A | 12/2004 |
| JP | 2006-086016 A | 3/2006 |
| JP | 2006-190605 A | 7/2006 |
| JP | 2006-269196 A | 10/2006 |
| JP | 2007-311072 A | 11/2007 |
| JP | 2008-243597 A | 10/2008 |
| WO | WO 2007/137068 A1 | 11/2007 |

OTHER PUBLICATIONS

Written Opinion of the International Searching Authority for International Application No. PCT/JP2010/055907, dated Jul. 20, 2010, 7 pages.

(Continued)

*Primary Examiner* — Helen O Conley
(74) *Attorney, Agent, or Firm* — Brinks Hofer Gilson & Lione

(57) ABSTRACT

The present invention comprises fuel cells 84 disposed within a fuel cell module 2; a reformer 20, a reformer temperature sensor 148 for detecting the temperature of the reformer; and a control section 110 for controlling the operation of a fuel cell module. When a restart of operation is executed in a state whereby stopping of the operation of the fuel cell module is being executed, the normal startup POX is skipped and restart by the ATR is executed, at least within a high temperature region within the POX temperature band, even if the reforming state temperature (Tr, Ts) is within the normal startup POX temperature band W2.

16 Claims, 23 Drawing Sheets

OTHER PUBLICATIONS

International Preliminary Report on Patentability for International Application No. PCT/JP2010/055907, dated Nov. 15, 2011, 8 pages.

International Search Report for International Application No. PCT/JP2010/055907, dated Jul. 20, 2010, 2 pages.

Extended European Search Report for European Application No. 10758811.3, dated Dec. 18, 2012, 5 pages.

FIG.9(A)

| MODE | STATE | FUEL FLOW (L/min) | REFORMING AIR FLOW (L/min) | GENERATING AIR FLOW (L/min) | WATER FLOW (cc/min) | TRANSITION TEMPERATURE CONDITION (°C) REFORMER TEMP. Tr | TRANSITION TEMPERATURE CONDITION (°C) STACK TEMP. Ts |
|---|---|---|---|---|---|---|---|
| NORMAL STARTUP MODE 1 | ON IGNITION | 6.0 | 10.0 | 100.0 | 0.0 | — | — |
| | COMBUSTION OPERATION | 6.0 | 10.0 | 100.0 | 0.0 | ≧300°C | — |
| | NORMAL STARTUP POX | 5.0 | 18.0 | 100.0 | 0.0 | ≧600°C | ≧250°C |
| | NORMAL STARTUP ATR | 4.0 | 4.0 | 100.0 | 3.0 | ≧650°C | ≧600°C |
| | NORMAL STARTUP SR | 3.0 | 0.0 | 100.0 | 8.0 | ≧650°C | ≧700°C |
| RESTART MODE 1 | ON IGNITION | 5.5 | 10.0 | 100.0 | 0.0 | IGNITE IF ≧200°C, TRANSITION TO RESTART POX IMMEDIATELY AFTER IGNITION | — |
| | RESTART POX | 5.5 | 17.0 | 100.0 | 0.0 | ≧250°C | — |
| | RESTART ATR | 5.0 | 8.0 | 100.0 | 2.0 | ≧400°C | ≧400°C |
| | NORMAL STARTUP ATR | 4.0 | 4.0 | 100.0 | 3.0 | ≧600°C | ≧600°C |
| | NORMAL STARTUP SR | 3.0 | 0.0 | 100.0 | 8.0 | ≧650°C | ≧700°C |
| RESTART MODE 2 | ON IGNITION | 5.5 | 10.0 | 100.0 | 0.0 | IGNITE IF ≧200°C, TRANSITION TO RESTART ATR IMMEDIATELY AFTER IGNITION | — |
| | RESTART ATR | 5.5 | 12.0 | 100.0 | 1.0 | ≧400°C | ≧400°C |
| | NORMAL STARTUP ATR | 4.0 | 4.0 | 100.0 | 3.0 | ≧600°C | ≧600°C |
| | NORMAL STARTUP SR | 3.0 | 0.0 | 100.0 | 8.0 | ≧650°C | ≧700°C |

FIG.9(B)

| MODE | STATE | FUEL FLOW | REFORMING AIR FLOW | GENERATING AIR FLOW | WATER FLOW | TRANSITION TEMPERATURE CONDITION (°C) | |
|---|---|---|---|---|---|---|---|
| | | | | | | REFORMER TEMP. Tr | STACK TEMP. Ts |
| NORMAL STARTUP MODE 2 | ON IGNITION | 6.0 | 10.0 | 100.0 | 0.0 | — | — |
| | COMBUSTION OPERATION | 6.0 | 10.0 | 100.0 | 0.0 | ≥300°C | — |
| | NORMAL STARTUP POX | 6.0 | 18.0 | 100.0 | 0.0 | ≥600°C | ≥250°C |
| | NORMAL STARTUP ATR1 | 6.0 | 8.0 | 100.0 | 2.0 | ≥600°C | ≥400°C |
| | NORMAL STARTUP ATR2 | 4.0 | 4.0 | 100.0 | 3.0 | ≥650°C | ≥600°C |
| | NORMAL STARTUP SR | 3.0 | 0.0 | 100.0 | 8.0 | ≥650°C | ≥700°C |
| RESTART MODE 3 | ON IGNITION | 5.0 | 10.0 | 100.0 | 0.0 | IGNITE IF ≥200°C, TRANSITION TO RESTART ATR IMMEDIATELY AFTER IGNITION | — |
| | RESTART ATR | 5.5 | 12.0 | 100.0 | 1.0 | ≥250°C (TRANSITION TO NORMAL STARTUP ATR1 IF THERE IS A 30°C RISE AFTER TRANSITION TO RESTART ATR, EVEN IF ≤250°C) | — |
| | NORMAL STARTUP ATR1 | 5.0 | 8.0 | 100.0 | 2.0 | ≥400°C | ≥400°C |
| | NORMAL STARTUP ATR2 | 4.0 | 4.0 | 100.0 | 3.0 | ≥600°C | ≥600°C |
| | NORMAL STARTUP SR | 3.0 | 0.0 | 100.0 | 8.0 | ≥650°C | ≥700°C |
| RESTART MODE 4 | ON IGNITION | 5.0 | 8.0 | 100.0 | 0.0 | IGNITE IF ≥200°C, TRANSITION TO RESTART ATR IMMEDIATELY AFTER IGNITION | — |
| | RESTART ATR | 5.0 | 8.0 | 100.0 | 2.0 | ≥400°C | ≥400°C |
| | NORMAL STARTUP ATR2 | 4.0 | 4.0 | 100.0 | 3.0 | ≥600°C | ≥600°C |
| | NORMAL STARTUP SR | 3.0 | 0.0 | 100.0 | 8.0 | ≥650°C | ≥700°C |
| RESTART MODE 5 | ON IGNITION | 5.5 | 10.0 | 100.0 | 0.0 | IGNITE IF ≥250°C, TRANSITION TO RESTART ATR1 IMMEDIATELY AFTER IGNITION | — |
| | RESTART ATR1 | 5.5 | 12.0 | 100.0 | 1.0 | ≥250°C (TRANSITION TO RESTART ATR2 IF THERE IS A 30°C RISE AFTER TRANSITION TO RESTART ATR1, EVEN IF ≤250°C) | — |
| | RESTART ATR2 | 4.5 | 7.0 | 100.0 | 2.0 | ≥400°C | ≥400°C |
| | RESTART ATR3 | 3.5 | 2.0 | 100.0 | 3.0 | ≥600°C | ≥600°C |
| | NORMAL STARTUP SR | 3.0 | 0.0 | 100.0 | 8.0 | ≥650°C | ≥700°C |

SOLID OXIDE FUEL CELL DEVICE

TECHNICAL FIELD

The present invention relates to a solid oxide fuel cell device, and more particularly to a solid oxide fuel cell device for generating electricity by reacting fuel gas with oxidant gas.

BACKGROUND ART

Solid oxide fuel cell device ("SOFC" below) operate at relatively high temperatures, using an ion oxide conducting solid electrolyte as an electrolyte, with electrodes placed on both sides thereof, and with fuel gas supplied to one side thereof and an oxidizer (air, oxygen, or the like) supplied to the other side thereof.

In such SOFC, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. At the same time, thermal energy is transferred to the fuel, SOFC, oxidant, etc., and used to raise the temperature thereof.

In the conventional SOFC, when a microprocessor-based meter in a fuel gas supply system detects an anomaly during operation, or when anomalies due to earthquakes or the like arise, or when maintenance of auxiliary devices and the like are performed, it is necessary to temporarily halt operation. After such anomalies or other temporary factors have been resolved, or after maintenance is completed, prompt resumption of operation in as little time as possible is sought to ensure stable electrical generation.

In order to bring about prompt resumption of operation in fuel cell systems it has been proposed, for example in Patent Citation 1, that for the conventional SOFC that when a restart of the fuel cell system is requested during a predetermined control process, the control system, rather than executing the first startup processing routine after executing all of the fuel cell system stop processing routines, should first transition to the point in time at which conditions are the same as for the point in time at which the call for restart was made, and then execute the restart process.

On the other hand, in the conventional SOFC set forth in Patent Document 2, it is proposed that thermal efficiency can be raised by housing the fuel cell stack in a housing container, while heating can be accomplished by heating with higher than conventional temperature fuel gases through combustion of excess gas in the housing container, thereby obtaining thermal quantities required for steam reforming when in a low load operation. To speed up operation in the conventional SOFC, a heating operation to heat the fuel reformer is performed when the fuel reformer temperature is less than the partial oxidation reaction starting temperature upon startup; when the temperature of the fuel reformer rises to a temperature band equal to or greater than the partial oxidation reaction starting temperature and less than the temperature at which steam reforming can occur, the fuel reformer is heated by reaction heat from partial oxidation and combustion heat from the fuel gas, thereby performing a partial oxidation reforming reaction ("POX" below). Furthermore, when the temperature of the fuel cell rises to a temperature band at which steam reforming can occur, below the steady state temperature, reaction heat of the partial oxidation reaction, combustion heat from the fuel gas, and heat absorption by the steam reforming reaction are controlled to heat the fuel reformer, and an auto-thermal reforming reaction ("ATR" below) is performed in which partial oxidation reforming and steam reforming are used together, such that when the temperature of the fuel reformer reaches a steady state, the fuel reformer is heated by combustion heat from the fuel gas, and a steam reforming reaction ("SR" below) is performed. In other words, in the conventional SOFC of this type, startup was executed by reforming fuel in the sequence of POX, ATR, and SR as the temperature of fuel reformer rose at start up, thereby enabling stable and prompt start up.

PRIOR ART DOCUMENTS

Patent Documents

Patent Document 1: JP-A-2006-269196
Patent Document 2: JP-A-2004-319420

SUMMARY OF THE INVENTION

However, in the SOFC set forth in the above-described Patent Documents 1 and 2, residual heat residing in the fuel cells and stack when not operating has the effect that portions of the fuel cells and stack are frequently in a high temperature state during startup.

In this regard, the inventors of the present invention have discovered an important and new problem, which is that when the fuel cells or the stack are in such a high temperature state, particularly when restarting by POX, a heavy burden is placed on the cells.

More specifically, the inventors discovered the serious problem that even though from a control standpoint the reforming temperature may appear suitable for POX operation, when a restart occurs during stop operation control, a portion of the fuel cells or stack may be in a high-temperature state, so that when the POX reaction is executed on the assumption that the temperature of the fuel reformer is within a temperature band above the partial oxidation starting temperature and below the temperature at which steam reforming can occur, due to the fact that in POX there is an exothermal reaction accompanying partial oxidation upon the introduction of air, there may be an oxidizing effect imparted on the cells, or an extraordinarily high temperature state, leading to gradual degradation of the durability of the cells themselves or the electrical generating capability thereof. The present invention was undertaken to resolve this problem and to greatly reduce the time required for restart.

On the other hand, in the above-described Patent Documents 1 and 2, there is no disclosure or suggestion whatsoever of the concept whereby POX is skipped and ATR is executed even in a temperature band in which POX operation is executed during a normal startup as a way of further speeding up startup, while protecting cells at the time of startup.

It is therefore an object of the present invention to provide a solid oxide fuel cell device (SOFC) which, at the time of stopping, when there is a decline in temperature from a high temperature, skips the POX of a normal startup but executes an ATR-based startup to reduce the burden on cells and increase durability, and shortens a stable temperature recovery and startup time.

The above object is achieved according to the present invention by providing a solid oxide fuel cell device for generating electricity by causing an electro-chemical reaction of fuel gas and oxidant gas, comprising: solid oxide fuel cells disposed within a solid oxide fuel cell module; a reformer for reforming fuel gas and supplying the fuel gas to the fuel cells, by executing any one of the reforming reaction POX, wherein fuel gas is partial oxidation-reformed by causing a chemical reaction between a fuel gas and an oxidizing gas in a predetermined temperature band, the reforming reaction SR, wherein fuel gas is steam reformed by chemically reacting a fuel gas and steam, and the reforming reaction ATR, wherein fuel gas is auto-thermally reformed by the combined use of POX and SR; a reforming state temperature detector for detecting the reforming state temperature in order to change the reforming state induced by the reformer; and a controller for controlling the operation of the fuel cell module; wherein the controller has a startup control device for controlling the startup of the operation of the fuel cell module, and a stop control device for controlling the stopping of the fuel cell module; wherein the startup control device executes a combustion operation to rise the temperature of the reformer by the combustion heat of the fuel gas when after the fuel gas is ignited and caused to combust, the reforming state temperature detected by the reforming state temperature detector is lower than the POX starting temperature at which POX starts; the startup control device executes a normal startup POX to raise the temperature of the reformer when the reforming state temperature is equal to or greater than the POX starting temperature and within a POX temperature band below the temperature at which steam reforming is possible; the startup control device executes a normal startup ATR to raise the temperature of the reformer when the reforming state temperature is equal to or greater than the temperature at which steam reforming is possible, and is within the ATR temperature band below a predetermined steady state temperature; and the startup control device executes a normal startup SR to raise the temperature of the reformer when the reforming state temperature is equal to or greater than the predetermined steady-state temperature; wherein the startup control device further executes a restart control by the ATR, skipping the normal startup POX, if stop processing by the stop control device is executed in association with stopping of the fuel cell module from a high temperature state, and a restart of operation is executed when the reforming state temperature is within the POX temperature band.

According to the present invention thus constituted, when a restart has been implemented in the POX temperature band in a state whereby stop processing is being executed by the stop control device in association with stopping of the reformer from a high temperature state, the POX at normal startup is skipped, and the ATR is executed in which the residual heat remaining in the individual fuel cells or the reformer is actively utilized. As a result, it is possible to prevent the effects of oxidation on individual fuel cells which arise because the non-implementation of the POX during the normal startup results in a large residual heat, even though the temperature appears low, and to reduce the burden on cells caused by the imposition of unexpected high temperature states, and to improve cell durability. Also, by executing a restart control to take active advantage of the residual heat remaining in the fuel cells and reformer, startup time can be greatly reduced. Furthermore, when implementing a restart based on loss of flame after startup, the possibility that residual heat in fuel cell modules such as the individual fuel cells, the reformer, etc., can be utilized is low even when the reforming state temperature is within the normal startup POX temperature band, therefore damage to the individual fuel cells can be restrained by prohibiting restart control different from POX upon normal startup.

In the preferred embodiment of the preset invention, the startup control device executes the restart control by the POX when the reforming state temperature is less than a predetermined temperature within the normal startup POX temperature band, and executes the restart control by the ATR when the reforming state temperature is equal to or greater than a predetermined temperature within the POX temperature band.

According to the present invention thus constituted, under a predetermined temperature within the POX temperature band, oxidation is prevented and temperature recovery in fuel cell modules such as the reformer is efficiently brought about by the POX exothermic reaction through execution of POX, since it has no oxidizing effects, while temperature recovery can be achieved with easy control, stably, in an optimal state, and without inducing the reformer temperature drop associated with the supply of water, since ATR, which requires control of extremely minute amounts of water, is not used.

In the preferred embodiment of the present invention, at least when the reforming state temperature is within the POX temperature band, the startup control device executes the restart control by the ATR rather than the POX used in normal startup, and at least a portion of the ATR executed in the restart control differs from the ATR at the normal startup.

According to the present invention thus constituted, the drop in temperature in the reformer, etc. associated with supplying water can be restrained, and temperature recovery can be much more appropriately effected, by executing an ATR different from the ATR upon normal startup, which makes active use of residual heat remaining in the individual fuel cells or the reformer upon startup.

In the preferred embodiment of the present invention, the ATR executed by the restart control device increases the amount of fuel gas supplied compared to the ATR during the normal startup.

According to the present invention thus constituted, by executing restart control using ATR with a greater amount of fuel gas supplied than in normal startup ATR, temperature drops in the reformer, etc. can be restrained and temperature recovery speeded up, even with the supply of water at the relatively low temperature band, which results from executing ATR, in which the combustion temperature is kept high.

In the preferred embodiment of the present invention, the ATR executed in the restart control increases the amount of oxidant gas supplied compared to ATR during the normal startup.

According to the present invention thus constituted, by executing the restart control by the ATR with a greater amount of oxidant gas supplied than in normal startup ATR, exothermic reactions from partial oxidation reactions increase, and an even faster rise in reformer temperature and cell temperature can be effected.

In the preferred embodiment of the present invention, the ATR executed in the restart control decreases the amount of water supplied compared to ATR during the normal startup.

According to the present invention thus constituted, by executing the restart control by the ATR with a smaller amount of water supplied than in the normal startup ATR, temperature drops in the reformer, etc. can be restrained and a stable rise in temperature can be effected since residual heat is transferred even in a relatively low temperature band, enabling the ATR to be executed.

In the preferred embodiment of the present invention, the ATR executed in the restart control is changed to the normal startup ATR at the point when the reforming state temperature rises to or above a predetermined temperature.

According to the present invention thus constituted, in the ATR executed in the restart control, an active ATR is executed, whereby the ATR is executed with a reduced load on the reformer or the like, and there is a change to the normal startup ATR at the point when the desired rise in reforming state temperature is achieved, therefore a quick and stable temperature rise can be achieved without inducing temperature drops in the reformer or the like.

In the preferred embodiment of the present invention, the startup control device executes the restart control by the ATR maintaining a predetermined fixed amount of fuel gas supply, oxidant gas supply, and water supply without variation.

According to the present invention thus constituted, because the ATR restart is executed which maintains a predetermined fixed amount of fuel gas supply, oxidant gas supply, and water supply without variation, temperature recovery of the reformer and the like can be stably accomplished due to the prevention of factors which change the state of the reformer, even in low temperature, unstable temperature band.

In the preferred embodiment of the present invention, the startup control device executes the restart control by a first ATR in the normal startup POX temperature band and a second ATR in the normal startup ATR temperature band, and the first ATR executed in the restart control reduces the amount of water supplied compared to the second ATR.

According to the present invention thus constituted, by executing the first ATR with a small water supply amount for restart in the normal startup POX temperature band, and executing the second ATR in the normal startup ATR temperature band, ATR can be executed even in the relatively low temperature POX temperature band, thus enabling stable temperature recovery while restraining temperature drops in the reformer and the like, and utilization of residual heat.

In the preferred embodiment of the present invention, the ATR executed in the restart control is constituted so that the amount of oxidant gas supplied in the initial period is greater than the amount of oxidant gas supplied in the later period.

According to the present invention thus constituted, by increasing the air amount in the relatively low temperature region at the initial stage of restart, the partial oxidation reforming reaction becomes more prevalent than the steam reforming reaction, thus making it possible to stably raise the temperature of the fuel cell module while restraining temperature drops in the reformer.

In the preferred embodiment of the present invention, the solid oxide fuel cell device further comprises an oxidant gas heating device for heating the oxidant gas supplied from the oxidant gas supply device to the reformer, and the startup control device executes the restart control by the ATR setting the heating temperature at which the oxidant gas heating device heats the oxidant gas to be higher than the normal startup ATR.

According to the present invention thus constituted, by executing the restart by the ATR setting the heating temperature at which the oxidant gas heating device heats the oxidant gas to be higher than the normal startup ATR, temperature drops associated with supplying water in the restart ATR can be restrained, and an early temperature recovery can be achieved in a stable state.

In the preferred embodiment of the present invention, the solid oxide fuel cell device further comprises a water supply device for producing pure water and supplying the pure water to the reformer, and the water supply device has a water pipe for introducing water to the reformer and a warming device for keeping the water pipe warm.

According to the present invention thus constituted, because the temperature of the water supplied to the reformer from the water supply device water pipe during restart can be maintained at a high temperature by warming of the water pipe by the water supply device warming device, ATR-based restart can be reliably performed using ATR even in the relatively low temperature POX temperature band.

In the preferred embodiment of the present invention, the solid oxide fuel cell device further comprises a cell assembly support device for supporting the lower portion of a cell assembly having a plurality of individual fuel cells, and for forming an exhaust gas chamber into which exhaust gas produced by the combustion of fuel gas and oxidant gas is discharged, and the warming device restrains temperature drops of the water supplied to the reformer by disposing the water pipe so that the water pipe passes through the exhaust gas chamber.

According to the present invention thus constituted, by utilizing the heat of the exhaust gas in the exhaust gas chamber of the cell assembly support device, the temperature of the water supplied to the reformer from the water supply device water pipe at restart can be maintained at a high temperature, therefore drops in the temperature of the reformer or cells associated with the supply of water in the restart ATR can be restrained appropriately without the use of special heating means.

In the preferred embodiment of the present invention, the solid oxide fuel cell device further comprises a housing member for containing the cell assembly, and an exhaust gas conduit for communicating with the exhaust gas chamber is disposed on the pair of opposing sides forming the housing member, and the water pipe conduit is disposed on the other side thereof.

According to the present invention thus constituted, because the water pipe is separated from the exhaust gas conduit relative to the housing, heat exchange from the housing can only be done with water on the other side surface, therefore a high temperature can be maintained for the water supplied to the reformer from the water supply device water pipe upon restart. As a result, temperature drops in the reformer and the like associated with the supply of water in the restart ATR can be restrained.

The present invention is a solid oxide fuel cell device for generating electricity by causing an electro-chemical reaction of fuel gas and oxidant gas, comprising: solid oxide fuel cells disposed within a solid oxide fuel cell module; means for reforming fuel gas and supplying the fuel gas to the fuel cells, by executing any one of the reforming reaction POX in a predetermined temperature band, wherein fuel gas is partial oxidation-reformed by causing a chemical reaction between a fuel gas and an oxidizing gas, the reforming reaction SR, wherein fuel gas is steam reformed by chemically reacting a fuel gas and steam, and the reforming reaction ATR, wherein fuel gas is auto-thermally reformed by the combined use of POX and SR; means for detecting the reforming state temperature in order to change the reforming state induced by the reforming means; and means for controlling the operation of the fuel cell module; wherein the controlling means has means for controlling the startup of the operation of the fuel cell module, and means for controlling the stopping of the fuel cell module; wherein the startup control means executes a combustion operation to rise the temperature of the reformer by the combustion heat of the fuel gas when after the fuel gas is ignited and caused to combust, the reforming state temperature detected by the reforming state temperature detecting means is lower than the POX starting temperature at which POX starts; the startup control means executes a normal startup POX to raise the temperature of the reforming means when the reforming state temperature is equal to or greater than the POX starting temperature and within a POX temperature band below the temperature at which steam reforming is possible; the startup control means executes a normal startup ATR to raise the temperature of the reformer when the reforming state temperature is equal to or greater than the temperature at which steam reforming is possible, and is within the ATR temperature band below a predetermined steady state temperature; and the startup control means executes a normal startup SR to raise the temperature of the reforming means when the reforming state temperature is equal to or greater than the predetermined steady-state temperature; wherein the startup control means further executes a restart control by the ATR, skipping the normal startup POX, if stop processing by the stop control means is executed in association with stopping of the fuel cell module from a high temperature state, and a restart of operation is executed when the reforming state temperature is within the POX temperature band.

According to the solid oxide fuel cell device (SOFC) of the present invention, executing a restart which at the time of stopping, when there is a decline in temperature from a high temperature, skips the POX of a normal startup but executes an ATR-based restart, the burden on cells can be reduced, durability increased, and startup time during restart can be greatly shortened by operating to take active advantage of residual heat during restart.

BRIEF DESCRIPTION OF DRAWINGS

FIG. 9(A) is a data table showing fuel flow amount, reforming air flow amount, generating air flow amount, water flow amount, and reformer and stack transition temperature conditions in each of the states during normal startup and restart operations of a solid oxide fuel cell device (SOFC) according to an embodiment of the present invention;

FIG. 9(B) is a data table showing fuel flow amount, reforming air flow amount, generating air flow amount, water flow amount, and reformer and stack transition temperature conditions in each of the states during normal startup and restart operations of a solid oxide fuel cell device (SOFC) according to an embodiment of the present invention;

DETAILED DESCRIPTION OF THE PREFERRED EMBODIMENTS

Next, referring to the attached drawings, a solid oxide fuel cell device (SOFC) according to an embodiment of the present invention will be explained.

Figure 1:
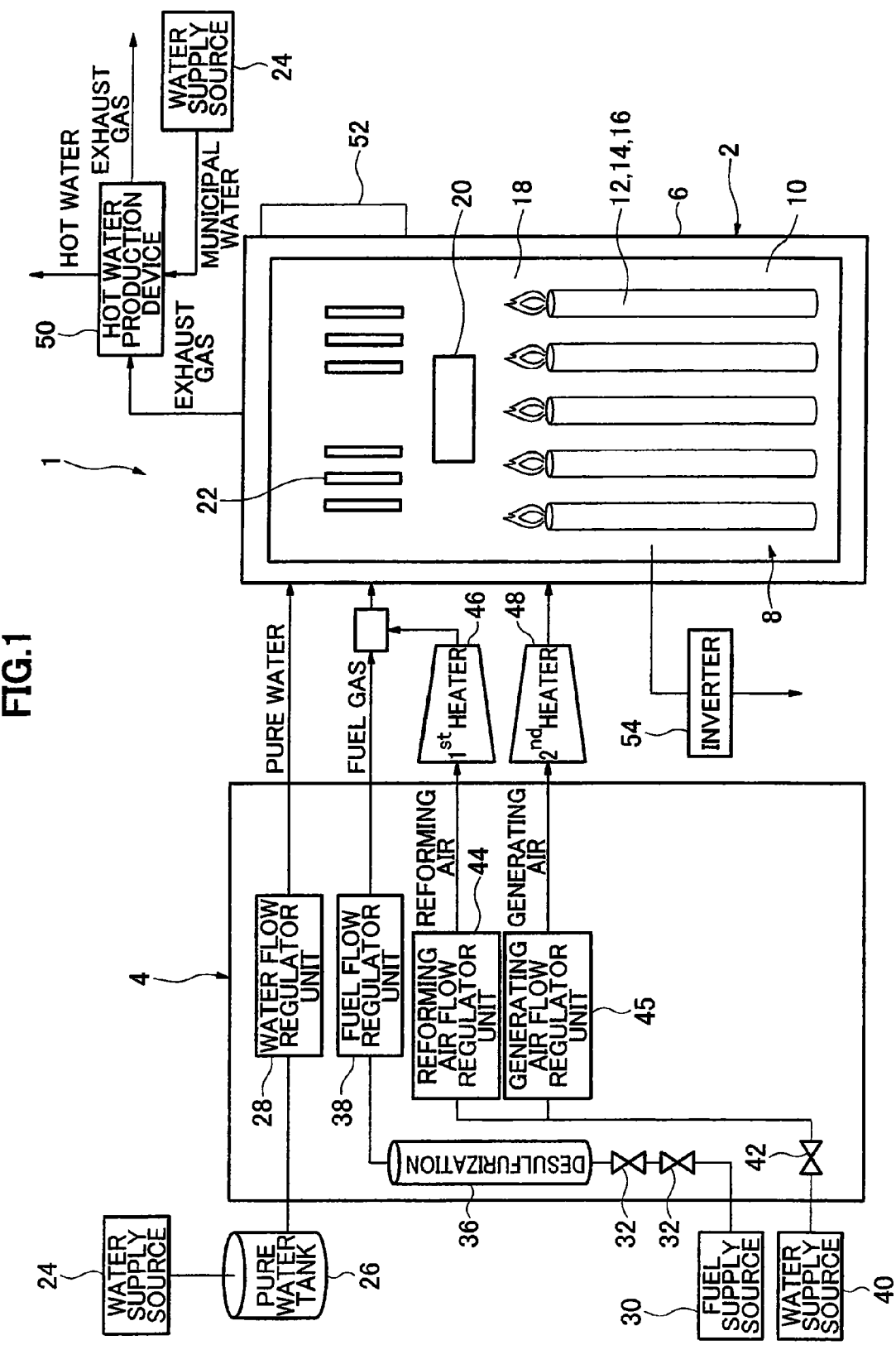
FIG. 1 is an overall schematic showing a solid oxide fuel cell device (SOFC) according to an embodiment of the present invention.

As shown in FIG. 1, a solid oxide fuel cell device (SOFC) according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
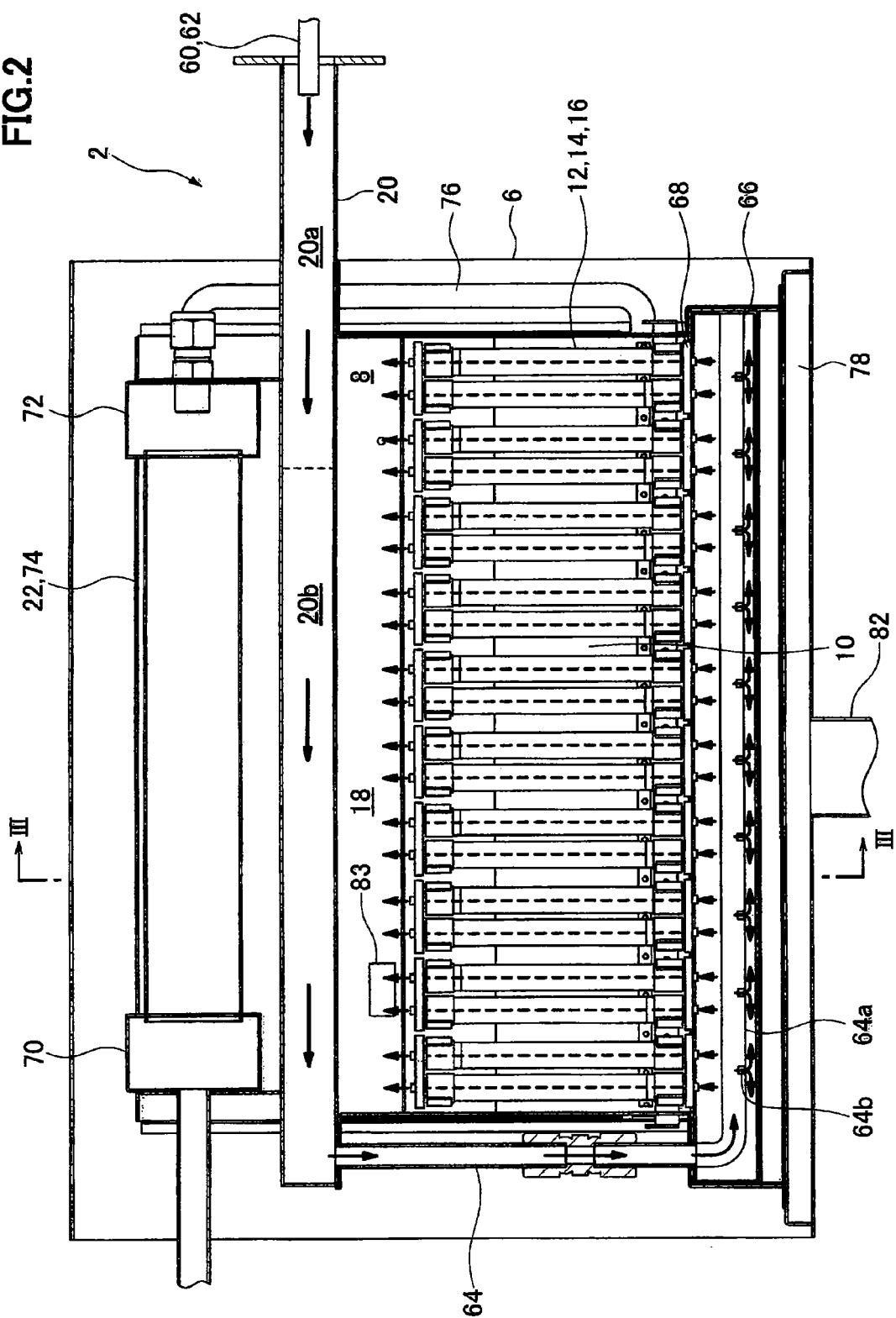
FIG. 2 is a front elevation sectional view showing a solid oxide fuel cell device (SOFC) fuel cell module according to an embodiment of the present invention.
Figure 3:
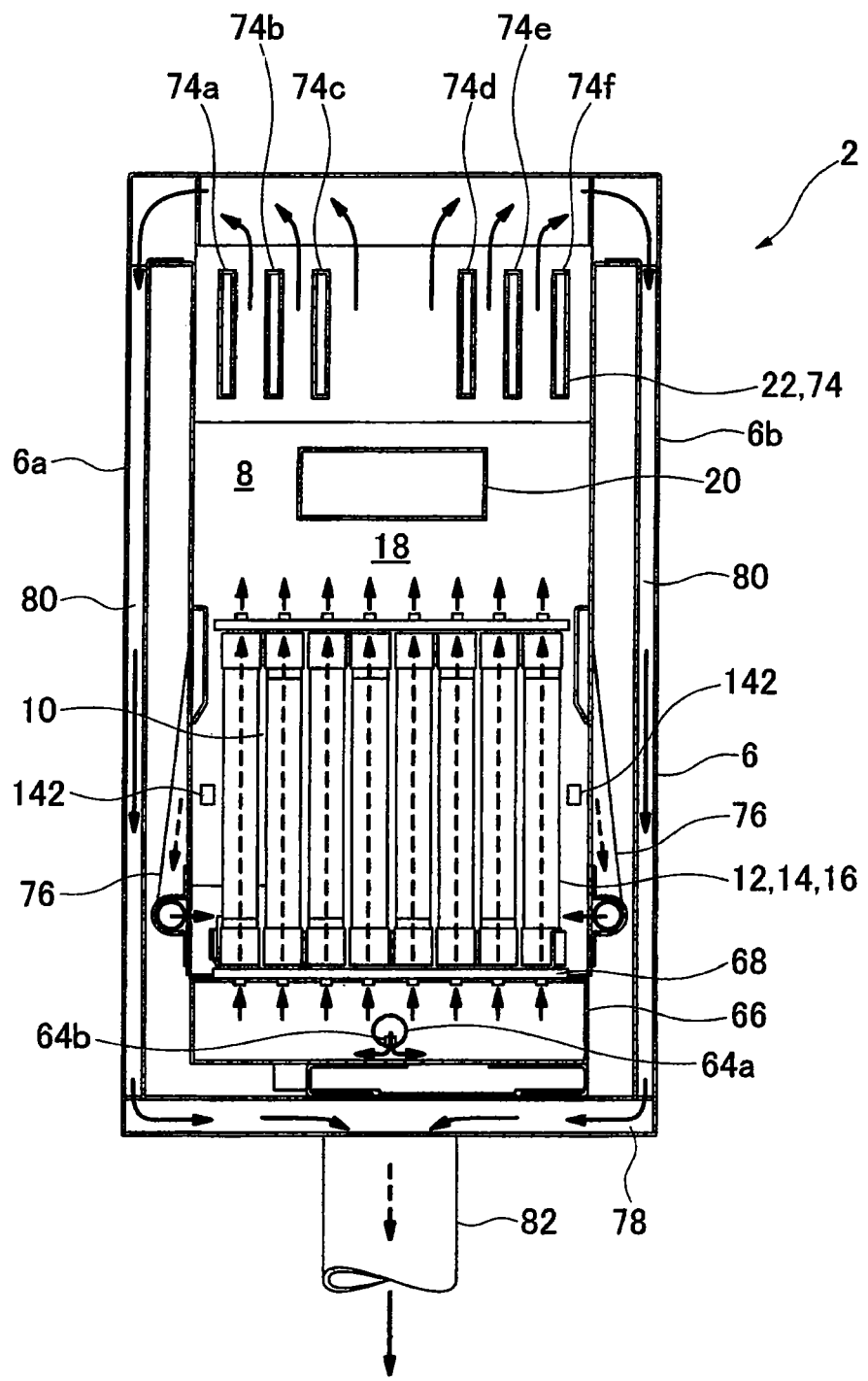
FIG. 3 is a sectional diagram along line III-III in FIG. 2.

The internal structure of the solid oxide fuel cell device (SOFC) according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
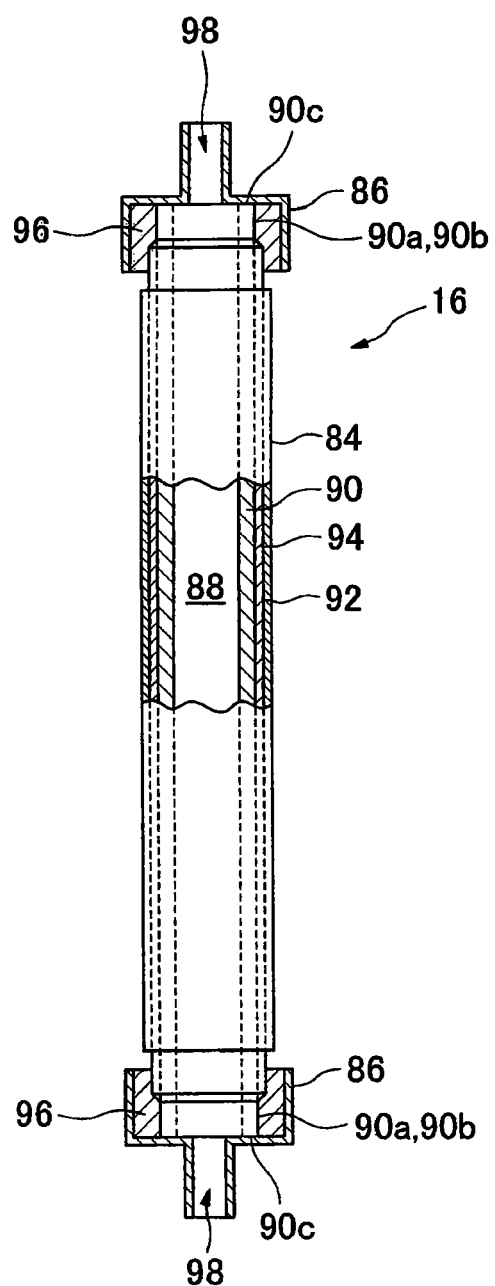
FIG. 4 is a partial section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
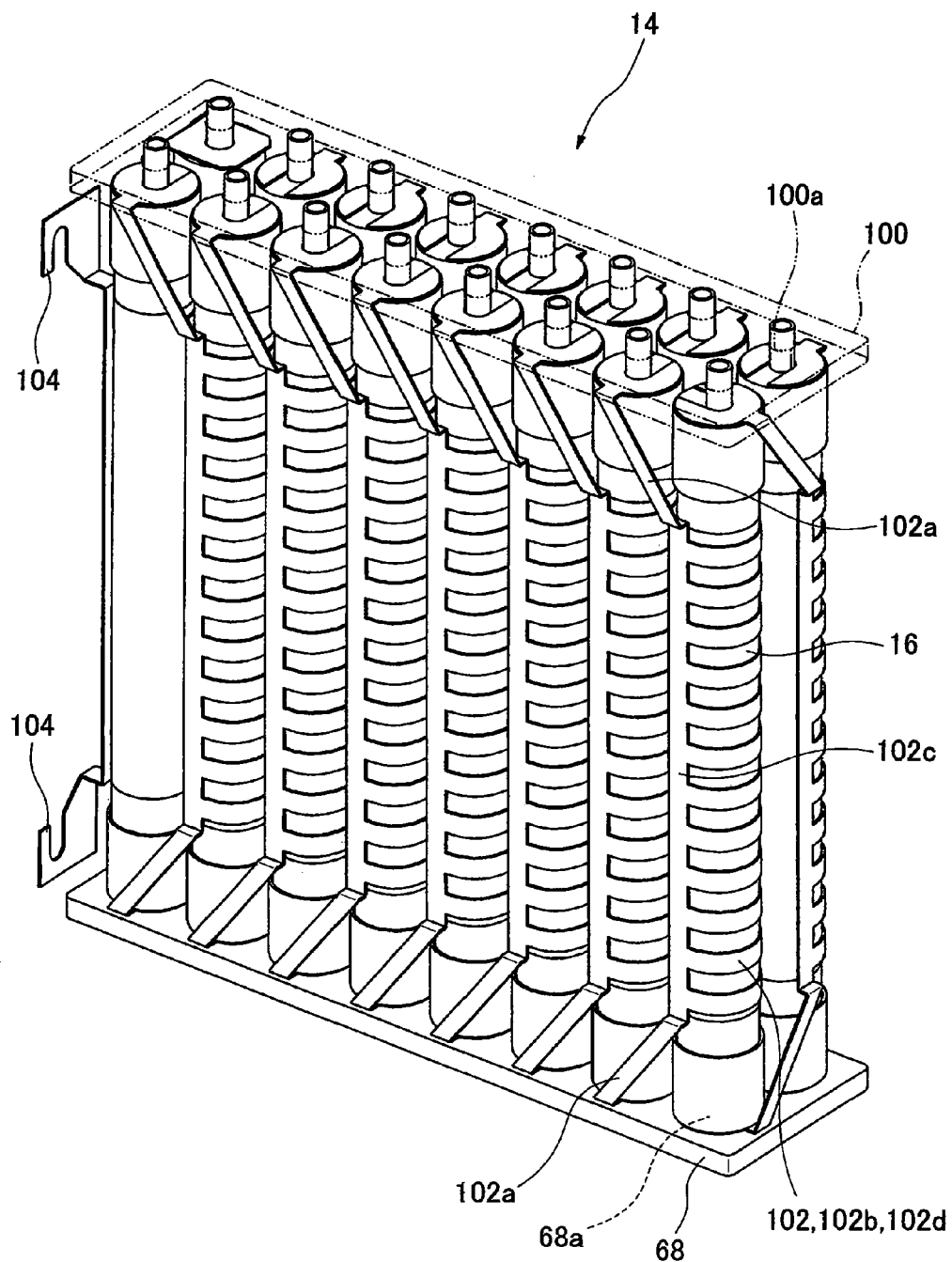
FIG. 5 is a perspective view showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell device (SOFC) according to the embodiment of the present invention will be explained.

Figure 6:
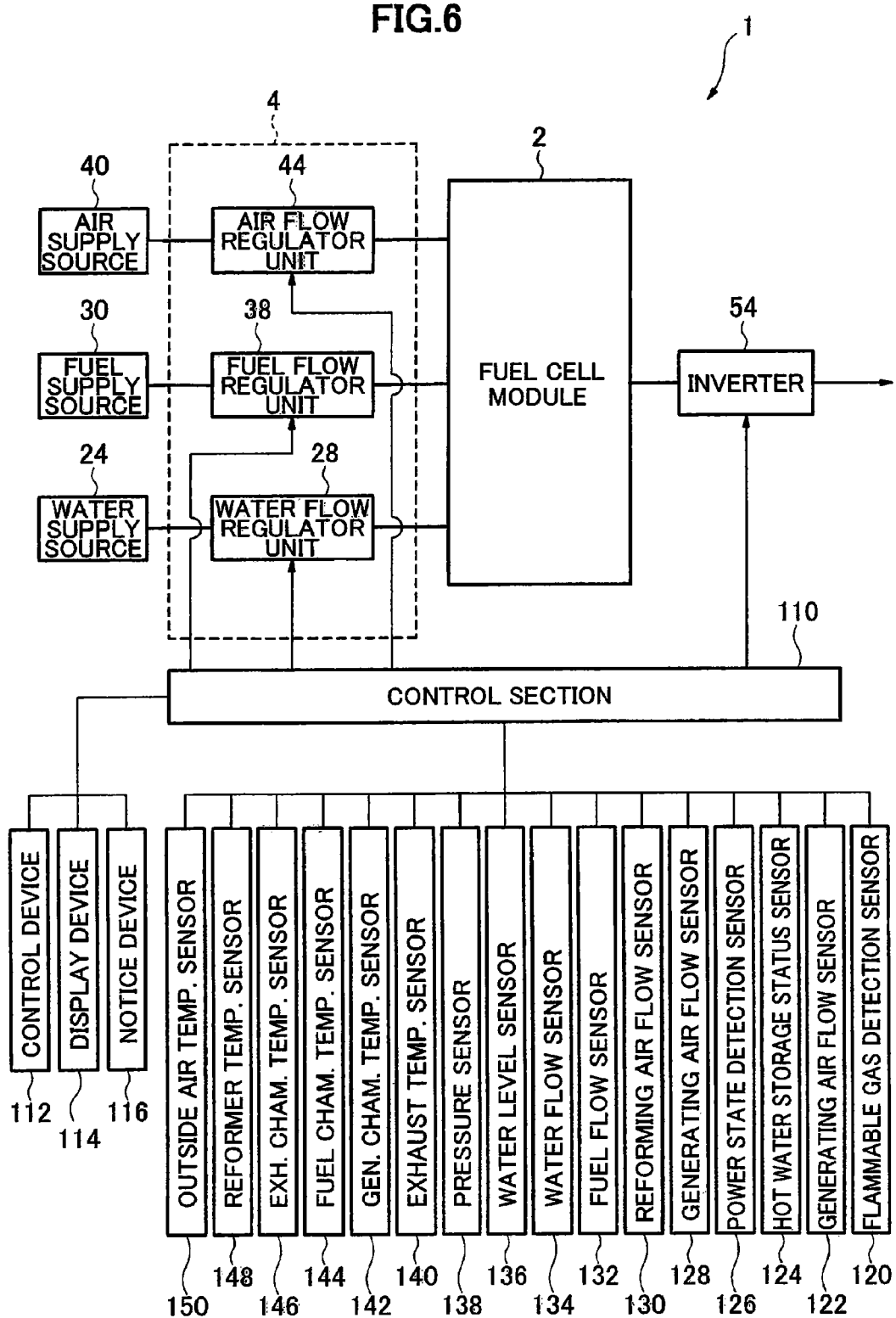
FIG. 6 is a block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell device (SOFC) is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
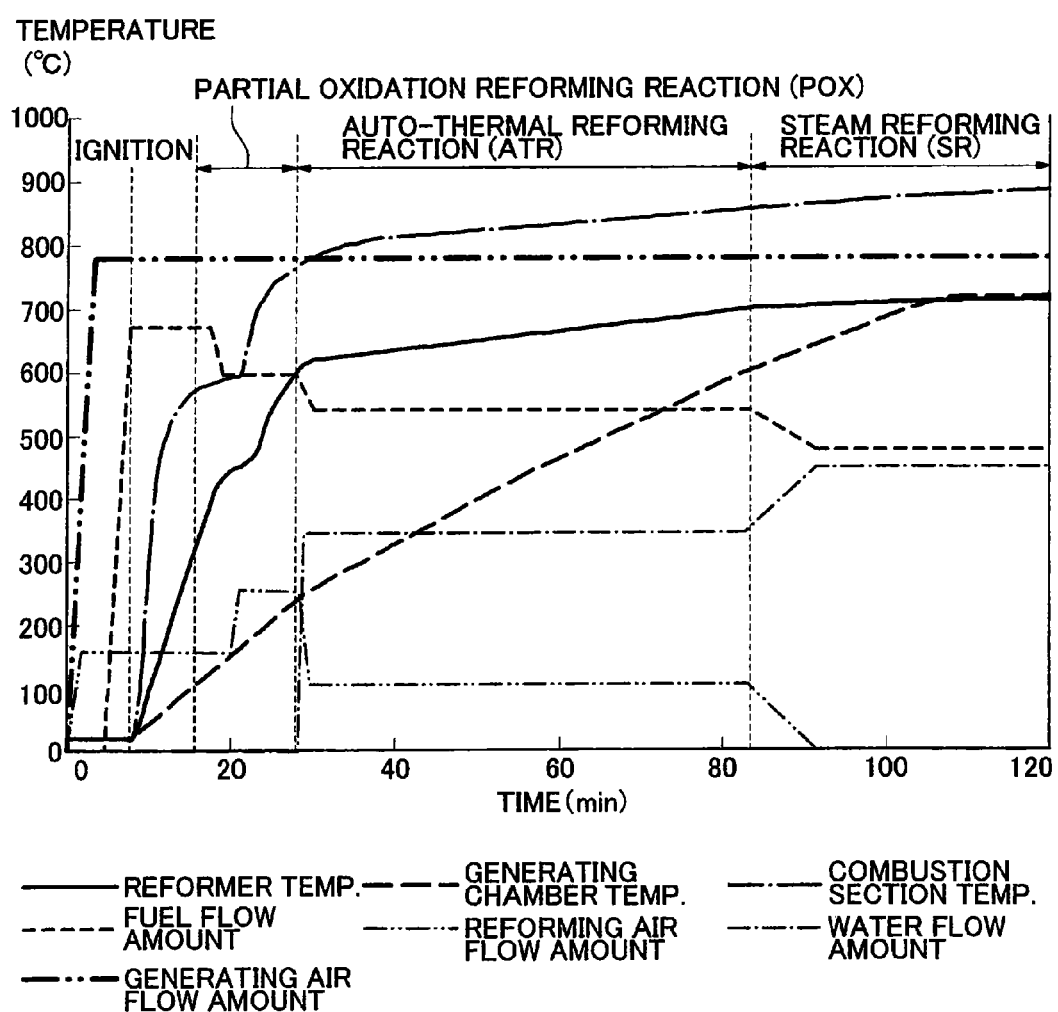
FIG. 7 is a timing chart showing the operation at the time of startup of a solid oxide fuel cell device (SOFC) according to an embodiment of the present invention.

Next, referring to FIG. 7, the operation of a solid oxide fuel cell device (SOFC) according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

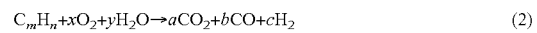
$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell device (SOFC) according to the embodiment of the present invention will be explained.

Figure 8:
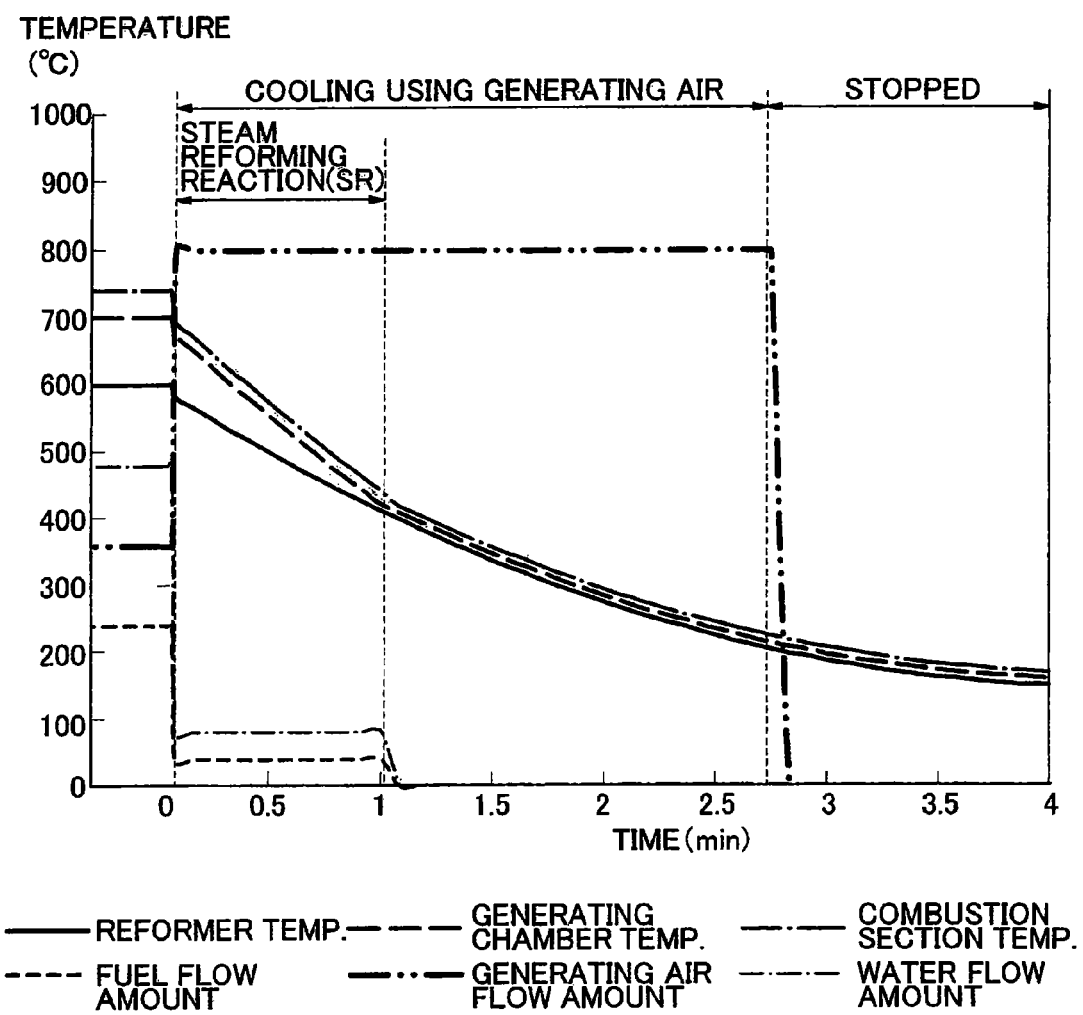
FIG. 8 is a timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9-11, the operation of a solid oxide fuel cell device (SOFC) according to the present embodiment at the time of restart will be explained. FIGS. 9(A) and 9(B) are data tables showing fuel flow amount, reforming air flow amount, generating air flow amount, water flow amount, and reformer and stack transition temperature conditions in each of the states during normal startup and restart operations of a solid oxide fuel cell device (SOFC) in the present embodiment.

First, as shown in FIGS. 9(A) and 9(B), the solid oxide fuel cell device (SOFC) according to the present embodiment discloses a control mode (the "Normal Startup Mode 1" below) executing the same as the operation at startup of the solid oxide fuel cell device (SOFC) according to the present embodiment shown in the above-described FIG. 7 as a normal startup operation, and a variant "Normal Startup Mode 2" which executes a normal startup operation based on a normal startup mode different from this normal startup mode 1.

The solid oxide fuel cell device (SOFC) of the present embodiment discloses 5 embodiments as restart control modes ("Restart Modes 1-5" below) for restarting when there is a request for startup operation in a state whereby a stop operation is being executed ("Restart") in the solid oxide fuel cell device (SOFC) according to the present embodiment shown in FIG. 8; these restart modes 1-5 are respectively disclosed as Examples 1-5 (discussed below in detail) of corresponding restart control flows, and are executed according to the corresponding flows.

Details of each of the normal modes and each of the restart modes in FIGS. 9(A) and 9(B) are discussed below.

Next, referring to FIG. 10, specifics of a first example of a restart control flow in a solid oxide fuel cell device (SOFC) according to the present embodiment will be explained. FIG. 10 is a flowchart showing a first example of restart control flow (restart control flow 1) for restarting a solid oxide fuel cell device (SOFC) according to an embodiment of the present invention. In FIG. 10, an S denotes the various steps.

First, in S1, a determination is made as to whether the fuel cell module 2 operation is stopped; if stopped, the system proceeds to S2, and a determination is made as to whether a restart is requested.

In S2, if it was determined that a restart is requested, the system advances to S3; after measuring the temperature of the reformer 20 (the "reformer temperature Tr") using the reformer temperature sensor 148 which forms part of a reforming state temperature detection means for detecting the reforming state temperature in order to change the reforming state of the reformer 20, the system advances to S4 and measures the stack temperature Ts, which is the temperature in the vicinity of the fuel cell stack 14 (i.e., the individual fuel cells 84 themselves) using a generating chamber temperature sensor 142, which forms part of the reforming state temperature detection means for detecting the reforming state temperature in order to change the reforming state of the reformer 20.

Next, advancing to S5, a determination is made as to whether the reformer temperature Tr is equal to or greater than 400° C.

In S5, if it is determined that the reformer temperature Tr is not equal to or greater than 400° C., the system advances to S6 and determines if the reformer temperature Tr is less than 200° C.

In S6, if it is determined that the reformer temperature Tr is not less than 200° C., i.e., that the reformer temperature Tr is equal to or greater than 200° C. and less than 400° C., the system advances to S7, and a determination is made as to whether the reformer temperature Tr is equal to or greater than 200° C. and less than 250° C.

In S7, if it is determined that the reformer temperature Tr is not equal to or greater than 200° C. and less 250° C., i.e., that the reformer temperature Tr is equal to or greater than 250° C. and less than 400° C., the system advances to S8, and a "Restart ATR" according to "Restart Mode 1" in the data table shown in FIG. 9(A) is executed.

On the other hand, if it is determined in S7 that the reformer temperature Tr is equal to or greater than 200° C. and less 250° C., the system advances to S9, and a "Restart POX" according to "Restart Mode 1" in the data table shown in FIG. 9(A) is executed.

Also, if it is determined in S5 that the reformer temperature Tr is equal to or greater than 400° C., the system advances to S10 and determines if the reformer temperature Tr is equal to or greater than 600° C.

If it is determined in S10 that the reformer temperature Tr is not equal to or greater than 600° C., i.e., that the reformer temperature Tr is equal to or greater than 400° C. and less than 600° C., the system advances to S11, and a "Normal Startup ATR" is executed according to the "Restart Mode 1" in the data table shown in FIG. 9(A).

On the other hand, if it is determined in S10 that the reformer temperature Tr is equal to or greater than 600° C., the system advances to S12, and determines whether the stack temperature Ts measured by the generating chamber temperature sensor 142 is equal to or greater than 600° C.

If it is determined in S12 that the stack temperature Ts is equal to or greater than 600° C., the system advances to S13, and "Normal Startup SR" is executed according to the "Restart Mode" in the data table shown in FIG. 9(A). On the other hand, if it is determined in S12 that the stack temperature Ts is not equal to or greater than 600° C., i.e., that the stack temperature Ts is less than 600° C. notwithstanding that the reformer temperature Tr is equal to or greater than 600° C., the system advances to S11, and a "Normal Startup ATR" is executed according to the "Restart Mode 1" in the data table shown in FIG. 9(A).

Next, a determination is made in S1 as to whether the fuel cell module 2 operation is stopped; if not stopped, the system advances to S14 and determines whether there is a request for restart based on loss of flame during startup.

If it is determined in S14 that there is a request for restart based on loss of flame, or it is determined in S6 that the reformer temperature Tr is less than 200° C., then even though the temperature sensor value appears high, this does not mean the entire fuel cell module is in a long-duration high temperature state, therefore given that heat is not uniformly accumulated, this is not a situation in which a residual heat-based restart control can be executed, so the system advances to S15 and restart is executed according to the "Normal Startup Mode 1" in the data table shown in FIG. 9(A).

Figure 10:
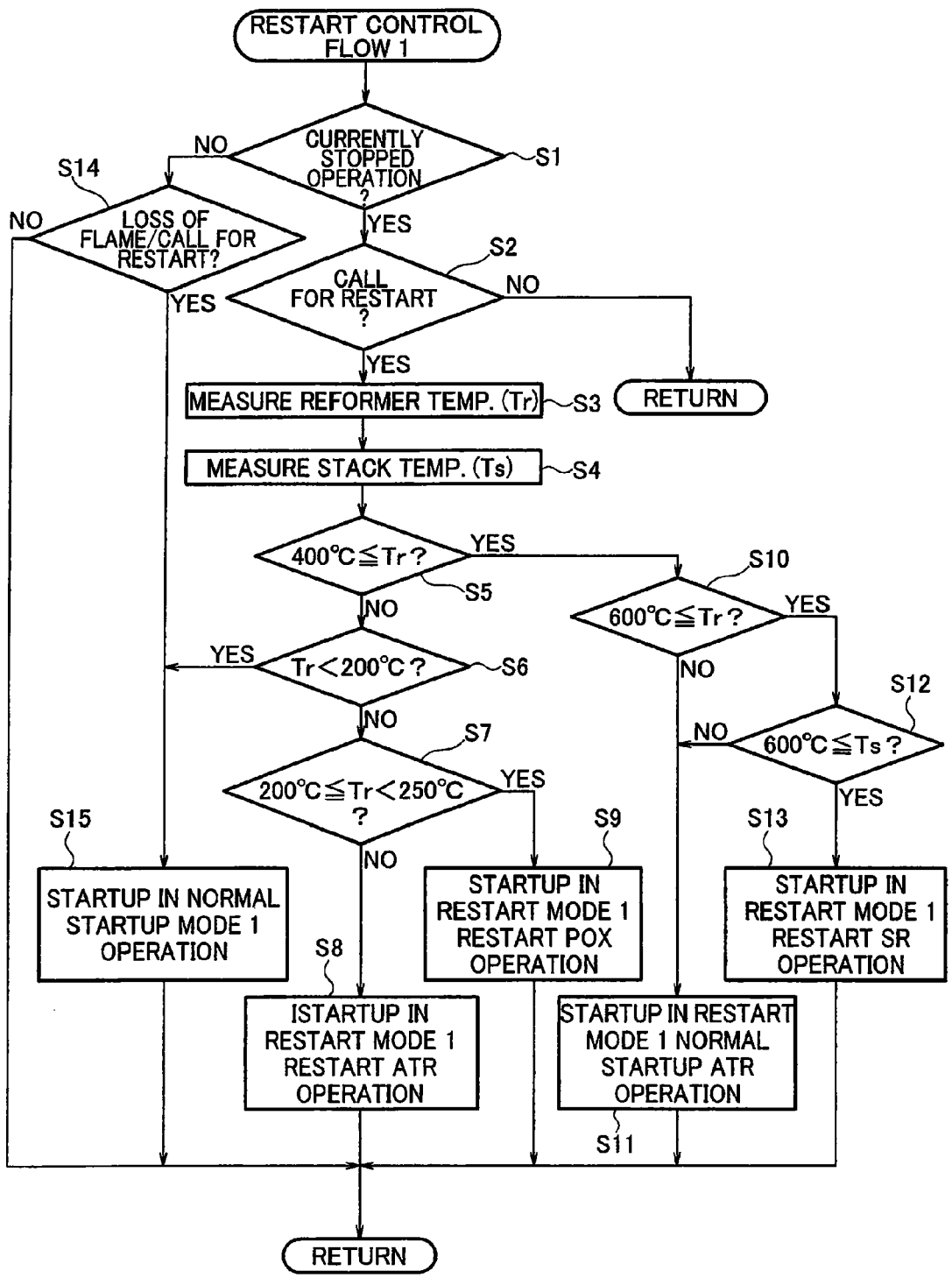
FIG. 10 is a flowchart showing a first example of restart control flow for restarting a solid oxide fuel cell device (SOFC) according to an embodiment of the present invention.
Figure 11:
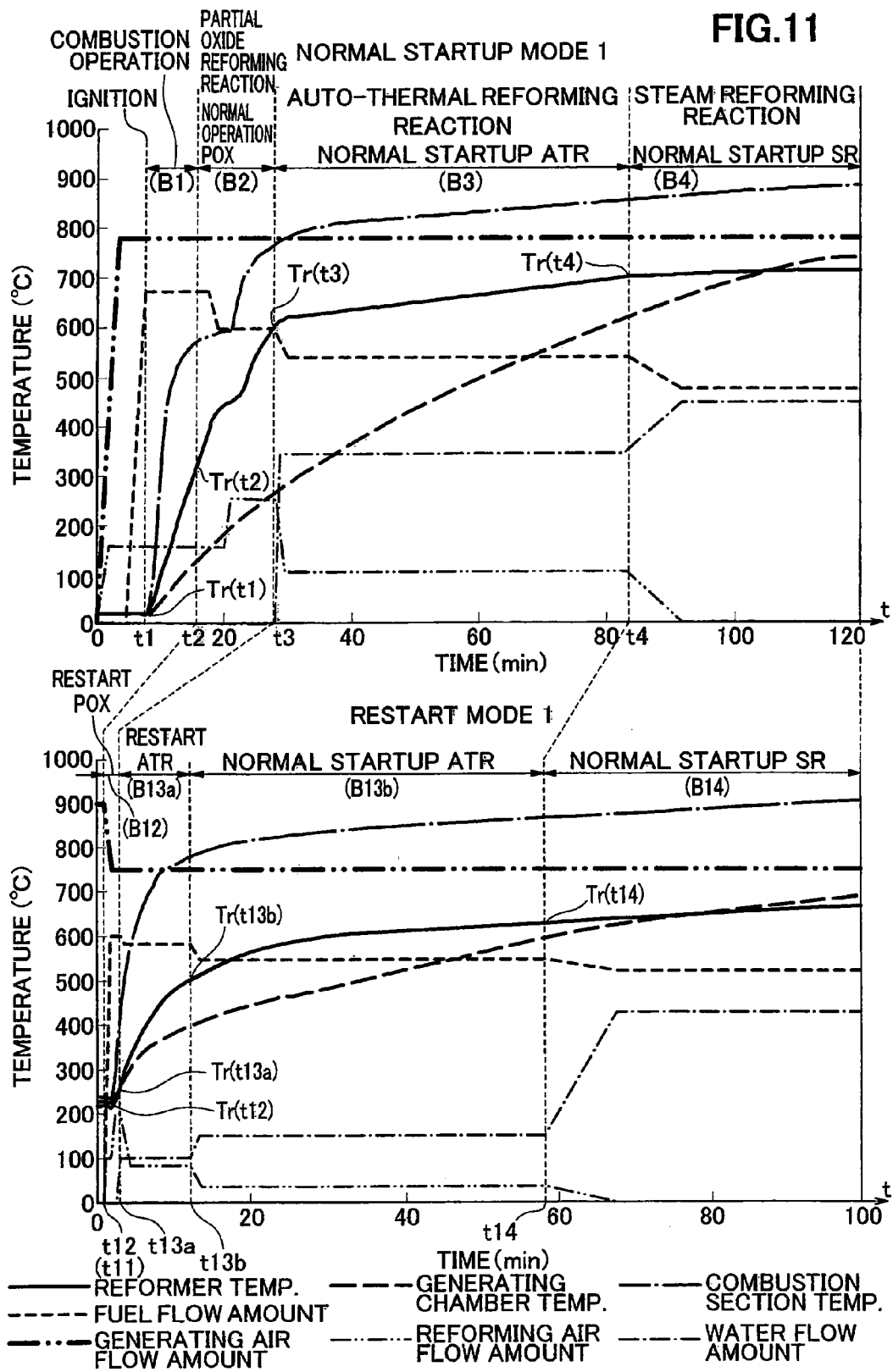
FIG. 11 is a diagram comparing a timing chart showing operations when restart is executed according to the first example restart control flow for the solid oxide fuel cell device (SOFC) according to the embodiment of the present invention shown in FIG. 10 to a timing chart showing normal startup operations.

Next, referring to FIGS. 9-11, the operation when a restart is executed based on a first example of the restart control flow of the solid oxide fuel cell device (SOFC) according to this embodiment as shown in FIG. 10 will be specifically explained.

FIG. 11 is a diagram comparing a timing chart showing operation when restart is executed based on a first example of the restart control flow in a solid oxide fuel cell device (SOFC) according to the embodiment of the present invention shown in FIG. 10, with a timing chart showing normal startup operations.

Note that the timing chart in the upper portion of FIG. 11 shows the normal startup operation of a solid oxide fuel cell device (SOFC) when the "Normal Startup Mode 1" in the data table shown in FIG. 9(A) is executed, and the timing chart in the bottom portion of FIG. 11 is a timing chart showing the restart operation of a solid oxide fuel cell device (SOFC) when the "Restart Mode 1" in the data table shown in FIG. 9(A) is executed.

For an explanation of the restart operation based on the first example restart control flow (restart flow 1) of the solid oxide fuel cell device (SOFC) of the present embodiment, referring to the data table regarding the "Normal Startup Mode 1" and "Restart Mode 1" shown in FIG. 9(A), the restart operation under "Restart Mode 1" of the solid oxide fuel cell device (SOFC) of the present embodiment shown in FIG. 11 is explained by comparing it with the operation in normal startup according to the "Normal Startup Mode 1."

First, how to read the "Normal Startup Mode 1" data table shown in FIG. 9(A) will be explained.

The "State" column under "Normal Startup Mode 1" shown in FIG. 9(A) shows the respective operating states upon normal startup from the top section to the bottom section in temporal order; the various operating states are separated into categories abbreviated as "Time of Ignition," "Combustion Operation," "Normal Startup POX," "Normal Startup ATR," and "Normal Startup SR."

Note that the times t shown along the horizontal axis of the timing chart in the "Normal Startup 1" in FIG. 11 are referred to as t1 for the "Time of Ignition," then t2, t3, and t4 for the sequential transitions through "Normal Startup POX," "Normal Startup ATR," and "Normal Startup SR;" the temperature of the reformer 20 detected by the reformer temperature sensor 148 at a time t is referred to as Tr(t), and the stack temperature measured by the generating chamber temperature sensor 142 at a time t is referred to as Ts(t).

The operating state shown in FIG. 9(A) referred to as "Time of Ignition" of the "Normal Startup Mode 1" is the state which turns on the ignition device 83, ignites the fuel gas, and starts combustion; if the temperature of the reformer 20 detected by the reformer temperature sensor 148 at the time of this ignition (t=t1) is deemed "temperature at time of ignition Tr(t1)," then this temperature at time of ignition Tr(t1) is lower than the temperature of the reformer 20 at the start of POX (t=t2)) (the "POX Starting Temperature Tr(t2)" below) (=300° C.).

Next, the "Combustion Operation" operating state of the "Normal Startup Mode 1" is one in which, after starting combustion following ignition of the fuel gas, startup is controlled in a control band (the "Combustion Operation Control Band B1" below) for executing a combustion operation by heating the reformer 20 through combustion of this fuel gas; this is executed in a temperature band W1 (Tr<300° C.) in which the temperature of the reformer 20 detected by the reformer temperature sensor 148 is between the temperature at the time of ignition Tr(t1) up to a temperature below the POX starting temperature Tr(t2) (=300° C.).

Next, the operating state referred to as the "Normal Startup POX" of the "Normal Startup Mode 1" is one in which, when in a temperature band (the "Normal Startup POX temperature band W2 (300° C.≦Tr(t)<600° C.; Ts<250° C.) in which the temperature Tr(t) of the reformer 20 detected by the reformer temperature sensor 148 is equal to or greater than the POX starting temperature Tr(t2) (=300° C.) and less than the temperature at which SR is possible (the "SR Feasible Temperature Tr(t3)" below) (=600° C.) (i.e., 300° C.≦Tr(t)<600° C., Ts<250° C.), startup is controlled in a control band (the "Normal Startup Mode POX Control Band B2" below) in which POX is executed by heating the reformer 20 using the reaction heat from POX and the combustion heat of the fuel gas.

Next, the operating state referred to as the "Normal Startup ATR" of the "Normal Startup Mode 1," is one in which, when in a temperature band in which the temperature Tr(t) of the reformer 20 detected by the reformer temperature sensor 148 is equal to or greater than the temperature at which SR is possible Tr(t3) (=600° C.) and less than a predetermined steady state temperature Tr(t4) (=650° C.) (the "Normal Startup ATR Temperature Band W3" below), (i.e., 600° C.≦Tr(t) <650° C.), and the stack temperature Ts measured by the generating chamber temperature sensor 142 is in a band equal to or greater than 250° C. and less than 600° C., the reaction heat from POX, the combustion heat of fuel gas, and the absorption of heat by SR are controlled to heat the reformer 20, and startup is controlled in the control band for executing ATR (the "Normal Startup ATR Control Band B3" below).

Next, the operating state referred to as "Normal Startup SR" of the "Normal Startup Mode 1" is one in which, when the temperature Tr(t) of the reformer 20 detected by the reformer temperature sensor 148 is at a predetermined steady state temperature Tr(t4) equal to or greater than 650° C., and the stack temperature Ts measured by the generating chamber temperature sensor 142 is equal to or greater than 600° C., startup is controlled in the control band (the "Normal Startup Mode SR Control Band B4" below) in which SR is executed.

Note that in the "Fuel Flow Amount" column in FIGS. 9(A) and 9(B), what is shown is the flow amount (L/min) of fuel gas supplied to the reformer 20 from the fuel flow regulator unit 38 serving as the fuel gas supply means of the auxiliary unit 4.

The "Reforming Air Flow Amount" column in FIGS. 9(A) and 9(B) shows the flow amount (L/min) of oxidant gas (reforming air) supplied from the reforming air flow regulator unit 44, which serves as the oxidant gas supply means for the auxiliary unit 4, to the reformer 20 via the first heater 46, which serves as oxidizing gas heating means.

Furthermore, the "Generating Air Flow Amount" column in FIGS. 9(A) and 9(B) shows, for each operating state, the flow amount (L/min) of generating air supplied from generating air flow regulator unit 45 of the auxiliary unit 4 to the electrical generating chamber 10 via the second heater 48.

The "Water Flow Amount" column in FIGS. 9(A) and 9(B) shows the flow amount (cc/min) of pure water supplied to the reformer 20 from the water flow regulator unit 28 of the auxiliary unit 4, which is the water supply means for producing pure water and supplying it the reformer 20.

Furthermore, the "Reformer Temperature" and "Stack Temperature" columns under "Transition Temperature Conditions" shown in FIGS. 9(A) and 9(B) indicate the reformer 20 temperature and fuel cell stack 14 temperature when the operating state transitions to the next operating state.

To explain this more specifically, the "Reformer Temperature" in the "Transition Temperature Conditions" in the state column under "Combustion Operation" of the "Normal Startup Mode 1" shows "300° C. or greater," but when this reaches a reformer 20 temperature Tr(t) of 300° C. or greater as detected by the reformer temperature sensor 148, the "Combustion Operation" operating state transitions to "Normal Startup POX."

Similarly, the "Reformer Temperature" of the "Transition Temperature Conditions" entry under the "Normal Startup POX" of the "Normal Startup Mode 1" state column shows "600° C. or greater," and the "Stack Temperature" shows "250° C. or greater," but this means that the transition from the "Normal Startup POX" operating state to the "Normal Startup ATR" operating state occurs when the reformer 20 temperature Tr(t) detected by the reformer temperature sensor 148 reaches 600° C. or greater, and the stack temperature Ts measured by the generating chamber temperature sensor 142 reaches 250° C. or greater.

Next, the reading of the "Restart Mode 1" data table shown in FIG. 9(A) will be explained, but because this is basically the same as the reading of the "Normal Startup Mode 1" described above, we will focus on the points of difference and features relative to the "Normal Startup Mode 1" data table.

First, the "State" column in the "Restart Mode 1" column shown in FIG. 9(A) shows the respective operating states upon restart from the top row to the bottom row in temporal order; the various operating states are separated into categories abbreviated as "Time of Ignition," "Restart POX," "Restart ATR," "Normal Startup ATR," and "Normal Startup SR."

Note that with respect to the times t on the horizontal axis of the "Restart Mode 1" timing chart, the time of the "Time of Ignition" is referred to as t11, and the times at which the transitions occur in sequence to "Restart POX," "Restart ATR," and "Normal Startup ATR," and "Normal Startup SR" are respectively referred to as t12, t13a, t13b and t14.

Next, the operating state shown in FIG. 9(A) and referred to as "Time of Ignition" under "Restart Mode 1" is one in which, when a restart is requested while the fuel cell module 2 operation is stopped, a normal startup based on the "Normal Startup Mode 1" is executed starting with the "Combustion Operation" following ignition in the "Normal Startup Model" (see S6 and S15 in FIG. 10) when the temperature Tr(t) of the reformer 20 detected by the reformer temperature sensor 148 is less than a predetermined temperature Tr(t11) (=200° C.), which is less than the above-described POX starting temperature Tr(t2) (=300° C.) in the normal startup mode POX control band B2 of the "Normal Startup Mode 1."

On the other hand, when the reformer 20 temperature Tr(t11) is equal to or greater than a predetermined temperature (=200° C.), there is a transition to the "Restart POX" operating state of the "Restart Mode 1" (see FIG. 10 S7 and S8) immediately after the ignition device 83 turns on and the fuel gas is ignited.

Note that the "Fuel Flow Amount" at the "Time of Ignition" under "Restart Mode 1" shown in FIG. 9(A) is 5.5 (L/min), which is less than the "Fuel Flow Amount" (6.0 L/min) at the "Time of Ignition" under the "Normal Startup Mode 1."

Next, the operating state shown in FIG. 9(A) and S9 of FIG. 10 and referred to as the "Restart POX" of the "Restart Mode 1" is one in which, when the temperature Tr (t11) of the reformer 20 detected by the reformer temperature sensor 148 is equal to or greater than a predetermined temperature (=200° C.), there is an immediate transition after turning on the ignition device 83 and igniting the fuel gas, and restart is controlled in the control band in which POX is executed (the "Restart Mode POX Control Band B12" below).

The "Restart POX" operating state executed in the restart mode POX control band B12 of the "Restart Mode 1" differs from the "Normal Startup POX" operating mode executed in the normal startup mode POX control band B2 of the "Normal Startup Mode 1."

More specifically, the temperature band in which the "Restart POX" is executed in the restart mode POX control band B12 of the "Restart Mode" (the "Restart POX temperature band W12" below) is a lower temperature band (200° C.≦Tr(t)<250° C.) than the normal startup POX temperature band W2 (300° C.≦Tr(t)<600° C.; Ts<250° C.) in which the "Normal Startup POX" is executed in the normal startup mode POX control band B2 of the "Normal Startup Mode 1."

Also, the "Fuel Flow Amount" in the "Restart POX" operating state of the "Restart Mode 1" is 5.5 L/min, which is less than the "Fuel Flow Amount" in the "Time of Ignition" and "Combustion Operation" operating states of the "Normal Startup Mode 1" (6.0 L/min), but is greater than the "Fuel Flow Amount" (5.0 L/min) in the "Normal Startup POX" operating state of the "Normal Startup Mode 1."

Furthermore, the "Reforming Air Flow Amount" in the "Restart POX" operating state of the "Restart Mode 1" is 17.0 L/min, which is less than the "Reforming Air Flow Amount" (18.0 L/min) in the "Normal Startup POX" operating state of the "Normal Startup Mode 1."

Next, the operating state referred to as "Restart ATR" of the "Restart Mode 1" in FIG. 9(A) and S8 in FIG. 10 controls restart in a control band (the "Restart Mode ATR Control Band B13a" below) for executing an ATR different from the "Normal Startup POX" or "Normal Startup ATR" in the "Normal Startup Mode 1."

More specifically, the temperature band in which the "Restart ATR" is executed in the restart mode ATR control band B13a of "Restart Mode 1" (the "Restart Mode ATR temperature band W13a" below) is a temperature band equal to or greater than 250° C. and less than 400° C., on the higher temperature side of the restart POX temperature band W12 of the "Normal Startup Mode 1" (200° C.≦Tr<250° C.) (i.e., 250° C.≦Tr<400° C., Ts<400° C.).

In the restart mode ATR control band B13a of the "Restart Mode 1," the "Normal Startup POX" of the "Normal Startup Mode 1" is not executed even though, in particular, the restart mode ATR temperature band W13a of the "Restart Mode 1" (250° C.≦Tr<400° C., Ts<400° C.) overlaps with a part of the normal startup POX temperature band W2 (300° C.≦Tr(t) <600° C., Ts<250° C.) of the "Normal Startup Mode 1."

Furthermore, the "Fuel Flow Amount" in the "Restart ATR" operating state of the "Restart Mode 1" is 5.0 L/min, which is equal to the "Fuel Flow Amount" in the "Normal Startup POX" operating state of the "Normal Startup Mode 1" (5.0 L/min), but is more than the "Fuel Flow Amount" (5.0 L/min) in the "Normal Startup ATR" operating state of the "Normal Startup Mode 1."

Furthermore, the "Reforming Air Flow Amount" in the "Restart ATR" operating state of the "Restart Mode 1" is 8.0 L/min, which is less than the "Reforming Air Flow Amount" (18.0 L/min) in the "Normal Startup POX" operating state of the "Normal Startup Mode 1," and is more than the "Reforming Air Flow Amount" (4.0 L/min) in the "Normal Startup ATR" operating state of the "Normal Startup Mode 1."

Furthermore, the "Water Flow Amount" in the "Restart ATR" operating state of the "Restart Mode 1" is 2.0 cc/min, which is less than the "Water Flow Amount" (3.0 L/min) in the "Normal Startup ATR" operating state of the "Normal Startup Mode 1."

Next, the operating state shown in FIG. 9(A) and S11 of FIG. 10 and referred to as the "Normal Startup ATR" of the "Normal Startup Mode 1" is one in which, when the temperature Tr(t) of the reformer 20 detected by the reformer temperature sensor 148 is in a temperature band corresponding to the normal startup POX temperature band W2 of the "Normal Startup Mode 1" (300° C.≦Tr(t)<600° C.; Ts<250° C.), and within a temperature band (the "Normal Startup ATR Temperature Band W13$b$" below) (400° C.≦Tr<600° C., 400° C.≦Ts<600° C.) on the high temperature side of the restart ATR temperature band W13$a$ of the "Restart Mode 1" (250° C.≦Tr<400° C., Ts<400° C.), restart is controlled in a control band (the "Restart Mode ATR Control Band B13$b$" below) in which the same ATR is executed as the "Normal Startup ATR" in the "Normal Startup Mode 1."

Next, the operating state referred to as "Normal Startup SR" of the "Restart Mode 1" in FIG. 9(A) and S13 in FIG. 10 controls restart in the control band (the "Restart Mode SR control band B14" below) for executing the same SR as the "Normal Startup SR" in the "Normal Startup Mode 1" using the same conditions as the "transition temperature conditions" in the "Normal Startup SR" of the "Normal Startup Mode 1."

Next, it is focused particularly on the above-described control band (the "Restart Mode Control Band of the "Restart Mode 1"" below") for execution, under "Restart Mode 1," starting from "Restart POX," via "Restart ATR," and going to "Normal Startup ATR," comparing a restart under this restart mode control band with a normal startup under the "Normal Startup Mode 1."

When, in the restart mode control band of the "Restart Mode 1," the reformer 20 temperature Tr(t) is within the normal startup POX temperature band W2 temperature band, having dropped from the high temperature side of the temperature band corresponding to the normal startup POX temperature band W2 (300° C.≦Tr(t)<600° C.; Ts<250° C.) of the "Normal Startup Mode 1" due to stopping of the operation of the fuel cell module 2, execution of the "Normal Startup POX" in the normal startup mode POX control band B2 of the "Normal Startup Mode 1" is skipped due to the active utilization of residual heat remaining in the fuel cell stack 14 or the reformer 20, even if the reformer 20 temperature Tr(t) is within the normal startup POX temperature band W2.

Then, instead of this skipped "Normal Startup POX" of the "Normal Startup Mode 1," in the restart ATR temperature band W13$a$ of the "Normal Startup Mode 1," a "Restart ATR" is executed in which the "Water Flow Amount" is less than in the "Normal Startup ATR" of the "Normal Startup Mode 1," and in the normal startup ATR temperature band W13$b$ (400° C.≦Tr<600° C., 400° C.≦Ts<600° C.), the normal startup mode ATR control band B3 under the "Normal Startup Mode 1" can be expanded to execute a "Normal Startup ATR" of the "Restart Mode 1" which is the same as the "Normal Startup ATR" of the "Normal Startup Mode 1."

However, in the series of restart mode control bands in "Restart Mode 1," POX is not completely prohibited, and a "Restart POX" of the "Restart Mode 1" different from the "Normal Startup POX" of the "Normal Startup Mode 1" is executed when the reformer 20 temperature Tr(t) is in the restart POX temperature band W12 (200° C.≦Tr(t)<250° C.), which is a temperature band on the low temperature side of the normal startup POX temperature band W2 of the "Normal Startup Mode 1" (300° C.≦Tr(t)<600° C.; Ts<250° C.).

On the other hand, in the series of restart mode control bands in "Restart Mode 1," for example, when a restart has been performed based on loss of flame at startup, the possibility is low that residual heat remaining in the fuel cell stack 14 or the reformer 20 can be used even if the reformer 20 temperature Tr(t) rose from the low temperature side of the restart ATR temperature band W13$a$ of the "Restart Mode 1" (250° C.≦Tr<400° C., Ts<400° C.) and was within the restart ATR temperature bands W13$a$ or W13$b$ (400° C.≦Tr<600° C., 400° C.≦Ts<600° C.), therefore "Restart ATR" and "Normal Startup ATR" in the restart mode control band of the "Normal Startup Mode 1" are prohibited, and execution starts with the "Combustion Operation" after ignition in "Normal Startup Mode 1" (see FIG. 10, S14 and S15).

As shown in FIG. 11, the time t13$b$ over which the transition from the "Restart ATR" of the "Restart Mode 1" to the "Normal Startup ATR" occurs is a shorter time than the time t3 over which the transition from the "Normal Startup POX" of the "Normal Startup Mode 1" to the "Normal Startup ATR" occurs.

Furthermore, the time t14 over which the transition from the "Normal Startup ATR" of the "Restart Mode 1" to the "Normal Startup SR" occurs is also shorter than the time t4 over which the transition from the "Normal Startup ATR" of the "Normal Startup Mode 1" to the "Normal Startup SR" occurs, and the startup time for restart is shorter compared to the startup time for normal startup.

In the restart control according to a first example of the restart control flow of the solid oxide fuel cell device (SOFC) in the above described embodiment, when the reformer 20 temperature Tr(t) is within the normal startup POX temperature band W2, having dropped from the high temperature side of the temperature band corresponding to the normal startup POX temperature band W2 (300° C.≦Tr(t)<600° C.; Ts<250° C.) of the "Normal Startup Mode 1" due to stopping of the operation of the fuel cell module 2, execution of the "Normal Startup POX" in the normal startup mode POX control band B2 of the "Normal Startup Mode 1" can be skipped due to the active utilization of residual heat remaining in the fuel cell stack 14 or the reformer 20, even if the reformer 20 temperature Tr(t) is within the normal startup POX temperature band W2. Then, instead of this skipped "Normal Startup POX" of the "Normal Startup Mode 1," in the restart ATR temperature band W13$a$ of the "Normal Startup Mode 1" (250° C.≦Tr<400° C., Ts<400° C.), a "Restart ATR" can be executed in which the "Water Flow Amount" is less than in the "Normal Startup ATR" of the "Normal Startup Mode 1," and in the normal startup ATR temperature band W13$b$ (400° C.≦Tr<600° C., 400° C.≦Ts<600° C.), the normal startup mode ATR control band B3 under the "Normal Startup Mode 1" can be expanded to execute a "Normal Startup ATR" of the "Restart Mode 1" which is the same as the "Normal Startup ATR" of the "Normal Startup Mode 1."

As a result, when compared to the case in which a normal startup POX is executed as is without skipping the execution of the normal startup POX in the normal startup mode POX control band B2 of the "Normal Startup Mode 1," oxidation of the fuel cells 84 and the burden on the fuel cells 84 caused by anomalously high temperatures can be reduced, and the durability of the fuel cells 84 improved.

Since the amount of heat is greater in ATR than in POX, the "Normal Startup POX" in the "Normal Startup Mode 1" can be skipped and the "Restart Mode 1" executed due to the active utilization of residual heat remaining in the fuel cell stack 14 or the reformer 20, so that by executing the sequence from "Time of Ignition" to "Restart POX," "Restart ATR," "Normal Startup ATR," and "Normal Startup SR," the transition from the time of ignition to ATR and SR can be speeded up. As a result, compared to the hypothetical case in which, upon startup, a "Normal Startup POX" of the "Normal Startup Mode 1" is executed within a temperature band corresponding to the normal startup POX temperature band W2 (300° C.≦Tr(t)<600° C.; Ts<250° C.) in a "Normal Startup Mode 1," the startup time needed for restart can be greatly shortened.

On the other hand, when a restart is executed based on loss of flame at startup, a "Restart ATR" and "Normal Startup ATR" in the restart mode control band of the "Normal Startup Mode 1" can be prohibited, therefore damage to the individual fuel cells 16 can be restrained.

Furthermore, in the restart control according to a first example of the restart control flow of the solid oxide fuel cell device (SOFC) of the present embodiment, execution at the time of restart in the "Restart Mode 1" of the sequence "Restart POX," "Normal Startup ATR," and "Normal Startup SR" as the temperature of the reformer 20 rises from the "Time of Ignition" enables a stable temperature recovery without inducing temperature drops in the individual fuel cell units 16.

Moreover, in the restart control according to a first example of the restart control flow of the solid oxide fuel cell device (SOFC) of the present embodiment, because the "Restart POX" executed before the transition to the "Restart ATR" of the "Restart Mode 1" is executed within the temperature band W12 (200° C.≦Tr(t)<250° C.) on the low temperature side of the normal startup POX temperature band W2 (300° C.≦Tr(t)<600° C.; Ts<250° C.) in which the "Normal Startup POX" of the "Normal Startup Mode 1" is executed, and is executed in a state more abundant than the "Fuel Flow Amount" in the "Normal Startup POX" and less abundant than the "Reforming Air Flow Amount" in the "Normal Startup POX," oxidation of the fuel cell stack 14 can be prevented and the rise in the temperature of the fuel cell stack 14 can be promoted.

Furthermore, in the restart control according to a first example of the restart control flow of the solid oxide fuel cell device (SOFC) of the present embodiment, by executing the "Restart ATR" of the "Restart Mode 1" in which the "Fuel Flow Amount" is greater than in the "Normal Startup ATR" of the "Normal Startup Mode 1," as an alternative when skipping the "Normal Startup ATR" of the "Normal Startup Mode 1," temperature drops in the reformer 20 and the fuel cell stack 14 can be restrained and rapid temperature recovery can be achieved even if water is being supplied in a relatively low temperature band, due to the execution of the "Restart ATR," in which the combustion temperature is kept high.

In addition, in the restart control according to a first example of the restart control flow of the solid oxide fuel cell device (SOFC) of the present embodiment, by executing the "Restart Mode 1" "Restart ATR" in which the "Reforming Air Flow Amount" is greater than in the "Normal Startup ATR" of the "Normal Startup Mode 1," as an alternative when skipping the "Normal Startup POX" of the "Normal Startup Mode 1," exothermal reactions from partial oxidation reactions increase, so that the reformer 20 and fuel cell stack 14 temperatures can be more quickly raised.

Furthermore, in the restart control according to a first example of the restart control flow of the solid oxide fuel cell device (SOFC) of the present embodiment, by executing the "Restart ATR" of the "Restart Mode 1" in which the "Water Flow Amount" is less than in the "Normal Startup ATR" of the "Normal Startup Mode 1" as an alternative when skipping the "Normal Startup ATR" of the "Normal Startup Mode 1," temperature drops in the reformer 20 and the fuel cell stack 14 can be restrained, and residual heat transferred and ATR executed, even in the relatively low temperature band, so that a stable rise in temperature can be achieved.

Figure 12:
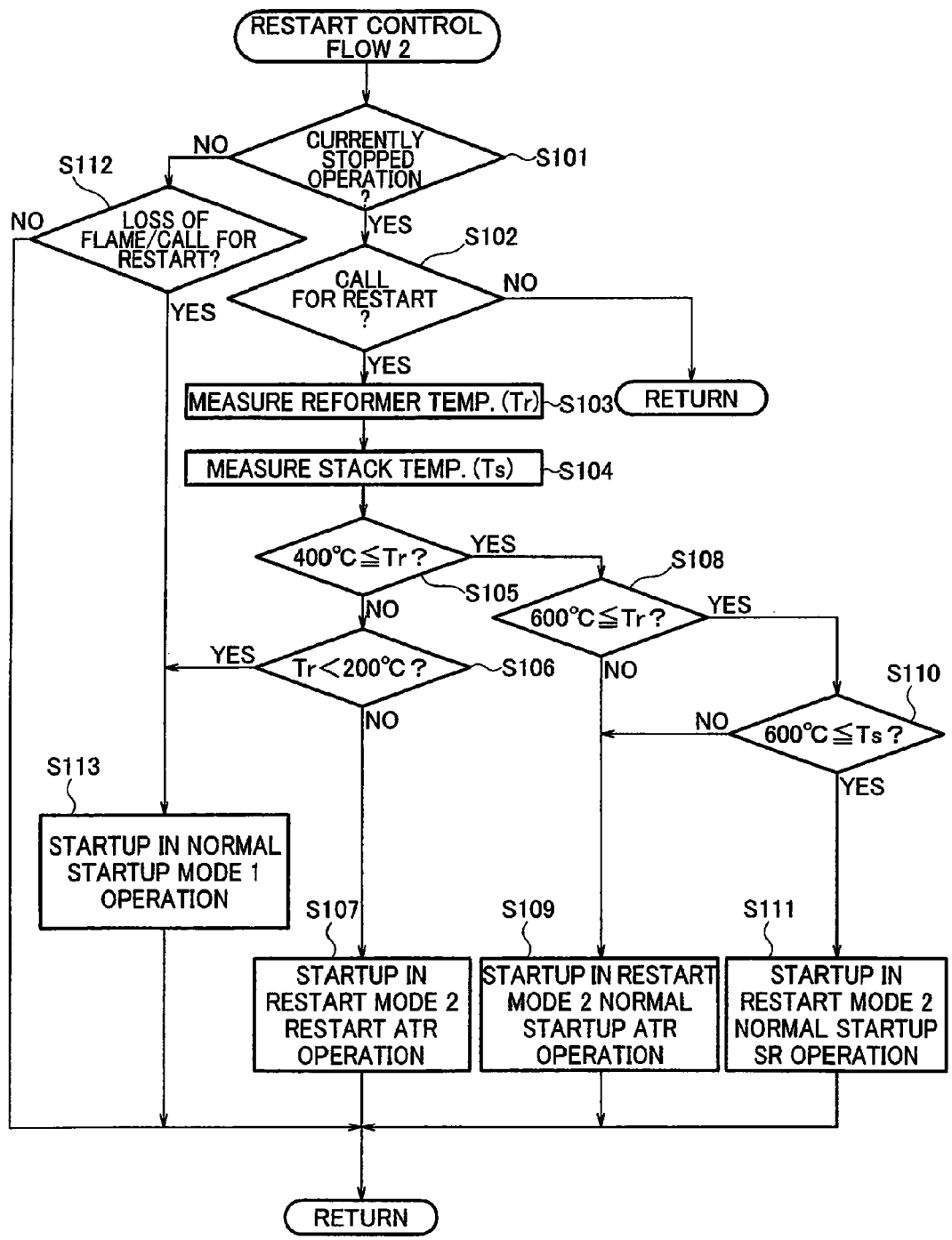
FIG. 12 is a flowchart showing a second example of restart control flow for restarting a solid oxide fuel cell device (SOFC) according to an embodiment of the present invention.

Next, referring to FIG. 12, specifics of the restart control flow in a solid oxide fuel cell device (SOFC) according to a second example of the present embodiment will be explained. FIG. 12 is a flowchart showing a second example of restart control flow (restart control flow 2) for restarting a solid oxide fuel cell device (SOFC) according to an embodiment of the present invention. In FIG. 12, an S denotes the various steps.

First, a determination is made in S101 as to whether the fuel cell module 2 operation is stopped; if stopped, the system advances to S102 and determines whether a restart is requested.

If it is determined in S102 that a restart is requested, the system advances to S103, and after measuring the reformer 20 temperature Tr(t) using the reformer temperature sensor 148, the system advances to S104 and the stack temperature Ts, which is the temperature in the vicinity of the fuel cell stack 14 (i.e., the individual fuel cells 84 themselves) is measured by generating chamber temperature sensor 142.

Next, advancing to S105, a determination is made as to whether the reformer temperature Tr(t) is equal to or greater than 400° C.

In S105, if it is determined that the reformer temperature Tr(t) is not equal to or greater than 400° C., the system advances to S106 and determines if the reformer temperature Tr(t) is less than 200° C.

In S106, if it is determined that the reformer temperature Tr(t) is not less than 200° C., i.e., that the reformer temperature Tr(t) is equal to or greater than 200° C. and less than 400° C., the system advances to S107, and a "Restart ATR" is executed according to the "Restart Mode 2" in the data table shown in FIG. 9(A).

Also, if it is determined in S105 that the reformer temperature Tr(t) is equal to or greater than 400° C., the system advances to S108 and determines if the reformer temperature Tr(t) is equal to or greater than 600° C. if it is determined in S108 that the reformer temperature Tr(t) is not equal to or greater than 600° C., i.e., that the reformer temperature Tr(t) is equal to or greater than 400° C. and less than 600° C., the system advances to S109, and a "Normal Startup ATR" is executed according to the "Restart Mode 2" in the data table shown in FIG. 9(A).

On the other hand, if it is determined in S108 that the reformer temperature Tr is equal to or greater than 600° C., the system advances to S110 and determines whether the stack temperature Ts measured by the generating chamber temperature sensor 142 is equal to or greater than 600° C.

If, in S110, a determination is made that the stack temperature Ts is equal to or greater than 600° C., the system advances to S111, and a "Normal Startup SR" is executed according to the "Restart Mode 2" in the data table shown in FIG. 9(A). On the other hand, if it is determined in S110 that the stack temperature Ts is not equal to or greater than 600° C., i.e., that the stack temperature Ts is less than 600° C. notwithstanding that the reformer temperature Tr(t) is equal to or greater than 600° C., the system advances to S109, and the "Normal Startup ATR" is executed according to the "Restart Mode 2" in the data table shown in FIG. 9(A).

Next, a determination is made in S101 as to whether the fuel cell module 2 operation is stopped; if not stopped, the system advances to S112 and determines whether there is a request for a restart based on loss of flame during startup.

If it is determined in S112 that there is call for restart based on loss of flame, and there is a determination in S106 that the reformer temperature Tr(t) is less than 200° C., the system advances to S113, and since a restart table cannot be used, a restart is executed according to the "Normal Startup Mode 1" in the data table shown in FIG. 9(A).

Figure 13:
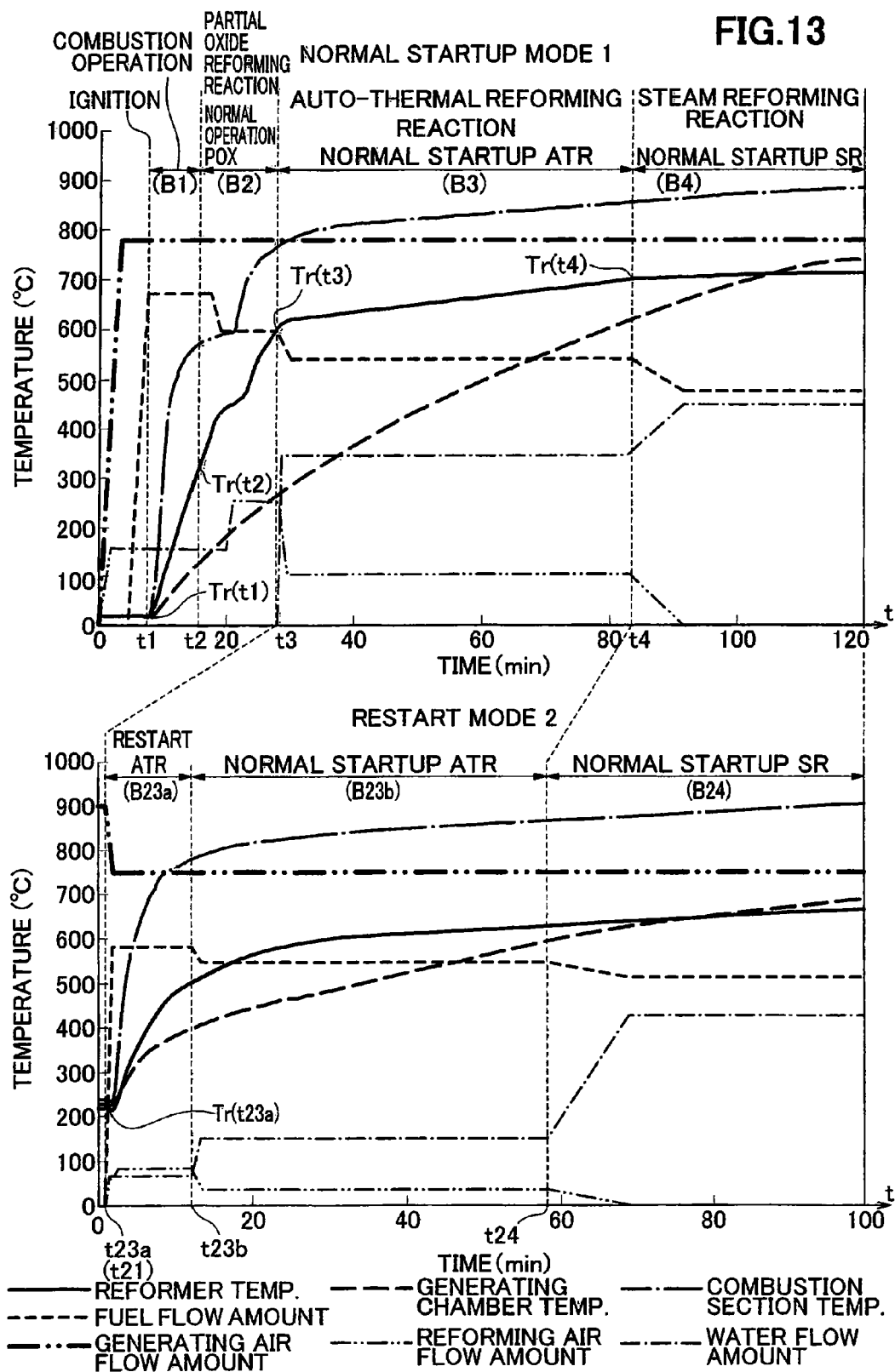
FIG. 13 is a diagram comparing a timing chart showing operations when restart is executed according to the second example restart control flow for the solid oxide fuel cell device (SOFC) according to the embodiment of the present invention shown in FIG. 12 to a timing chart showing normal startup operations.

Next, referring to FIG. 9(A), FIG. 12, and FIG. 13, the operation when a restart is executed based on a second example of the restart control flow of the solid oxide fuel cell device (SOFC) according to this embodiment as shown in FIG. 12 will be specifically explained.

FIG. 13 is a diagram comparing a timing chart showing the operation when restart is executed based on a second example of the restart control flow in a solid oxide fuel cell device (SOFC) according to the present embodiment of the present invention shown in FIG. 12 to a timing chart showing normal startup operations.

Note that the timing chart in the upper portion of FIG. 13 is a timing chart showing the normal startup operation of a solid oxide fuel cell device (SOFC) when the "Normal Startup Mode 1" in the data table shown in FIG. 9(A) is executed, and the timing chart in the bottom portion of FIG. 13 is a timing chart showing the restart operation of a solid oxide fuel cell device (SOFC) when the "Restart Mode 2" in the data table shown in FIG. 9(A) is executed.

For an explanation of the restart operation based on the second example of restart control flow (restart flow 2) of the solid oxide fuel cell device (SOFC) of the present embodiment, referring only to the data table regarding the "Normal Startup Mode 1" and "Restart Mode 2" shown in FIG. 9(A), the restart operation under "Restart Mode 2" of the solid oxide fuel cell device (SOFC) of the present embodiment shown in FIG. 13 is explained by comparing it with the operation in normal startup according to the "Normal Startup Mode 1."

First, as shown in FIG. 9(A), restart control according to "Restart Mode 2" is executed starting from "Time of Ignition" in the sequence "Restart ATR," "Normal Startup ATR," and "Normal Startup SR." Note that with respect to the times t on the horizontal axis of the "Restart Mode 1" timing chart, the time of the "Ignition Time" is referred to as t21, and the time at which the transitions occur in sequence to "Restart ATR," "Normal Startup ATR," and "Normal Startup SR" are respectively referred to as t23a, t23b, and t24.

Next, the operating state shown in FIG. 9(A) and referred to as "Time of Ignition" under "Restart Mode 2" is one in which, when a restart is requested while the fuel cell module 2 operation is stopped, a normal startup based on the "Normal Startup Mode 1" is executed starting with the "Combustion Operation" following ignition in the "Normal Startup Mode 1" (See FIG. 12, S106 and S113) when the temperature Tr(t) of the reformer 20 detected by the reformer temperature sensor 148 is less than a predetermined temperature Tr(t21) (=200° C.), which is below the above-described POX starting temperature Tr(t2) (=300° C.) in the normal startup mode POX control band B2 of the "Normal Startup Mode 1."

On the other hand, when the reformer 20 temperature Tr(t21) is equal to or greater than a predetermined temperature (=200° C.), the ignition device 83 turns on and the fuel gas is ignited, following which there is a transition to the "Restart ATR" operating state of the "Restart Mode 2" (see FIG. 12, S106 and S107).

Here, the operating state referred to as "Restart ATR" of the "Restart Mode 2" shown in FIG. 9(A) and S107 of FIG. 12 controls restart in a control band (the "Restart Mode ATR Control Band B23a" below) for executing an ATR different from the "Normal Startup POX" in the "Normal Startup Mode 1" or the "Restart ATR" in the "Restart Mode 1."

To explain this more specifically, with respect to the temperature band (the "Restart ATR temperature band W23a" below) in which the "Restart ATR" is executed in the restart mode ATR control band B23a of the "Restart Mode 2," while it is true that this is a temperature band (200° C.≦Tr<400° C., Ts<400° C.) which overlaps with a part of the normal startup POX temperature band W2 (300° C.≦Tr(t)<600° C.; Ts<250° C.) in which a "Normal Startup. POX" is executed in the normal startup mode POX control band B2 in the "Normal Startup Mode 1," the "Normal Startup POX" of the "Normal Startup Mode 1" is not executed in this overlapping temperature band.

Furthermore, the "Fuel Flow Amount" in the "Restart ATR" operating state of the "Restart Mode 2" is 5.5 L/min, which is more than the "Fuel Flow Amount" (5.0 L/min) in the "Normal Startup POX" operating state of the "Normal Startup Mode 1" and more than the "Fuel Flow Amount" (4.0 L/min) in the "Normal Startup ATR" operating state of the "Normal Startup Mode 1."

The "Reforming Air Flow Amount" in the "Restart ATR" operating state of the "Restart Mode 2" is 12.0 L/min, which is less than the "Reforming Air Flow Amount" (18.0 L/min) in the "Normal Startup POX" operating state of the "Restart Mode 1" and more than the "Reforming Air Flow Amount" (4.0 L/min) in the "Normal Startup ATR" operating state of the "Normal Startup Mode 2."

Furthermore, the "Water Flow Amount" in the "Restart ATR" operating state of the "Restart Mode 2" is 1.0 cc/min, which is less than the "Water Flow Amount" (3.0 L/min) in the "Normal Startup ATR" operating state of the "Restart Mode 1."

Next, the operating state shown in FIG. 9(A) and S109 of FIG. 10 and referred to as the "Normal Startup ATR" of the "Normal Startup Mode 1" is one in which, when the temperature Tr(t) of the reformer 20 is in a temperature band corresponding to the normal startup POX temperature band W2 of the "Normal Startup Mode 1" (300° C.≦Tr(t)<600° C.; Ts<250° C.), and within a temperature band (the "Normal Startup ATR Temperature Band W23b" below) (400° C.≦Tr<600° C., 400° C.≦Ts<600° C.) on the high temperature side of the restart ATR temperature band W23a of the "Restart Mode 2" (200° C.≦Tr<400° C., Ts<400° C.), restart is controlled in a control band (the "Restart Mode ATR Control Band B23b" below) in which the same ATR is executed as the "Normal Startup ATR" in the "Normal Startup Mode 1."

Next, the operating state referred to as "Normal Startup SR" of the "Restart Mode 2" shown in FIG. 9(A) and S111 in FIG. 12, under the same conditions as the "Transition Temperature Conditions" in the "Normal Startup SR" of the "Normal Startup Mode 1," controls restart in the control band (the "Restart Mode SR Control Band B24" below) for executing the same SR as the "Normal Startup SR" in the "Normal Startup Mode 1."

Next it is focused particularly on the above-described control band ("the Restart Mode Control Band of the "Restart Mode 2"" below) for executing, under "Restart Mode 2," a "Restart ATR" and a "Normal Startup ATR," comparing a restart under this restart mode control band with a normal startup under the "Normal Startup Mode 1."

When, in the restart mode control band of the "Restart Mode 2," the reformer 20 temperature Tr(t) is within the normal startup POX temperature band W2, having dropped from the high temperature side of the temperature band corresponding to the normal startup POX temperature band W2 (300° C.≦Tr(t)<600° C.; Ts<250° C.) of the "Normal Startup Mode 1" due to stopping of the operation of the fuel cell module 2, execution of the "Normal Startup POX" in the normal startup mode POX control band B2 of the "Normal Startup Mode 1" is completely skipped due to the active utilization of residual heat remaining in the fuel cell stack 14 or the reformer 20, even if the reformer 20 temperature Tr(t) is within the normal startup POX temperature band W2.

Then, instead of this skipped "Normal Startup POX" of the "Normal Startup Mode 1," in the restart ATR temperature band W23a of the "Normal Startup Mode 2" (200° C.≦Tr<400° C., Ts<400° C.), a "Restart ATR" is executed in which the "Water Flow Amount" is less than in the "Normal Startup ATR" of the "Normal Startup Mode 1," and in the normal startup ATR temperature band W23b (400° C.≦Tr<600° C., 400° C.≦Ts<600° C.), the normal startup mode ATR control band B3 under the "Normal Startup Mode 1" can be expanded to execute a "Normal Startup ATR" of the "Restart Mode 2" which is the same as the "Normal Startup ATR" of the "Normal Startup Mode 1."

On the other hand, in the series of restart mode control bands in "Restart Mode 2," when a restart has been performed based on loss of flame at startup, the possibility is low that residual heat remaining in the fuel cell stack 14 or the reformer 20 can be used even if the reformer 20 temperature Tr(t) rose from the low temperature side of the restart ATR temperature band W23a of the "Restart Mode 2" (200° C.≦Tr<400° C., Ts<400° C.) and was within the restart ATR temperature bands W23a or W23b (400° C.≦Tr<600° C., 400° C.≦Ts<600° C.), therefore "Restart ATR" and "Normal Startup ATR" in the restart mode control band of the "Normal Startup Mode 2" are prohibited, and execution starts with the "Combustion Operation" after ignition in "Normal Startup Mode 1" (see FIG. 12, S1112 and S113).

Also, as shown in FIG. 13, the time t23b over which the transition from the "Restart ATR" of the "Restart Mode 2" to the "Normal Startup ATR" occurs is a shorter time than the time t3 over which the transition from the "Normal Startup POX" of the "Normal Startup Mode 1" to the "Normal Startup ATR" occurs.

Furthermore, the time t24 over which the transition from the "Normal Startup ATR" of the "Restart Mode 2" to the "Normal Startup SR" occurs is also shorter than the time t4 over which the transition from the "Normal Startup ATR" of the "Normal Startup Mode 1" to the "Normal Startup SR" occurs, and the startup time for restart is shorter compared to the startup time for normal startup.

In the restart control in a second example of the restart control flow in the solid oxide fuel cell device (SOFC) of the present embodiment described above, when the reformer 20 temperature Tr(t) is within the normal startup POX temperature band W2 temperature band, having dropped from the high temperature side of the temperature band corresponding to the normal startup POX temperature band W2 (300° C.≦Tr(t)<600° C.; Ts<250° C.) of the "Normal Startup Mode 1" due to stopping of the operation of the fuel cell module 2, it is possible to skip execution of the "Normal Startup POX" in the normal startup mode POX control band B2 under "Normal Startup Mode 1" even if the reformer 20 temperature Tr(t) is within the normal startup POX temperature band W2, and instead of this skipped "Normal Startup POX" of the "Normal Startup Mode 1," it is possible to execute, in the restart ATR temperature band W23a of the "Normal Startup Mode 2" (200° C.≦Tr<400° C., Ts<400° C.), a "Restart ATR" in which the "Water Flow Amount" is less than in the "Normal Startup ATR" of the "Normal Startup Mode 1," and in the normal startup ATR temperature band W23b (400° C.≦Tr<600° C., 400° C.≦Ts<600° C.), the normal startup mode ATR control band B3 under the "Normal Startup Mode 1" can be expanded to execute a "Normal Startup ATR" of the "Restart Mode 1" which is the same as the "Normal Startup ATR" of the "Normal Startup Mode 1."

As a result, when compared to the case in which a normal startup POX is executed as is without skipping the execution of the "Normal Startup POX" in the normal startup mode POX control band B2 of the "Normal Startup Mode 1," oxidation of the fuel cells 84 and the burden on the fuel cells 84 caused by anomalously high temperatures can be reduced, and the durability of the fuel cells 84 improved.

Also, since the amount of heat is greater in ATR than in POX, the "Normal Startup POX" can be skipped and the "Restart Mode 2" executed due to the active utilization of residual heat remaining in the fuel cell stack 14 or the reformer 20, so that by executing the sequence from "Time of Ignition" to "Restart ATR," "Normal Startup ATR," and "Normal Startup SR," the transition from the time of ignition to ATR and SR can be speeded up. As a result, compared to the hypothetical case in which, upon startup, the "Normal Startup POX" of the "Normal Startup Mode 1" is executed within a temperature band corresponding to the normal startup POX temperature band W2 (300° C.≦Tr(t)<600° C.; Ts<250° C.) at restart, the startup time needed for restart can be greatly shortened.

On the other hand, when a restart is executed based on loss of flame at startup, a "Restart ATR" and "Normal Startup ATR" in the restart mode control band of the "Normal Startup Mode 2" can be prohibited, therefore damage to the individual fuel cells 16 can be restrained.

Furthermore, in the restart control according to a second example of the restart control flow of the solid oxide fuel cell device (SOFC) of the present embodiment, execution at the time of restart in the "Restart Mode 2" of the sequence "Restart ATR," "Normal Startup ATR," and "Normal Startup SR" as the temperature of the reformer 20 rises from the "Time of Ignition" enables a stable temperature recovery without inducing temperature drops in the individual fuel cell units 16.

Furthermore, in the restart control according to the second example of the restart control flow of the solid oxide fuel cell device (SOFC) of the present embodiment, by executing a "Restart ATR" of the "Restart Mode 2," in which the "Fuel Flow Amount" is greater than in the "Normal Startup Mode 1" "Normal Startup ATR," as an alternative when skipping the "Normal Startup POX" of the "Normal Startup Mode 1," temperature drops in the reformer 20 and the fuel cell stack 14 can be restrained and rapid temperature recovery achieved even if water is being supplied in a relatively low temperature band, due to the execution of the "Restart ATR," in which the combustion temperature is kept high.

In addition, when using the restart control according to a second example of the restart control flow of the solid oxide fuel cell device (SOFC) of the present embodiment, by executing the "Restart ATR" of the "Restart Mode 2" in which the "Reforming Air Flow Amount" is less than the "Reforming Air Flow Amount" in the "Normal Startup POX" of the "Normal Startup Mode," as an alternative when skipping the "Normal Startup Mode 1" "normal POX" operating state and more than the "Reforming Air Flow Amount" (4.0 L/min) in the "Normal Startup Mode 1" "Normal Startup ATR" operating state, exothermal reactions from partial oxidation reactions increase, so that the reformer 20 and fuel cell stack 14 temperatures can be more quickly raised.

Furthermore, when using the restart control according to the second example of the restart control flow of the solid oxide fuel cell device (SOFC) of the present embodiment, by executing the "Restart ATR" of the "Restart Mode 2" in which the "Water Flow Amount" is less than in the "Normal Startup ATR" of the "Normal Startup Mode 1" as an alternative when skipping the "Normal Startup ATR" of the "Normal Startup Mode 1," temperature drops in the reformer 20 and the fuel cell stack 14 can be restrained, and residual heat transferred and ATR executed, even in the relatively low temperature band, so that a stable rise in temperature can be achieved.

Figure 14:
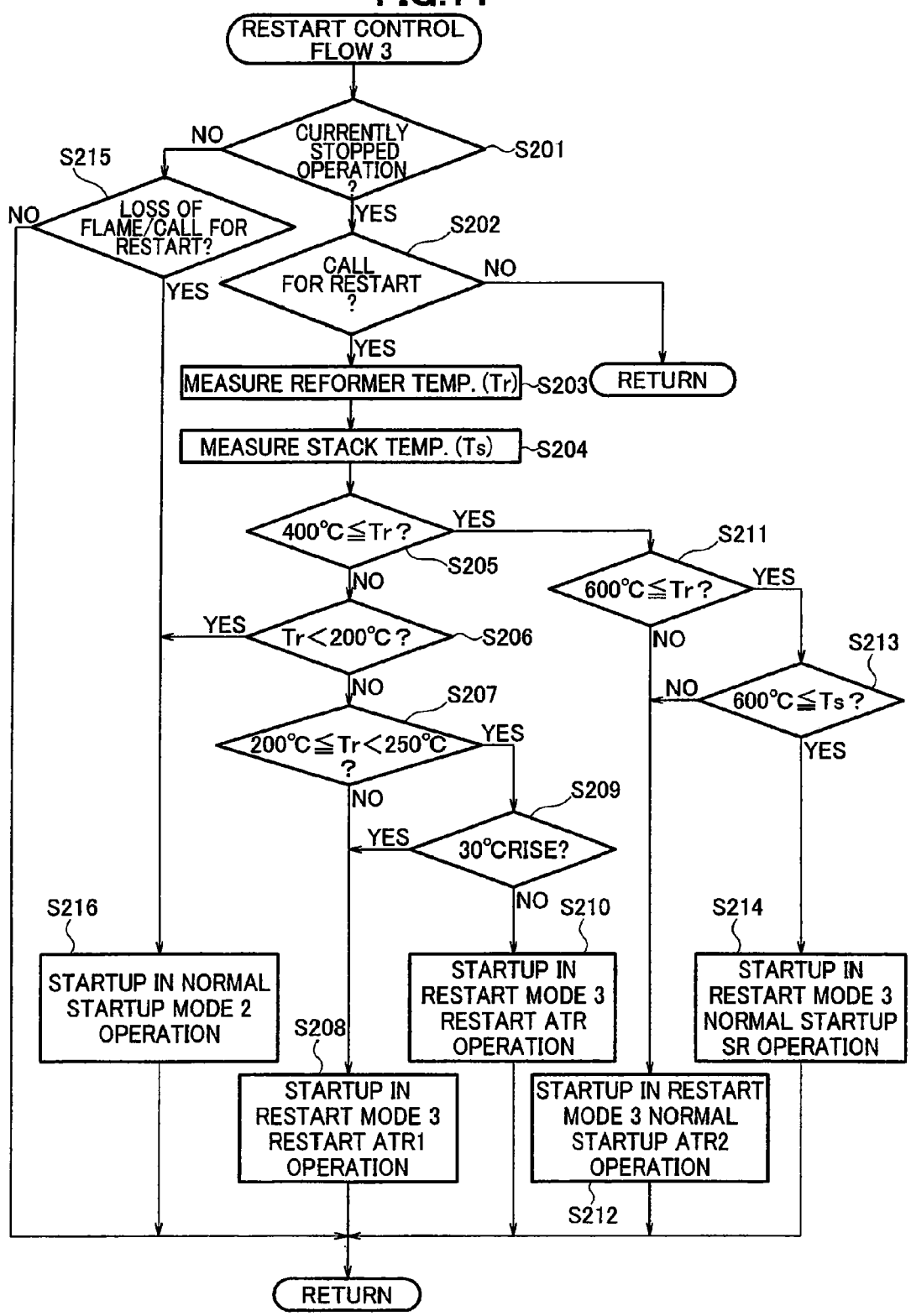
FIG. 14 is a flowchart showing a third example of restart control flow for restarting a solid oxide fuel cell device (SOFC) according to an embodiment of the present invention.

Next, referring to FIG. 14, specifics of a third example of a restart control flow in a solid oxide fuel cell device (SOFC) according to the present embodiment will be explained. FIG. 14 is a flowchart showing a third example of restart control flow (restart control flow 3) for restarting a solid oxide fuel cell device (SOFC) according to an embodiment of the present invention. In FIG. 14, an S denotes the various steps.

First, a determination is made in S201 as to whether the fuel cell module 2 operation is stopped; if stopped, the system advances to S202 and determines whether a restart is requested.

If it is determined in S202 that a restart is requested, the system advances to S203, and after measuring the reformer 20 temperature Tr using the reformer temperature sensor 148, the system advances to S204 and the stack temperature Ts, which is the temperature in the vicinity of the fuel cell stack 14 (i.e., the individual fuel cells 84 themselves) is measured by generating chamber temperature sensor 142.

Next, advancing to S205, a determination is made as to whether the reformer temperature Tr is equal to or greater than 400° C.

In S205, if it is determined that the reformer temperature Tr is not equal to or greater than 400° C., the system advances to S206 and determines if the reformer temperature Tr is less than 200° C.

In S206, if it is determined that the reformer temperature Tr is not less than 200° C., i.e., that the reformer temperature Tr is equal to or greater than 200° C. and less than 400° C., the system advances to S207, and a determination is made as to whether the reformer temperature Tr is equal to or greater than 200° C. and less than 250° C.

In S207, if it is determined that the reformer temperature Tr is not equal to or greater than 200° C. and less 250° C., i.e., that the reformer temperature Tr is equal to or greater than 250° C. and less than 400° C., the system advances to S208, and a "Restart ATR 1" according to "Restart Mode 3" in the data table shown in FIG. 9(B) is executed.

On the other hand, if it is determined in S207 that the reformer temperature Tr is equal to or greater than 200° C. and less 250° C., the system advances to S209, and a determination is made as to whether the reformer temperature Tr has risen by 30° C. in a reformer temperature Tr range of 200° C. or above to less than 250° C.

In S209, if it is determined that the reformer temperature Tr has risen by 30° C. in a range of 200° C. or above to less than 250° C., the system advances to S208, and a "Normal Startup ATR1" under the "Restart Mode 3" is executed.

On the other hand, if it is determined in S209 that the reformer temperature has not risen by 30° C. in a range of 200° C. or above to less than 250° C., the system advances to S210, and a "Restart ATR" under the "Restart Mode 3" is executed.

Also, if it is determined in S205 that the reformer temperature Tr is equal to or greater than 400° C., the system advances to S211 and determines if the reformer temperature Tr is equal to or greater than 600° C.

If it is determined in S211 that the reformer temperature Tr is not equal to or greater than 600° C., i.e., that the reformer temperature Tr is equal to or greater than 400° C. and less than 600° C., the system advances to S212, and a "Normal Startup ATR 2" is executed according to the "Restart Mode 3" in the data table shown in FIG. 9(B).

On the other hand, if it is determined in S211 that the reformer temperature Tr is equal to or greater than 600° C., the system advances to S213 and determines whether the stack temperature Ts measured by the generating chamber temperature sensor 142 is equal to or greater than 600° C.

If, in S213, a determination is made that the stack temperature Ts is equal to or greater than 600° C., the system advances to S214, and a "Normal Startup SR" is executed according to the "Restart Mode 3" in the data table shown in FIG. 9(B). On the other hand, if it is determined in S213 that the stack temperature Ts is not equal to or greater than 600° C., i.e., that the stack temperature Ts is less than 600° C. notwithstanding that the reformer temperature Tr is equal to or greater than 600° C., the system advances to S212, and a "Normal Startup ATR 2" is executed according to the "Restart Mode 3" in the data table shown in FIG. 9(B).

Next, a determination is made in S201 as to whether the fuel cell module 2 operation is stopped; if not stopped, the system advances to S215 and determines whether there is a request for a restart based on loss of flame during startup.

If it is determined in S215 that there is call for restart based on loss of flame, and there is a determination in S206 that the reformer temperature Tr(t) is less than 200° C., the system advances to S216 like the first example, and since a restart table cannot be used, a restart is executed according to the "Normal Startup Mode 2" in the data table shown in FIG. 9(B).

Figure 15:
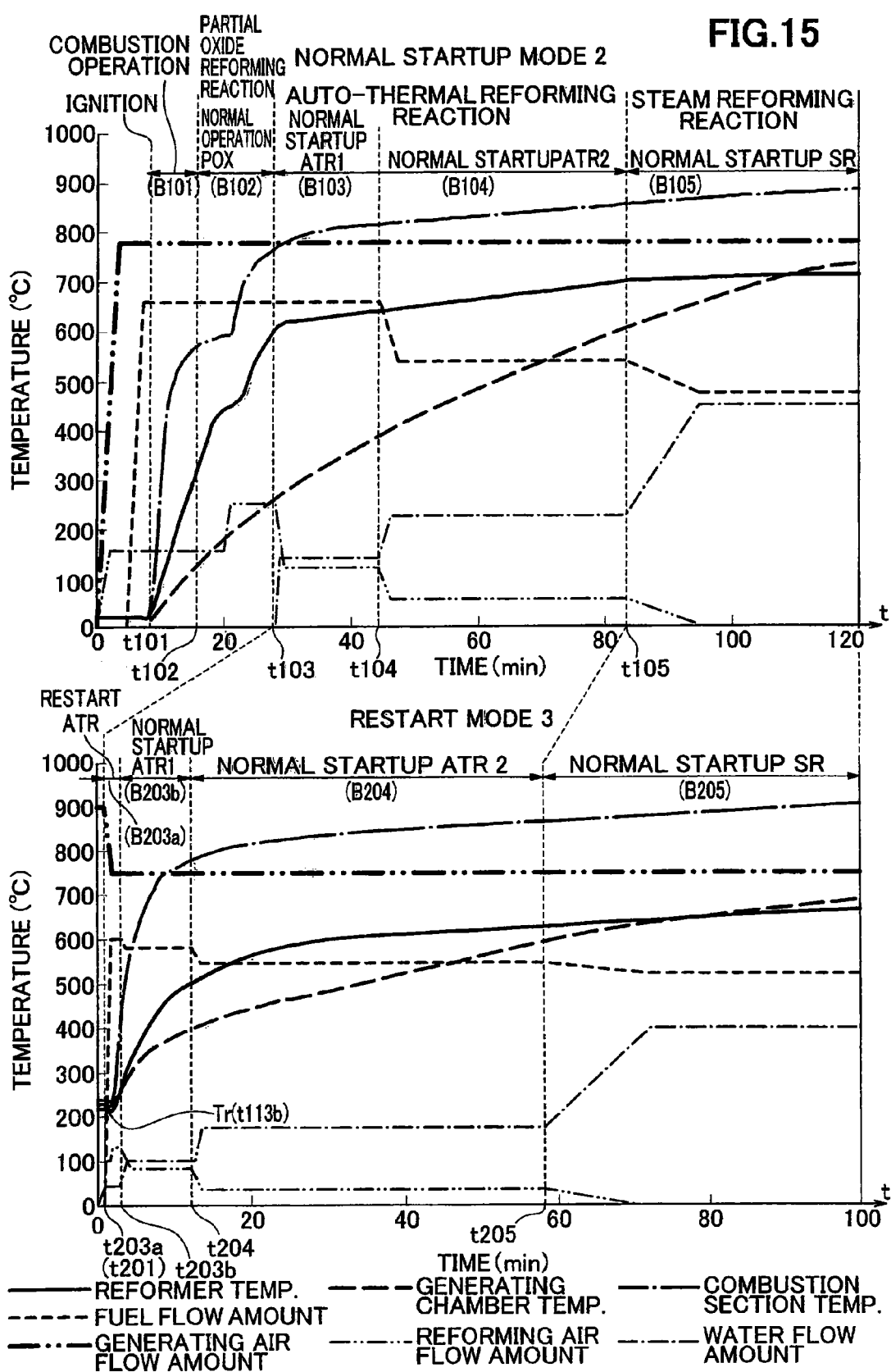
FIG. 15 is a diagram comparing a timing chart showing operations when restart is executed according to the third example restart control flow for the solid oxide fuel cell device (SOFC) according to the embodiment of the present invention shown in FIG. 10 to a timing chart showing normal startup operations.

Next, referring to FIG. 9(B), FIG. 14, and FIG. 15, the operation when a restart is executed based on a third example of the restart control flow of the solid oxide fuel cell device (SOFC) according to this embodiment as shown in FIG. 14 will be specifically explained.

FIG. 15 is a diagram comparing a timing chart showing operation when restart is executed based on a third example of the restart control flow in a solid oxide fuel cell device (SOFC) according to the embodiment of the present invention shown in FIG. 14 to a timing chart showing normal startup operations.

Note that the timing chart in the upper portion of FIG. 15 shows the normal startup operation of a solid oxide fuel cell device (SOFC) when the "Normal Startup Mode 2" in the data table shown in FIG. 9(B) is executed, and the timing chart in the bottom portion of FIG. 15 shows the restart operation of a solid oxide fuel cell device (SOFC) when the "Restart Mode 3" in the data table shown in FIG. 9(B) is executed.

For an explanation of the restart operation based on the third example restart control flow (restart flow 3) of the solid oxide fuel cell device (SOFC) of the present embodiment, referring only to the data table regarding the "Normal Startup Mode 2" and "Restart Mode 3" shown in FIG. 9(B), the restart operation under "Restart Mode 3" of the solid oxide fuel cell device (SOFC) of the present embodiment shown in FIG. 15 is explained by comparing it with the operation in normal startup according to the "Normal Startup Mode 2."

Next, as shown in FIG. 9(B), restart control according to "Restart Mode 2" is executed starting from "Time of Ignition" in the sequence "Combustion Operation," "Normal Startup POX," "Normal Startup ATR 1," "Normal Startup ATR 2," and "Normal Startup SR." Here, with respect to the times t on the horizontal axis of the "Restart Mode 2" timing chart in FIG. 15, the time of the "Time of Ignition" is referred to as t101, and the times at which the transitions occur in the sequence "Combustion Operation," "Normal Startup POX,"

"Normal Startup ATR 1," "Normal Startup ATR 2," and "Normal Startup SR" are referred to respectively as t102, t103, t104, and t105.

The operating state shown in FIG. 9(B) referred to as "Normal Startup Mode 2" "Time of Ignition" is the state which turns on the ignition device 83, ignites the fuel gas, and starts combustion; if the temperature of the reformer 20 detected by the reformer temperature sensor 148 at the time of this ignition (t=t101) is deemed "temperature at time of ignition Tr(t101)," then this temperature at time of ignition Tr(t101) is lower than the temperature of the reformer 20 at the start of POX (t=t102)) (the "POX Starting Temperature Tr(t102)" below) (=300° C.).

Next, the "Combustion Operation" operating state of the "Normal Startup Mode 2" is one in which, after starting combustion following ignition of the fuel gas, startup is controlled in a control band (the "Combustion Operation Control Band B101" below) for executing a combustion operation by heating the reformer 20 through combustion of this fuel gas; this is executed in a temperature band W101 (Tr<300° C.) in which the temperature of the reformer 20 detected by the reformer temperature sensor 148 is between the temperature at the time of ignition Tr(t101) up to a temperature below the POX starting temperature Tr(t102) (=300° C.).

Next, the operating state referred to as the "Normal Startup POX" of the "Normal Startup Mode 2" is one in which, when in a temperature band (the "Normal Startup POX temperature band W102 (300° C.≦Tr(t)<600° C.; Ts<250° C.) in which the temperature Tr(t) of the reformer 20 detected by the reformer temperature sensor 148 is equal to or greater than the POX starting temperature Tr(t102) (=300° C.) and less than the temperature at which SR is possible (the "SR Feasible Temperature Tr(t103)" below) (=600° C.) (i.e., 300° C.≦Tr(t)<600° C., Ts<250° C.), startup is controlled in a control band (the "Normal Startup Mode POX Control Band B102" below) in which POX is executed by heating the reformer 20 using the reaction heat from POX and the combustion heat of the fuel gas.

Next, the operating state referred to as the "Normal Startup ATR 1" of the "Normal Startup Mode 2," is one in which, when the temperature Tr(t) of the reformer 20 detected by the reformer temperature sensor 148 is in a temperature band starting at the temperature at which SR is possible Tr(t103) (=600° C.) and less than a predetermined steady state temperature Tr(t104) (the "Normal Startup ATR1 Temperature Band W103" below), and the stack temperature Ts measured by the generating chamber temperature sensor 142 is in a band equal to or greater than 250° C. and less than 400° C. (600° C.≦Tr<650° C., 250° C.≦Ts<600° C.), the reaction heat from POX, the combustion heat of fuel gas, and the absorption of heat by SR are controlled to heat the reformer 20, and startup is controlled in the control band for executing ATR (the "normal startup mode ATR1 control band B103" below).

Next, the operating state referred to as the "Normal Startup ATR 2" of the "Normal Startup Mode 2," is one in which, when the temperature Tr(t) of the reformer 20 detected by the reformer temperature sensor 148 is in a temperature band equal to or greater than a predetermined reformer temperature Tr(t104) and less than a predetermined steady state temperature Tr(t105) (the "Normal Startup ATR2 temperature band W104" below), and the stack temperature Ts measured by the generating chamber temperature sensor 142 is in a band equal to or greater than 400° C. and less than 600° C. (600° C.≦Tr<650° C., 400° C.≦Ts<600° C.), the reaction heat from POX, the combustion heat of fuel gas, and the absorption of heat by SR are controlled to heat the reformer 20, and startup is controlled in the control band for executing an ATR (the "Normal Startup Mode ATR2 Control Band B104" below) different from the "Normal Startup ATR1" of the "Normal Startup Mode 2."

With respect to the points of difference between the "Normal Startup ATR1" and "Normal Startup ATR2" of the "Normal Startup Mode 2," the transition temperature conditions for their respective reformer temperatures Tr and stack temperatures Ts differ as explained above, and the normal startup ATR1 temperature band W103 (600° C.≦Tr<650° C., 250° C.≦Ts<400° C.) is on the low temperature side of the normal startup ATR2 temperature band W104 (600° C.≦Tr<650° C., 400° C.≦Ts<600° C.); in addition to these differences, a characteristic difference is that the "Water Flow Amount" of the "Normal Startup ATR1" is set to be less than the "Water Flow Amount" of the "Normal Startup ATR2."

Next, the operating state referred to as "Normal Startup SR" of the "Normal Startup Mode 2" is one in which, when the temperature Tr(t) of the reformer 20 detected by the reformer temperature sensor 148 is at a predetermined steady state temperature Tr(t105), and the stack temperature Ts measured by the generating chamber temperature sensor 142 is equal to or greater than 600° C., startup is controlled in the control band (the "Normal Startup Mode SR Control Band B105" below) in which SR is executed.

Next, as shown in FIG. 9(B), restart control according to "Restart Mode 3" is executed starting from "Time of Ignition" in the sequence "Restart ATR," "Normal Startup ATR1," "Normal Startup ATR2," and "Normal Startup SR." Here, with respect to the times t on the horizontal axis of the "Restart Mode 3" timing chart in FIG. 15, the time of the "Time of Ignition" is referred to as t201, and the times at which the transitions occur in the sequence "Restart ATR," "Normal Startup ATR 1," "Normal Startup ATR 2," and "Normal Startup SR" are referred to respectively as t203a, t203b, t204, and t205.

The operating state shown in FIG. 9(B) and referred to as "Time of Ignition" under "Restart Mode 3" is one in which, when a restart is requested while the fuel cell module 2 operation is stopped, a normal startup based on the "Normal Startup Mode 2" is executed starting with the "Combustion Operation" following ignition in the "Normal Startup Mode 2" (See FIG. 12, S206 and S216) when the temperature Tr(t) of the reformer 20 detected by the reformer temperature sensor 148 is less than a predetermined temperature Tr(t201) (=200° C.), which is below the above-described POX starting temperature Tr(t102) (=300° C.) in the normal startup mode POX control band B102 of the "Normal Startup Mode 2."

On the other hand, when the reformer 20 temperature Tr(t201) is equal to or greater than a predetermined temperature (=200° C.), there is a transition to the "Restart ATR" operating state of the "Restart Mode 3" (see FIG. 14, S210) immediately after the ignition device 83 turns on and the fuel gas is ignited.

Next, the operating state referred to as "Restart ATR" of the "Restart Mode 3" shown in FIG. 9(B) and S210 in FIG. 14 controls restart in a control band (the "Restart Mode ATR Control Band B203a" below) for executing an ATR different from the "Normal Startup POX," "Normal Startup ATR1," and "Normal Startup ATR2" under the "Normal Startup Mode 2."

More specifically, the temperature band in which the "Restart ATR" is executed in the restart mode ATR control band B203a of the "Restart Mode 3" (the "Restart ATR temperature band W203a" below) is a lower temperature band (200° C.≦Tr(t)<250° C.) than the normal startup POX temperature band W102 (300° C.≦Tr(t)<600° C.; Ts<250° C.) in which the "Normal Startup POX" is executed in the normal startup mode POX control band B 102 of the "Normal Startup Mode 2."

Also, the "Fuel Flow Amount" in the "Restart ATR" operating state of the "Restart Mode 3" is 5.5 L/min, which is less than the "Fuel Flow Amount" in the "Normal Startup POX" operating state of the "Normal Startup Mode 2" (6.0 L/min).

In addition, the "Reforming Air Flow Amount" in the "Restart ATR" operating state of the "Restart Mode 3" is 12.0 L/min, which is less than the "Reforming Air Flow Amount" in the "Normal Startup POX" operating state of the "Normal Startup Mode 2" (18.0 L/min).

Also, the "Water Flow Amount" in the "Restart ATR" operating state of the "Restart Mode 3" is 1.0 cc/min, which is less than the "Water Flow Amount" in the "Normal Startup ATR1" operating state of the "Normal Startup Mode 2" (2.0 cc/min).

Furthermore, as soon as it is confirmed that the reformer temperature Tr has risen 30° C. in a range of 200° C. to less than 250° C., the "Restart ATR" of the "Restart Mode 3" transitions to execution of "Normal Startup ATR1" under the "Normal Startup Mode 3."

Next, the operating state referred to as "Restart ATR1" of the "Restart Mode 3" in FIG. 9(B) and S08 in FIG. 14 controls restart in a control band (the "Restart Mode ATR control band B203$a$" below) for executing an ATR different from the "Normal Startup ATR1" in the "Normal Startup Mode 2."

More specifically, the temperature band in which the "Restart ATR1" is executed in the restart mode ATR control band B203$b$ of "Restart Mode 3" (the "Restart ATR temperature band W203$b$" below) is a temperature band (250° C.≦Tr(t)<400° C., Ts<400° C.) on the high temperature side above the restart ATR temperature band W203$a$ (200° C.≦Tr(t)<250° C.) in which the "Restart ATR" of the "Restart Mode 3" is executed.

In the restart mode ATR control band B203$b$ of the "Restart Mode 3," the "Normal Startup ATR1" of the "Restart Mode 3" is executed without executing the "Normal Startup POX" of the "Normal Startup Mode 2" even though, in particular, the portion greater than or equal to 300° C. and less than 400° C. within the restart mode ATR1 temperature band W203$b$ of the "Restart Mode 3" (250° C.≦Tr(t)<400° C., Ts<400° C.) overlaps with a part of the normal startup POX temperature band W102 (300° C.≦Tr(t)<600° C., Ts<250° C.) of the "Normal Startup Mode 2."

In addition, the "Reforming Air Flow Amount" and "Water Flow Amount" in the "Restart ATR1" operating state of the "Restart Mode 3" are the same as the "Reforming Air Flow Amount" and "Water Flow Amount" in the "Normal Startup ATR1" operating state of the "Normal Startup Mode 2." Also, the "Fuel Flow Amount" in the "Restart Mode 3" "Restart ATR1" operating state is 5.0 L/min, which is less than the "Fuel Flow Amount" in the "Normal Startup POX" and "Normal Startup ATR1" operating states of the "Normal Startup Mode 2" (6.0 L/min).

Next, the operating state shown in FIG. 9(B) and S212 of FIG. 10 and referred to as the "Normal Startup ATR2" of the "Normal Startup Mode 3" is one in which, when within the normal startup POX temperature band W102 (300° C.≦Tr(t) <600° C.; Ts<250° C.) of the "Normal Startup Mode 2," and within a temperature band (the "Normal Startup ATR2 temperature band W204" below) (400° C.≦Tr<600° C., 400° C.≦Ts<600° C.) on the high temperature side of the normal startup ATR1 temperature band W203$b$ of the "Restart Mode 3" (250° C.≦Tr(t)<400° C., Ts<400° C.), restart is controlled in a control band (the "Restart Mode ATR Control Band B204" below) in which the same ATR is executed as the "Normal Startup ATR2" under the "Normal Startup Mode 2."

Next, the operating state referred to as "Normal Startup SR" of the "Restart Mode 3" shown in FIG. 9(B) and S214 in FIG. 14, under the same conditions as the "Transition Temperature Conditions" in the "Normal Startup SR" of the "Normal Startup Mode 2," controls restart in the control band (the "Restart Mode SR Control Band B205" below) for executing the same SR as the "Normal Startup SR" in the "Normal Startup Mode 2."

Next it is focused particularly on the above-described control band (the "Restart Mode Control Band of the "Restart Mode 3" below) for the execution, under "Restart Mode 3," starting from "Restart ATR," via "Normal Startup ATR1," to "Normal Startup ATR2," comparing a restart under this restart mode control band with a normal startup under the "Normal Startup Mode 2."

When, in the restart mode control band of the "Restart Mode 3," the reformer 20 temperature Tr(t) is within the normal startup POX temperature band W102, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of the "Normal Startup POX" in the normal startup mode POX control band B102 according to the "Normal Startup Mode 2" is skipped due to the active utilization of residual heat remaining in the fuel cell stack 14 or the reformer 20, even if the reformer 20 temperature Tr(t) is within the normal startup POX temperature band W102.

Then, instead of this skipped "Normal Startup POX" of the "Normal Startup Mode 2," in the restart ATR temperature band W203$a$ of the "Restart Mode 3" (200° C.≦Tr(t)<250° C.) a "Restart ATR" is executed in which the "Reforming Air Flow Amount" is less than in the "Normal Startup POX" of the "Normal Startup Mode 2," and the "Water Flow Amount" is less than in the "Normal Startup ATR1" of the "Normal Startup Mode 2," and as soon as a rise of 30° C. with the restart ATR temperature band W203$a$ (200° C.≦Tr<250° C.) in the "Restart ATR" of the "Restart Mode 3" is confirmed, a "Normal Startup ATR1" in the "Restart Mode 3" is executed, following which, as the temperature rises, execution proceeds under "Restart Mode 3" via "Restart ATR2" to "Normal Startup SR."

On the other hand, in the series of restart mode control bands in "Restart Mode 3," when a restart has been performed based on loss of flame at startup, the possibility is low that residual heat remaining in the fuel cell stack 14 or the reformer 20 can be used even if the reformer 20 temperature Tr(t) rose from the low temperature side of the restart ATR temperature band W203$a$ of the "Restart Mode 3" (200° C.≦Tr(t)<250° C.) and was within these restart ATR temperature bands W203$a$ or W203$b$ (250° C.≦Tr(t)<400° C., Ts<400° C.), therefore "Restart ATR" and "Normal Startup ATR1" in the restart mode control band of the "Normal Startup Mode 3" are prohibited, and execution starts with the "Combustion Operation" after ignition in "Normal Startup Mode 2" (see FIG. 14, S215 and S216).

Furthermore, the time t205 over which the transition from the "Normal Startup ATR2" of the "Restart Mode 3" to the "Normal Startup SR" occurs is also shorter than the time t105 over which the transition from the "Normal Startup ATR2" of the "Normal Startup Mode 2" to the "Normal Startup SR" occurs, and the startup time for restart is shorter compared to the startup time for normal startup.

In the restart control according to a third example of the restart control flow of the solid oxide fuel cell device (SOFC)

in the above described embodiment, when the reformer 20 temperature Tr(t) is within the normal startup POX temperature band W102 temperature band, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of the "Normal Startup POX" in the normal startup mode POX control band B102 of the "Normal Startup Mode 2" can be skipped due to the active utilization of residual heat remaining in the fuel cell stack 14 or the reformer 20, even if the reformer 20 temperature Tr(t) is within the normal startup POX temperature band W102. Then, instead of this skipped "Normal Startup POX" of the "Normal Startup Mode 2," a "Restart ATR" in which the "Water Flow Amount" is less than in the "Normal Startup ATR1" of the "Normal Startup Mode 2" can be executed in the restart ATR temperature band W203a of the "Normal Startup Mode 3" (200° C.≦Tr(t)<250° C.), and the normal startup mode ATR control band B103 in the "Normal Startup Mode 2" can be expanded in the normal startup ATR temperature band W203b (250° C.≦Tr(t)<400° C., Ts<400° C.) to execute a "Normal Startup ATR1" of the "Restart Mode 3" in which the "Water Flow Amount" is less than in the "Normal Startup ATR2" of the "Normal Startup Mode 2."

As a result, when compared to the case in which a normal startup POX is executed as is without skipping the execution of the "Normal Startup POX" in the normal startup mode POX control band B102 of the "Normal Startup Mode 2," oxidation of the fuel cells 84 and the burden on the fuel cells 84 caused by anomalously high temperatures can be reduced, and the durability of the fuel cells 84 improved.

Since the amount of heat is greater in ATR than in POX, the "Normal Startup POX" in the "Normal Startup Mode 2" can be skipped and the "Restart Mode 3" executed by actively utilizing the residual heat remaining in the fuel cell stack 14 or the reformer 20, so that by executing the sequence from "Time of Ignition" to "Restart ATR," "Normal Startup ATR1," "Normal Startup ATR2," and "Normal Startup SR," the transition from the time of ignition to ATR and SR can be speeded up. As a result, compared to the hypothetical case in which, upon startup, a "Normal Startup POX" of the "Normal Startup Mode 2" is executed within a temperature band corresponding to the normal startup POX temperature band W102 (300° C.≦Tr(t)<600° C.; Ts<250° C.) in a "Normal Startup Mode 2," the startup time needed to for restart can be greatly shortened.

On the other hand, when a restart is executed based on loss of flame at startup, for example, a "Restart ATR" and "Normal Startup ATR1" in the restart mode control band of the "Normal Startup Mode 3" can be prohibited, therefore damage to the individual fuel cells 16 can be restrained.

Furthermore, in the restart control according to a third example of the restart control flow of the solid oxide fuel cell device (SOFC) of the present embodiment, execution at the time of restart in the "Restart Mode 3" of the sequence "Restart ATR," "Normal Startup ATR1," "Normal Startup ATR2," and "Normal Startup SR" as the temperature of the reformer 20 rises from the "Time of Ignition" enables a stable temperature recovery without inducing temperature drops in the individual fuel cell units 16.

Moreover, when using the restart control according to the third example of the restart control flow of the solid oxide fuel cell device (SOFC) of the present embodiment, because the "Restart ATR" executed before the transition to the "Restart ATR1" of the "Restart Mode 3" is executed within the temperature band W203a (200° C.≦Tr(t)<250° C.) on the low temperature side of the normal startup POX temperature band W102 (300° C.≦Tr(t)<600° C.; Ts<250° C.) in which the "Normal Startup POX" of the "Normal Startup Mode 2" is executed, in a state which is less abundant than the "Fuel Flow Amount" and "Reforming Air Flow Amount" in the normal startup POX of the "Normal Startup Mode 2," and less abundant than the "Water Flow Amount" in the "Normal Startup ATR1," of the "Normal Startup Mode 2," therefore oxidation of the individual fuel cell stacks 14 can be prevented, sudden temperature drops in the individual fuel cell stacks 14 can be prevented, and temperature increases in the individual fuel cell stacks 14 can be promoted.

In addition, when using the restart control according to the third example of the restart control flow of the solid oxide fuel cell device (SOFC) of the present embodiment, in the "Restart ATR" control band of the "Restart Mode 3," ATR is actively executed by changing to "Normal Startup ATR1" at the point in time when, after executing an ATR with reduced load on the individual fuel cells 84 by use of the "Restart ATR" of the "Restart Mode 3," the desired temperature rise has been achieved, therefore a stable rise can be achieved without inducing a temperature drops in the reformer 20 and the individual fuel cell unit 16.

Also, when using the restart control according to the third example of the restart control flow of the solid oxide fuel cell device (SOFC) of the present embodiment, by expanding the normal startup mode ATR control band B103 under the "Normal Startup Mode 2" in the normal startup ATR1 temperature band W203b (250° C.≦Tr(t)<400° C.; Ts<400° C.) and executing a "Normal Startup ATR1" of the "Restart Mode 3" with a "Water Flow Amount" reduced from that of the "Normal Startup ATR2" of the "Normal Startup Mode 2" instead of the skipped "Normal Startup POX" of the "Normal Startup Mode 2" in the restart mode control band of the "Restart Mode 3," it becomes possible to execute an ATR at a relatively low temperature band of the POX temperature band, which allows for restraint of sudden drops in the reformer 20 and fuel cell stack 14 temperatures, and recovery of the cell temperatures using residual heat.

Figure 16:
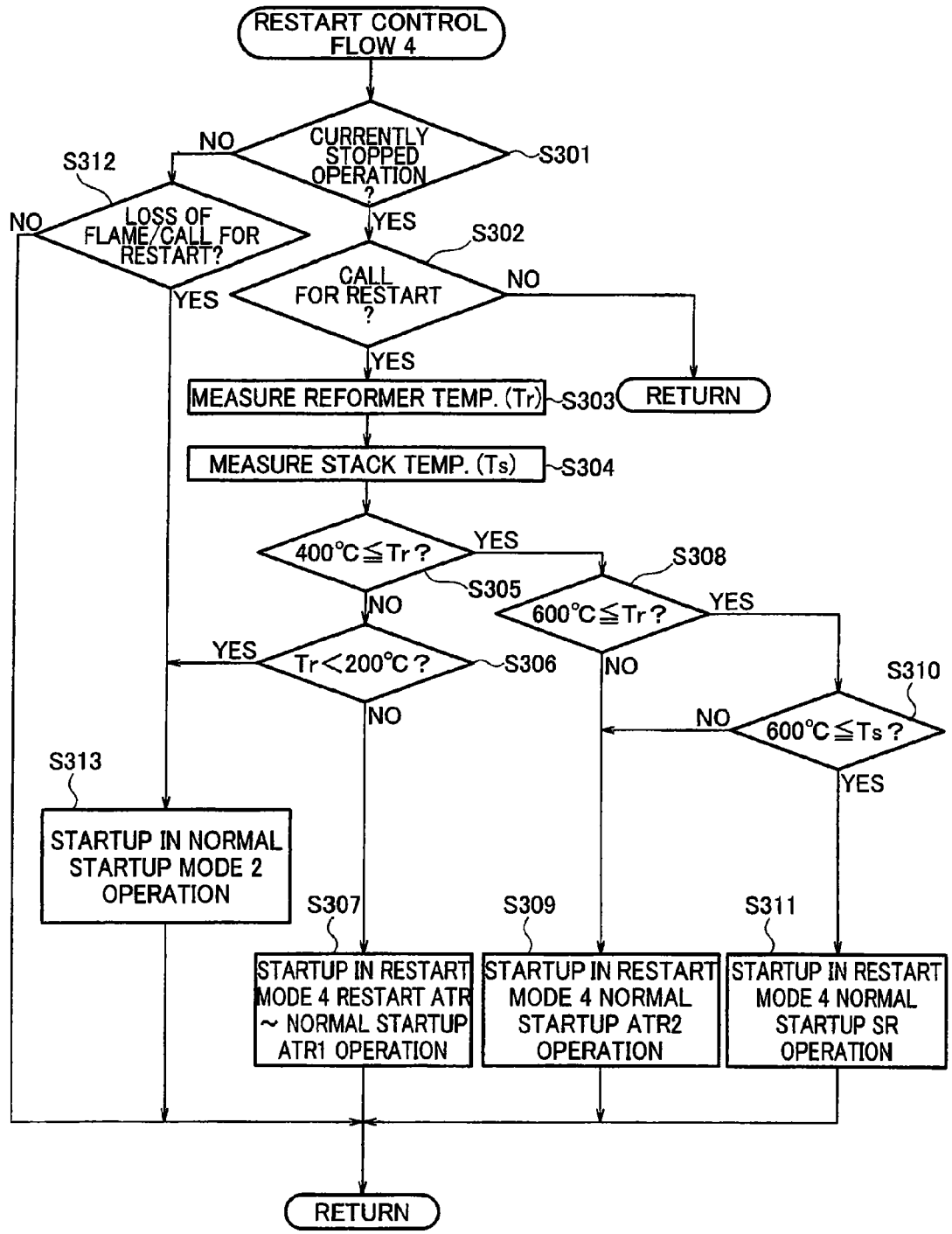
FIG. 16 is a flowchart showing a fourth example of restart control flow for restarting a solid oxide fuel cell device (SOFC) according to an embodiment of the present invention.

Next, referring to FIG. 16, specifics of a fourth example of a restart control flow in a solid oxide fuel cell device (SOFC) according to the present embodiment will be explained. FIG. 16 is a flowchart showing a fourth example of restart control flow (restart control flow 4) for restarting a solid oxide fuel cell device (SOFC) according to an embodiment of the present invention. In FIG. 16, an S denotes the various steps.

First, a determination is made in S301 as to whether the fuel cell module 2 operation is stopped; if stopped, the system advances to S302 and determines whether a restart is requested.

If it is determined in S302 that a restart is requested, the system advances to S303, and after measuring the reformer 20 temperature Tr using the reformer temperature sensor 148, the system advances to S304 and measures the stack temperature Ts, which is the temperature in the vicinity of the fuel cell stack 14 (i.e., the individual fuel cells 84 themselves) using generating chamber temperature sensor 142.

Next, advancing to S305, a determination is made as to whether the reformer temperature Tr(t) is equal to or greater than 400° C.

In S305, if it is determined that the reformer temperature Tr(t) is not equal to or greater than 400° C., the system advances to S306 and determines if the reformer temperature Tr(t) is less than 200° C.

In S306, if it is determined that the reformer temperature Tr(t) is not less than 200° C., i.e., that the reformer temperature Tr(t) is equal to or greater than 200° C. and less than 400°

C., the system advances to S307, and for the execution from the "Restart ATR" to the "Normal Startup ATR1" under the "Restart Mode 4" in the data table shown in FIG. 9(B), that execution is performed by maintaining fixed amounts, without changing the predetermined "Fuel Flow Amount," "Reforming Air Flow Amount," or "Water Flow Amount."

Also, if it is determined in S305 that the reformer temperature Tr(t) is equal to or greater than 400° C., the system advances to S308 and determines if the reformer temperature Tr(t) is equal to or greater than 600° C.

If it is determined in S308 that the reformer temperature Tr(t) is not equal to or greater than 600° C., i.e., that the reformer temperature Tr(t) is equal to or greater than 400° C. and less than 600° C., the system advances to S309, and a "Normal Startup ATR2" is executed based on the "Restart Mode 4" in the data table shown in FIG. 9(B).

On the other hand, if it is determined in S308 that the reformer temperature Tr is equal to or greater than 600° C., the system advances to S310 and determines whether the stack temperature Ts measured by the generating chamber temperature sensor 142 is equal to or greater than 600° C.

If, in S310, a determination is made that the stack temperature Ts is equal to or greater than 600° C., the system advances to S311, and a "Normal Startup SR" is executed according to the "Restart Mode 4" in the data table shown in FIG. 9(B).

On the other hand, if it is determined in S310 that the stack temperature Ts is not equal to or greater than 600° C., i.e., that the stack temperature Ts is less than 600° C. notwithstanding that the reformer temperature Tr(t) is equal to or greater than 600° C., the system advances to S309, and a "Normal Startup ATR2" is executed based on the "Restart Mode 4" in the data table shown in FIG. 9(B).

Next, a determination is made in S301 as to whether the fuel cell module 2 operation is stopped; if not stopped, the system advances to S312 and determines whether there is a request for a restart based on loss of flame during startup.

If it is determined in S312 that there is call for restart based on loss of flame, and there is a determination in S306 that the reformer temperature Tr(t) is less than 200° C., the system advances to S313 like the first example, and since a restart table cannot be used, a restart is executed based on the "Normal Startup Mode 2" in the data table shown in FIG. 9(B).

Figure 17:
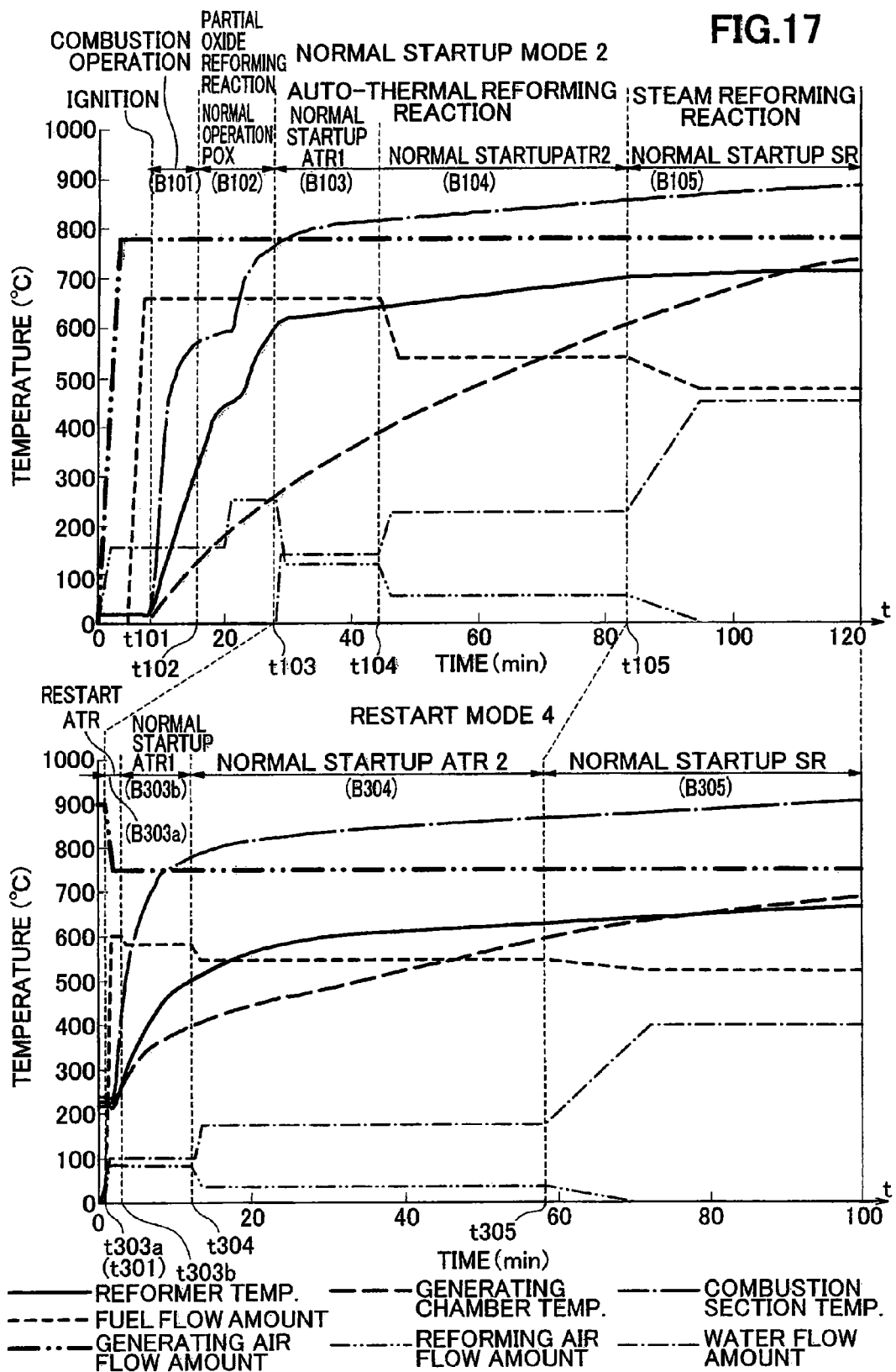
FIG. 17 is a diagram comparing a timing chart showing operations when restart is executed according to the fourth example restart control flow for the solid oxide fuel cell device (SOFC) according to the embodiment of the present invention shown in FIG. 16 to a timing chart showing normal startup operations.

Next, referring to FIG. 9(B), FIG. 16, and FIG. 17, the operation when a restart is executed based on a fourth example of the restart control flow of the solid oxide fuel cell device (SOFC) according to this embodiment as shown in FIG. 16 will be specifically explained.

FIG. 17 is a diagram comparing a timing chart showing operation when restart is executed based on a fourth example of the restart control flow in a solid oxide fuel cell device (SOFC) according to the embodiment of the present invention shown in FIG. 16 to a timing chart showing normal startup operations.

Note that the timing chart in the upper portion of FIG. 17 shows the normal startup operation of a solid oxide fuel cell device (SOFC) when the "Normal Startup Mode 2" in the data table shown in FIG. 9(B) is executed, and the timing chart in the bottom portion of FIG. 17 shows the restart operation of a solid oxide fuel cell device (SOFC) when the "Restart Mode 4" in the data table shown in FIG. 9(B) is executed.

For an explanation of the restart operation based on the fourth example restart control flow (restart flow 4) of the solid oxide fuel cell device (SOFC) of the present embodiment, referring only to the data table regarding the "Normal Startup Mode 2" and "Restart Mode 4" shown in FIG. 9(B), the restart operation under "Restart Mode 4" of the solid oxide fuel cell device (SOFC) of the present embodiment shown in FIG. 17 is explained by comparing it with the operation in normal startup according to the "Normal Startup Mode 2."

First, as shown in FIG. 9(B), restart control according to "Restart Mode 4" is executed starting from "Time of Ignition" in the sequence "Restart ATR," "Normal Startup ATR1," "Normal Startup ATR2," and "Normal Startup SR." Here, with respect to the times t on the horizontal axis of the "Restart Mode 4" timing chart in FIG. 17, the time of the "Time of Ignition" is referred to as t301, and the times at which the transitions occur in the sequence "Restart ATR," "Normal Startup ATR 1," "Normal Startup ATR 2," and "Normal Startup SR" are referred to respectively as t303a, t303b, t304, and t305.

The operating state shown in FIG. 9(B) and referred to as "Time of Ignition" under "Restart Mode 4" is one in which, when a restart is requested while the fuel cell module 2 operation is stopped, a normal startup based on the "Normal Startup Mode 2" is executed starting with the "Combustion Operation" following ignition in the "Normal Startup Mode 2" (See FIG. 16, S306 and S313) when the temperature Tr(t) of the reformer 20 detected by the reformer temperature sensor 148 is less than a predetermined temperature Tr(t301) (=200° C.), which is below the above-described POX starting temperature Tr(t102) (=300° C.) in the normal startup mode POX control band B102 of the "Normal Startup Mode 2."

On the other hand, when the reformer 20 temperature Tr(t301) is equal to or greater than a predetermined temperature (=200° C.), there is a transition to the "Restart ATR" operating state of the "Restart Mode 4" (see FIG. 16, S307) immediately after the ignition device 83 turns on and the fuel gas is ignited.

Next, the operating state referred to as "Restart ATR" of the "Restart Mode 4" in FIG. 9(B) and S307 of FIG. 16 controls restart in a control band (the "Restart Mode ATR Control Band B303a" below) for executing an ATR different from the "Normal Startup POX," "Normal Startup ATR1," and "Normal Startup ATR2" under the "Normal Startup Mode 2."

More specifically, the temperature band in which the "Restart ATR" is executed in the restart mode ATR control band B303a of the "Restart Mode 4" (the "Restart ATR temperature band W303a" below) is such that its lowest temperature is on the low temperature side below the normal startup POX temperature band W102 (300° C.≦Tr(t)<600° C.; Ts<250° C.) in which the "Normal Startup POX" is executed in the normal startup mode POX control band B102 of the "Normal Startup Mode 2," and is in a temperature band (200° C.≦Tr(t)<400° C.; Ts<400° C.) in which the restart ATR temperature band W303a overlaps with a portion of the normal startup POX temperature band W102 (300° C.≦Tr(t) <600° C.; Ts<250° C.).

The "Fuel Flow Amount" in the "Restart ATR" operating state of the "Restart Mode 4" is 5.0 L/min, which is less than the "Fuel Flow Amount" in the "Normal Startup Mode 2" "Normal Startup POX" and "Normal Startup ATR1" operating states (6.0 L/min).

Furthermore, the "Reforming Air Flow Amount" in the "Restart ATR" operating state of the "Restart Mode 4" is 8.0 L/min, which is less than the "Reforming Air Flow Amount" (18.0 L/min) in the "Normal Startup POX" operating state of the "Normal Startup Mode 2."

The "Water Flow Amount" in the "Restart ATR" operating state of the "Restart Mode 4" is 2.0 cc/min, which equal to the "Water Flow Amount" in the "Normal Startup ATR1" operating state of the "Normal Startup Mode 2."

Next, the operating state referred to as "Restart ATR1" of the "Restart Mode 4" in FIG. 9(B) and S307 of FIG. 16 controls restart in a control band (the "Restart Mode ATR Control Band B303b" below) for executing an ATR which is exactly the same as the "Restart ATR," in the "Restart Mode 4," in which the "Reforming Air Flow Amount" is less than in the "Normal Startup POX" of the "Normal Startup Mode 2."

In other words, even after the "Restart ATR" in the restart mode ATR control band B303a of the "Restart Mode 4" is executed, the "Normal Startup ATR1" of the "Restart Mode 4" is executed in the restart mode ATR control band B303b of the "Restart Mode 4" with the "Fuel Flow Amount" (=5.0 L/min), the "Reforming Air Flow Amount" (=8.0 L/min), and the "Water Flow Amount" (=2.0 cc/min) maintained at a predetermined fixed amount.

It happens that the temperature band in which the "Normal Startup ATR1" of the "Restart Mode 4" is executed (the "Normal Startup ATR1 Temperature Band W303b," below) is equivalent to the restart mode ATR control band B303a in which the "Restart ATR" of the "Restart Mode 4" is executed (200° C.≦Tr(4)<400° C., Ts<400° C.).

Next, the operating state shown in FIG. 9(B) and S309 of FIG. 16 and referred to as the "Normal Startup ATR2" of the "Restart Mode 4" is one in which, when within the normal startup POX temperature band W102 of the "Normal Startup Mode 2" (300° C.≦Tr(t)<600° C.; Ts<250° C.), and within a temperature band (the "Normal Startup ATR2 temperature band W304" below) (400° C.≦Tr<600° C., 400° C.≦Ts<600° C.) on the high temperature side of the normal startup ATR1 temperature band W203b of the "Restart Mode 4" (250° C.≦Tr(t)<400° C., Ts<400° C.), restart is controlled in the control band (the "Restart Mode ATR Control Band B304" below) in which the same ATR is executed as the "Normal Startup ATR2" under the "Normal Startup Mode 2."

Next, the operating state referred to as "Normal Startup SR" of the "Restart Mode 4" shown in FIG. 9(B) and S311 in FIG. 16, under the same conditions as the "Transition Temperature Conditions" of the "Normal Startup SR" in the "Normal Startup Mode 2," controls restart in the control band (the "Restart Mode SR Control Band B305" below) for executing the same SR as the "Normal Startup SR" in the "Normal Startup Mode 2."

Next it is focused particularly on the above-described control band (the "Restart Mode Control Band of the "Restart Mode 4"" below) for the execution, under "Restart Mode 4," starting from "Restart ATR," via "Normal Startup ATR1," to "Normal Startup ATR2," comparing a restart under this restart mode control band with a normal startup under the "Normal Startup Mode 2."

When, in the restart mode control band of the "Restart Mode 4," the reformer 20 temperature Tr(t) is within the normal startup POX temperature band W102, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of the "Normal Startup POX" in the normal startup mode POX control band B102 according to the "Normal Startup Mode 2" is skipped due to the active utilization of residual heat remaining in the fuel cell stack 14 or the reformer 20, even if the reformer 20 temperature Tr(t) is within the normal startup POX temperature band W102.

Then, in the "Restart Mode 4" restart ATR temperature band W303a (200° C.≦Tr(t)<400° C.; Ts<400° C.), instead of the skipped "Normal Startup POX" of the "Normal Startup Mode 2," a "Restart ATR" of the "Normal Startup Mode 4" having a smaller "Reforming Air Flow Amount" than in the "Normal Startup POX" of the "Normal Startup Mode 2" and an equal "Water Flow Amount" to the "Normal Startup ATR1" of the "Normal Startup Mode 2" is executed, following which, in the restart mode ATR control band B303b of the "Restart Mode 4" as well, a "Normal Startup ATR1" of the "Restart Mode 4" is executed while maintaining fixed levels, without change, of the "Fuel Flow Amount," "Reforming Air Flow Amount," and "Water Flow Amount" predetermined in the "Restart ATR" of the "Restart Mode 4." Then, as the temperature rises, there is a sequential execution via "Normal Startup ATR2" and on to "Normal Startup SR" in the "Restart Mode 4."

On the other hand, in the series of restart mode control bands in "Restart Mode 4," when a restart has been performed based on loss of flame at startup, the possibility is low that residual heat remaining in the fuel cell stack 14 or the reformer 20 can be used even if the reformer 20 temperature Tr(t) rose from the low temperature side of the restart ATR temperature band W303a of the "Restart Mode 4" (200° C.≦Tr(t)<400° C.; Ts<400° C.) and was within these restart ATR temperature bands W303a or W303b (200° C.≦Tr(t)<400° C., Ts<400° C.), therefore "Restart ATR" and "Normal Startup ATR1" in the restart mode control band of the "Restart Mode 4" are prohibited, and execution starts with the "Combustion Operation" after ignition in "Normal Startup Mode 2" (see FIG. 16, S312 and S313).

Furthermore, the time t305 over which the transition from the "Normal Startup ATR2" of the "Restart Mode 4" to the "Normal Startup SR" occurs is also shorter than the time t105 over which the transition from the "Normal Startup ATR2" of the "Normal Startup Mode 2" to the "Normal Startup SR" occurs, and the startup time for restart is shorter compared to the startup time for normal startup.

In the restart control according to a fourth example of the restart control flow of the solid oxide fuel cell device (SOFC) in the above described embodiment, when the reformer 20 temperature Tr(t) is within the normal startup POX temperature band W102, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of the "Normal Startup POX" in the normal startup mode POX control band B102 of the "Normal Startup Mode 2" can be skipped due to the active utilization of residual heat remaining in the fuel cell stack 14 or the reformer 20, even if the reformer 20 temperature Tr(t) is within the normal startup POX temperature band W102.

Then, in the restart ATR temperature band W303a of the "Restart Mode 4" (200° C.≦Tr(t)<400° C.; Ts<400° C.), instead of the skipped "Normal Startup POX" of the "Normal Startup Mode 2," a "Restart ATR" of the "Normal Startup Mode 4" having a smaller "Reforming Air Flow Amount" than in the "Normal Startup POX" of the "Normal Startup Mode 2" and an equal "Water Flow Amount" to the "Normal Startup ATR1" of the "Normal Startup Mode 2" is executed. Next, in the restart mode ATR control band W303b of the "Restart Mode 4" (200° C.≦Tr(t)<400° C.; Ts<400° C.) as well, a "Normal Startup ATR1" of the "Restart Mode 4" can be executed while maintaining fixed levels, without change, of the "Fuel Flow Amount," "Reforming Air Flow Amount," and "Water Flow Amount" predetermined in the "Restart ATR" of the "Restart Mode 4."

As a result, when compared to the case in which a normal startup POX is executed as is without skipping the execution of the "Normal Startup POX" in the normal startup mode POX control band B102 in the "Normal Startup Mode 2," oxidation of the fuel cells 84 and the burden on the fuel cells 84 caused by anomalously high temperatures can be reduced, and the durability of the fuel cells 84 improved.

In the restart control according to a fourth example of the restart control flow of the solid oxide fuel cell device (SOFC) of the present embodiment, the ATRs from "Restart ATR" to "Normal Startup ATR1" in "Restart Mode 4" are executed in a low temperature, unstable temperature band corresponding to the normal startup POX temperature band W102 of the "Normal Startup Mode 2" (300° C.≦Tr(t)<600° C.; Ts<250° C.), but because the "Normal Startup ATR1" of the "Restart Mode 4" can be executed while maintaining fixed levels, without change, of the "Fuel Flow Amount," "Reforming Air Flow Amount," and "Water Flow Amount" predetermined in the "Restart ATR" of the "Restart Mode 4" even when in this type of low temperature, unstable temperature band.

Since the amount of heat is greater in ATR than in POX, the "Normal Startup POX" in the "Normal Startup Mode 2" can be skipped and the "Restart Mode 4" executed by actively utilizing the residual heat remaining in the fuel cell stack 14 or the reformer 20, so that by executing the sequence from "Time of Ignition" to "Restart ATR," "Normal Startup ATR1," "Normal Startup ATR2," and "Normal Startup SR," the transition from the time of ignition to ATR and SR can be speeded up. As a result, compared to the hypothetical case in which, upon startup, a "Normal Startup POX" of the "Normal Startup Mode 2" is executed within a temperature band corresponding to the normal startup POX temperature band W102 (300° C.≦Tr(t)<600° C.; Ts<250° C.) in a "Normal Startup Mode 2," the startup time needed to for restart can be greatly shortened.

On the other hand, when a restart is executed based on loss of flame at startup, a "Restart ATR" and "Normal Startup ATR1" in the restart mode control band of the "Restart Mode 4" can be prohibited, therefore damage to the individual fuel cells 16 can be restrained.

Also, when using the restart control according to the fourth example of the restart control flow of the solid oxide fuel cell device (SOFC) of the present embodiment, by expanding the normal startup mode ATR control band B103 under the "Normal Startup Mode 2" in the normal startup ATR1 temperature band W303b (200° C.≦Tr(t)<400° C.; Ts<400° C.) and executing a "Normal Startup ATR1" of the "Restart Mode 4" with a "Water Flow Amount" reduced from that of the "Normal Startup ATR2" of the "Normal Startup Mode 2" instead of the skipped "Normal Startup POX" of the "Normal Startup Mode 2," sudden drops in the temperature of the individual fuel cells 84 can be restrained, and cell temperatures can be recovered by utilizing residual heat.

Figure 18:
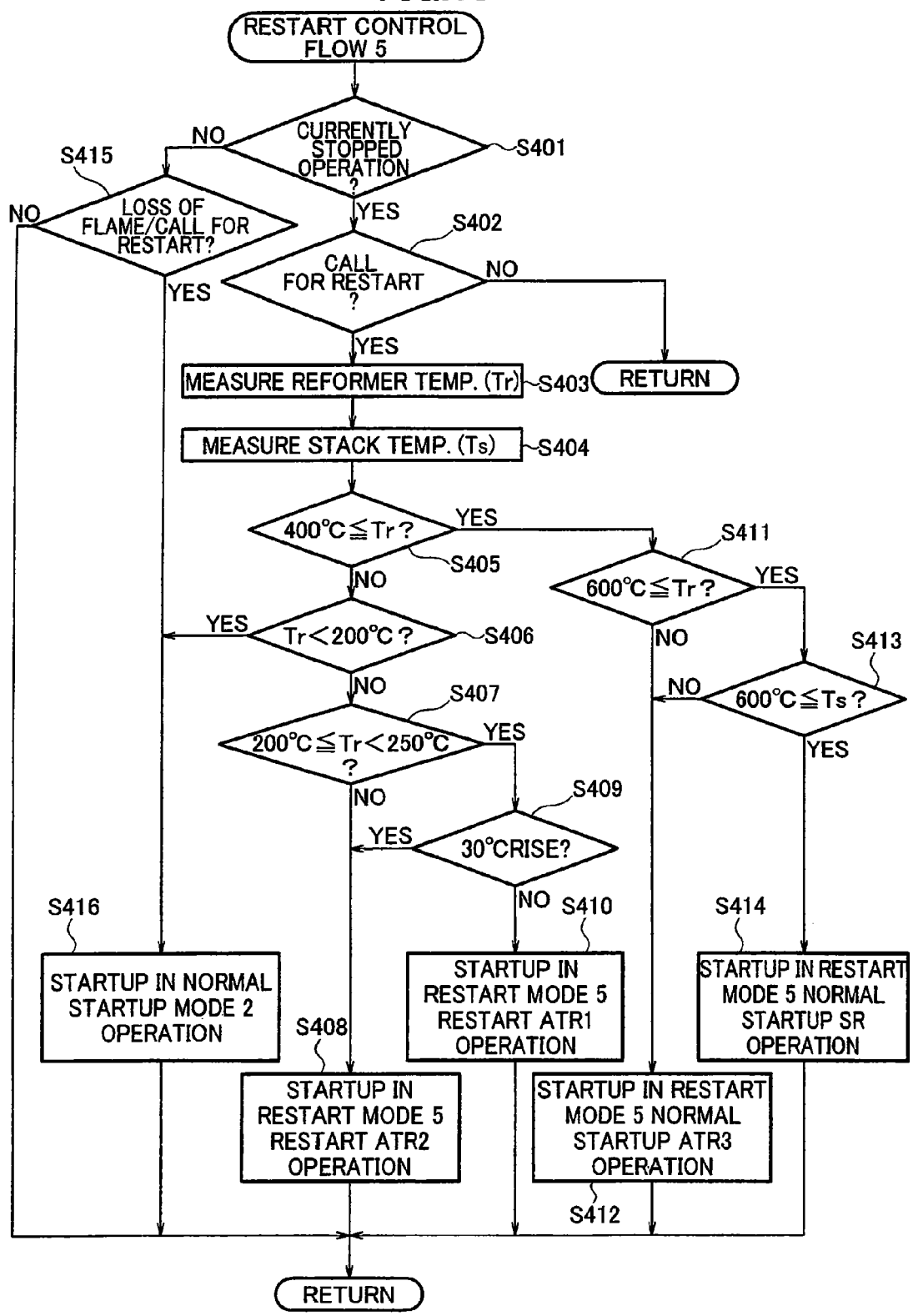
FIG. 18 is a flowchart showing a fifth example of restart control flow for restarting a solid oxide fuel cell device (SOFC) according to an embodiment of the present invention.

Next, referring to FIG. 18, specifics of a fifth example of a restart control flow in a solid oxide fuel cell device (SOFC) of the present embodiment will be explained. FIG. 18 is a flowchart showing a fifth example of restart control flow (restart control flow 5) for restarting a solid oxide fuel cell device (SOFC) according to an embodiment of the present invention. In FIG. 18, an S denotes the various steps.

First, a determination is made in S401 as to whether the fuel cell module 2 operation is stopped; if stopped, the system advances to S402 and determines whether a restart is requested.

If it is determined in S402 that a restart is requested, the system advances to S403, and after measuring the reformer 20 temperature Tr using the reformer temperature sensor 148, the system advances to S404 and the stack temperature Ts, which is the temperature in the vicinity of the fuel cell stack 14 (i.e., the individual fuel cells 84 themselves) is measured by generating chamber temperature sensor 142.

Next, advancing to S405, a determination is made as to whether the reformer temperature Tr(t) is equal to or greater than 400° C.

In S405, if it is determined that the reformer temperature Tr(t) is not equal to or greater than 400° C., the system advances to S406 and determines if the reformer temperature Tr(t) is less than 200° C.

In S406, if it is determined that the reformer temperature Tr is not less than 200° C., i.e., that the reformer temperature Tr(t) is equal to or greater than 200° C. and less than 400° C., the system advances to S407, and a determination is made as to whether the reformer temperature Tr is equal to or greater than 200° C. and less than 250° C.

If, in S407, it is determined that the reformer temperature Tr is not equal to or greater than 200° C. and less 250° C., i.e., that the reformer temperature Tr is equal to or greater than 250° C. and less than 400° C., the system advances to S408, and a "Restart ATR2" according to the "Restart Mode 5" in the data table shown in FIG. 9(B) is executed.

On the other hand, if a determination is made in S407 that the reformer temperature Tr is equal to or greater than 200° C. and less 250° C., the system advances to S409, and a determination is made as to whether the reformer temperature Tr has risen by 30° C. in a reformer temperature Tr range of 200° C. or above to less than 250° C.

If, in S409, it is determined that the reformer temperature Tr has risen by 30° C. in a range of 200° C. or above to less than 250° C., the system advances to S408, and a "Restart ATR2" under the "Restart Mode 5" is executed.

On the other hand, if a determination is made in S409 that the reformer temperature has not risen by 30° C. in a range of 200° C. or above to less than 250° C., the system advances to S410, and a "Restart ATR1" under the "Restart Mode 5" is executed.

Also, if a determination is made in S405 that the reformer temperature Tr is equal to or greater than 400° C., the system advances to S411 and determines if the reformer temperature Tr is equal to or greater than 600° C.

If, in S411, it is determined that the reformer temperature Tr is not equal to or greater than 600° C., i.e., that the reformer temperature Tr is equal to or greater than 400° C. and less than 600° C., the system advances to S412, and a "Restart ATR 3" is executed based on the "Restart Mode 5" in the data table shown in FIG. 9(B).

On the other hand, if a determination is made in S411 that the reformer temperature Tr is equal to or greater than 600° C., the system advances to S413 and determines whether the stack temperature Ts measured by the generating chamber temperature sensor 142 is equal to or greater than 600° C.

If, in S413, a determination is made that the stack temperature Ts is equal to or greater than 600° C., the system advances to S414, and a "Normal Startup SR" is executed according to the "Restart Mode 5" in the data table shown in FIG. 9(B). On the other hand, if a determination is made in S413 that the stack temperature Ts is not equal to or greater than 600° C., i.e., that the stack temperature Ts is less than 600° C. notwithstanding that the reformer temperature Tr is equal to or greater than 600° C., the system advances to S412, and a "Normal Startup ATR 3" is executed according to the "Restart Mode 5" in the data table shown in FIG. 9(B).

Next, a determination is made in S401 as to whether the fuel cell module 2 operation is stopped; if not stopped, the system advances to S415 and determines whether there is a request for a restart based on loss of flame during startup.

If it is determined in S415 that there is call for restart based on loss of flame, and there is a determination in S406 that the reformer temperature Tr(t) is less than 200° C., the system advances to S416 like the first example, and since a restart table cannot be used, a restart is executed according to the "Normal Startup Mode 2" in the data table shown in FIG. 9(B).

Figure 19:
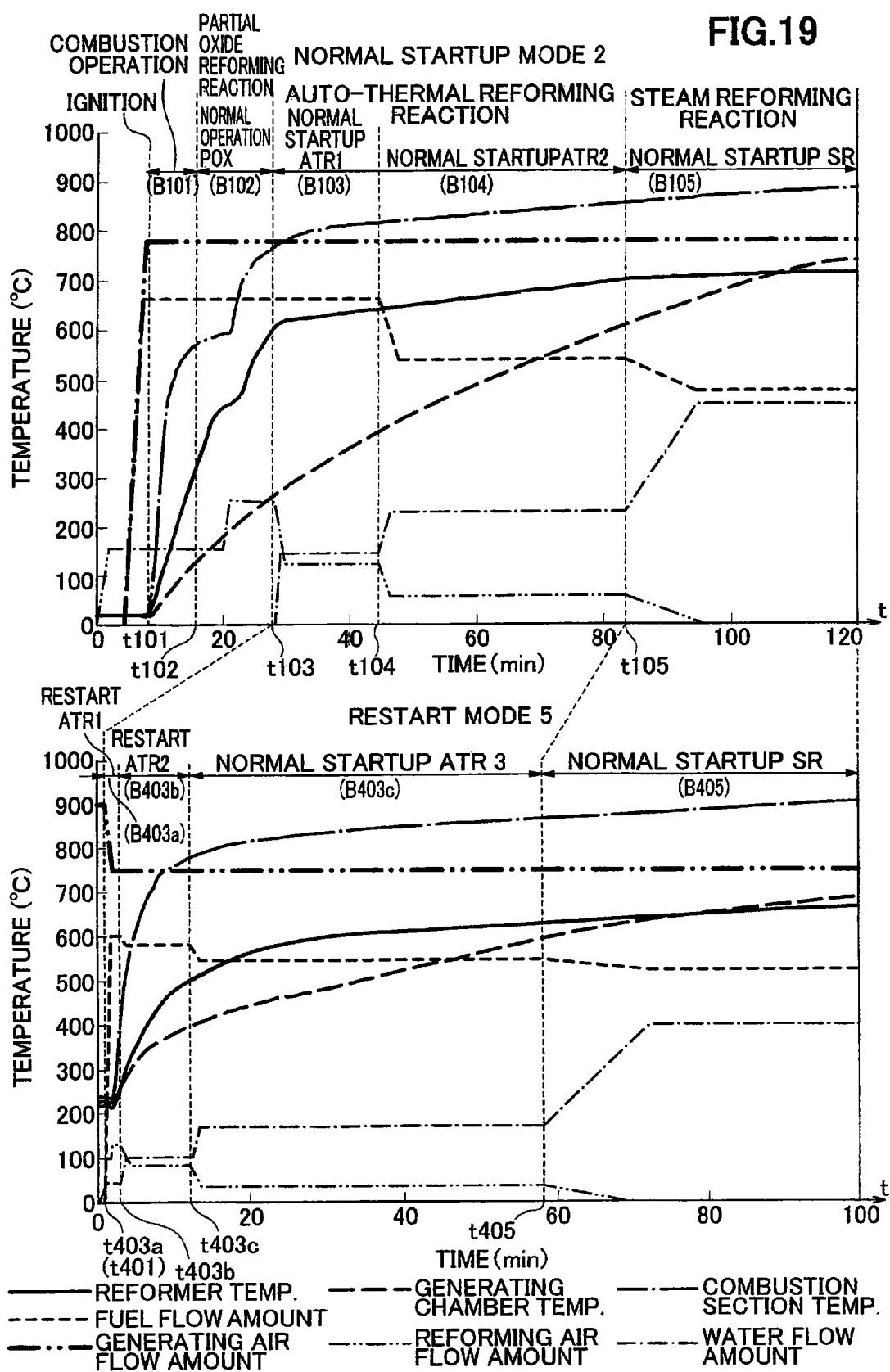
FIG. 19 is a diagram comparing a timing chart showing operations when restart is executed according to the fifth example restart control flow for the solid oxide fuel cell device (SOFC) according to the embodiment of the present invention shown in FIG. 10 to a timing chart showing normal startup operations.

Next, referring to FIG. 9(B), FIG. 18, and FIG. 19, the operation when a restart is executed based on a fifth example of the restart control flow of the solid oxide fuel cell device (SOFC) according to this embodiment as shown in FIG. 18 will be specifically explained.

FIG. 19 is a diagram comparing a timing chart showing operation when restart is executed based on a fifth example of the restart control flow in a solid oxide fuel cell device (SOFC) according to the embodiment of the present invention shown in FIG. 18 to a timing chart showing normal startup operations.

Note that the timing chart in the upper portion of FIG. 19 shows the normal startup operation of a solid oxide fuel cell device (SOFC) when the "Normal Startup Mode 2" in the data table shown in FIG. 9(B) is executed, and the timing chart in the bottom portion of FIG. 15 shows the restart operation of a solid oxide fuel cell device (SOFC) when the "Restart Mode 5" in the data table shown in FIG. 9(B) is executed.

For an explanation of the restart operation based on the fifth example restart control flow (restart flow 5) of the solid oxide fuel cell device (SOFC) of the present embodiment, referring only to the data table regarding the "Normal Startup Mode 2" and "Restart Mode 5" shown in FIG. 9(B), the restart operation under "Restart Mode 5" of the solid oxide fuel cell device (SOFC) of the present embodiment shown in FIG. 19 is explained by comparing it with the operation in normal startup according to the "Normal Startup Mode 2."

First, as shown in FIG. 9(B), restart control according to "Restart Mode 5" is executed starting from "Time of Ignition" in the sequence "Restart ATR1," "Restart ATR2," "Restart ATR3," and "Normal Startup SR." Here, with respect to the times t on the horizontal axis of the "Restart Mode 5" timing chart in FIG. 18, the time of the "Time of Ignition" is referred to as t401, and the times at which the transitions occur in the sequence "Restart ATR1," "Restart ATR2," "Restart ATR3," and "Normal Startup SR" are respectively as t403a, t403b, t403c, and t405.

The operating state shown in FIG. 9(B) and referred to as "Time of Ignition" under "Restart Mode 5" is one in which, when a restart is requested while the fuel cell module 2 operation is stopped, a normal startup based on the "Normal Startup Mode 2" is executed starting with the "Combustion Operation" following ignition in the "Normal Startup Mode 2" (See FIG. 18, S406 and S416) when the temperature Tr(t) of the reformer 20 detected by the reformer temperature sensor 148 is less than a predetermined temperature Tr(t301) (=200° C.), which is below the above-described POX starting temperature Tr(t102) (=300° C.) in the normal startup mode POX control band B102 of the "Normal Startup Mode 2."

On the other hand, when the reformer 20 temperature Tr(t401) is equal to or greater than a predetermined temperature (=200° C.), there is a transition to the "Restart ATR1" of the "Restart Mode 5" operating state (see FIG. 18, S410) immediately after the ignition device 83 turns on and the fuel gas is ignited.

Next, the operating state referred to as "Restart ATR1" of the "Startup Mode 5" in FIG. 9(B) and S410 in FIG. 10 controls restart in a control band (the "Restart Mode ATR Control Band B403a" below) for executing an ATR different from the "Normal Startup POX," "Normal Startup ATR1," and "Normal Startup ATR2" in the "Normal Startup Mode 2."

More specifically, the temperature band in which the "Restart ATR1" is executed in the restart mode ATR control band B403a of the "Restart Mode 5" (the "Restart ATR1 Temperature Band W403a" below) is a lower temperature band (200° C.≦Tr(t)<250° C.) than the normal startup POX temperature band W102 (300° C.≦Tr(t)<600° C.; Ts<250° C.) in which the "Normal Startup POX" is executed in the normal startup mode POX control band B102 of the "Normal Startup Mode 2."

Also, the "Fuel Flow Amount" in the "Restart ATR1" operating state of the "Restart Mode 5" is 5.5 L/min, which is less than the "Fuel Flow Amount" in the "Normal Startup POX" operating state in the "Normal Startup Mode 2" (6.0 L/min).

In addition, the "Reforming Air Flow Amount" in the "Restart ATR1" operating state of the "Restart Mode 5" is 12.0 L/min, which is less than the "Reforming Air Flow Amount" in the "Normal Startup POX" operating state of the "Normal Startup Mode 2" (18.0 L/min).

Also, the "Water Flow Amount" in the "Restart ATR1" operating state of the "Restart Mode 5" is 1.0 cc/min, which is less than the "Water Flow Amount" in the "Normal Startup ATR1" operating state of the "Normal Startup Mode 2" (2.0 cc/min).

Furthermore, as soon as it is confirmed that the reformer temperature Tr has risen 30° C. in a range of 200° C. or above to less than 250° C., the "Restart ATR1" of the "Restart Mode 5" transitions to execution of "Restart ATR2" under the "Restart Mode 5."

Next, the operating state referred to as "Restart ATR2" of the "Startup Mode 5" in FIG. 9(B) and S408 in FIG. 18 controls restart in a control band (the "Restart Mode ATR Control Band B403b" below) for executing an ATR different from the "Normal Startup ATR1" of the "Normal Startup Mode 2" and the "Restart ATR1" in the "Restart Mode 5."

More specifically, the temperature band in which the "Restart ATR2" is executed in the restart mode ATR control band B403b of "Restart Mode 5" (the "Restart ATR2 temperature band W403b" below) is a temperature band (250° C.≦Tr(t)<400° C., Ts<400° C.) on the high temperature side above the restart ATR1 temperature band W403a (200° C.≦Tr(t)<250° C.) in which the "Restart ATR1" of the "Restart Mode 5" is executed.

In the restart mode ATR control band B403b of the "Restart Mode 5," the "Normal Startup ATR1" of the "Restart Mode 5" is executed without executing the "Normal Startup POX" of the "Normal Startup Mode 2" even though, in particular, the restart mode ATR2 temperature band W403b of the "Restart Mode 5" (250° C.≦Tr(t)<400° C., Ts<400° C.) overlaps with a part of the normal startup POX temperature band W102 of the "Normal Startup Mode 2" (300° C.≦Tr(t)<600° C., Ts<250° C.).

In addition, the "Fuel Flow Amount" in the "Restart ATR2" operating state of the "Restart Mode 5" is 4.5 L/min, which is less than the "Fuel Flow Amount" in the "Normal Startup POX" and "Normal Startup ATR1" operating states of the "Normal Startup Mode 2" (6.0 L/min), or the "Fuel Flow Amount" in the "Restart ATR1" operating states of the "Restart Mode 5" (5.5 L/min).

In addition, the "Reforming Air Flow Amount" in the "Restart ATR2" operating state of the "Restart Mode 5" is 7.0 L/min, which is less than the "Reforming Air Flow Amount" in the "Normal Startup POX" operating state of the "Normal Startup Mode 2" (18.0 L/min) or the "Reforming Air Amount" in the "Restart ATR1" operating state of the "Restart Mode 5" (12.0 L/min).

In addition, the "Water Flow Amount" in the "Restart ATR2" operating state of the "Restart Mode 5" is 2.0 cc/min, which is the same as the "Water Flow Amount" in the "Normal Startup ATR1" operating state of the "Normal Startup Mode 2" (2.0 cc/min), and is less than the "Water Flow Amount" in the "Normal Startup ATR2" operating state of the "Normal Startup Mode 2" (3.0 cc/min) but more than the "Water Flow Amount" in the "Restart ATR1" operating state of the "Restart Mode 5" (1.0 cc/min).

Next, the operating state referred to as "Restart ATR3" of the "Restart Mode 5" shown in FIG. 9(B) and S412 of FIG. 18 is one in which, when the temperature Tr(t) of the reformer 20 is in a temperature band corresponding to the normal startup POX temperature band W102 (300° C.≦Tr(t)<600° C.; Ts<250° C.) of the "Normal Startup Mode 2," and within a temperature band (the "Restart ATR3 temperature band W403b" below) (400° C.≦Tr(t)<600° C., 400° C.≦Ts<600° C.) on the high temperature side of the restart ATR2 temperature band W403a (250° C.≦Tr(t)<400° C., Ts<400° C.) of the "Restart Mode 5," startup is controlled in a control band (the "Restart Mode ATR Control Band B403c" below) in which an ATR is executed which is different from the "Normal Startup ATR1" and "Normal Startup ATR2," in the "Normal Startup Mode 2," or the "Restart ATR1" "Restart ATR2" in the "Restart Mode 5."

To explain this more specifically, in the restart mode ATR control band B403c of the "Restart Mode 5," the "Normal Startup ATR3" of the "Restart Mode 5" is executed without executing the "Normal Startup POX" of the "Normal Startup Mode 2" even though, in particular, the restart mode ATR3 temperature band W403c (400° C.≦Tr(t)<600° C.; 400° C.≦Ts<600° C.) of the "Restart Mode 5" overlaps with a part of the normal startup POX temperature band W2 (300° C.≦Tr(t)<600° C.) in the "Normal Startup Mode 2."

In addition, the "Fuel Flow Amount" in the "Restart ATR3" operating state of the "Restart Mode 5" is 3.5 L/min, which is less than the "Fuel Flow Amount" in the "Normal Startup ATR2" operating state of the "Normal Startup Mode 2" (4.0 L/min) or the "Fuel Flow Amount" in the "Restart ATR2" operating state of the "Restart Mode 5" (4.5 L/min).

The "Reforming Air Flow Amount" in the "Restart ATR3" operating state of the "Restart Mode 5" is 2.0 L/min, which is less than the "Reforming Air Flow Amount" in the "Normal Startup ATR2" operating state of the "Normal Startup Mode 2" (4.0 L/min) or the "Reforming Air Flow Amount" in the "Restart ATR2" operating state of the "Restart Mode 5" (7.0 L/min).

Moreover, the "Water Flow Amount" in the "Restart ATR3" operating state of the "Restart Mode 5" is 3.0 cc/min, which is equal to the "Water Flow Amount" in the "Normal Startup ATR2" operating state of the "Normal Startup Mode 2" (3.0 cc/min) and more than the "Water Flow Amount" in the "Restart ATR2" operating state of the "Restart Mode 5" (2.0 cc/min).

Next, the operating state referred to as "Normal Startup SR" of the "Restart Mode 5" shown in FIG. 9(B) and S414 in FIG. 18, under the same conditions as the "Transition Temperature Conditions" of the "Normal Startup SR" in the "Normal Startup Mode 2" controls restart in the control band (the "Restart Mode SR Control Band B405" below) for executing the same SR as the "Normal Startup SR" in the "Normal Startup Mode 2."

Next it is focused particularly on the above-described control band (the "Restart Mode Control Band of the "Restart Mode 5" below) for the execution, under "Restart Mode 5," starting from "Restart ATR1," via "Restart ATR2," to "Restart ATR3," comparing a restart under this restart mode control band with a normal startup under the "Normal Startup Mode 2."

When, in the restart mode control band of the "Restart Mode 5," the reformer 20 temperature Tr(t) is within the normal startup POX temperature band W102, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of the "Normal Startup POX" in the normal startup mode POX control band B102 according to the "Normal Startup Mode 2" is skipped due to the active utilization of residual heat remaining in the fuel cell stack 14 or the reformer 20, even if the reformer 20 temperature Tr(t) is within the normal startup POX temperature band W102.

Then, instead of this skipped "Normal Startup POX" of the "Normal Startup Mode 2," in the restart ATR1 temperature band W403a (200° C.≦Tr(t)<250° C.) of the "Restart Mode 5," a "Restart ATR1" is executed in which the "Fuel Flow Amount" and "Reforming Air Flow Amount" are less than in the "Normal Startup POX" in the "Normal Startup Mode 2," and the "Water Flow Amount" is less than in the "Normal Startup Mode 2" "Normal Startup ATR1," and as soon as a rise of 30° C. within the restart ATR1 temperature band W403a (200° C.≦Tr(t)<250° C.) in the "Restart ATR1" of the "Restart Mode 5" is confirmed, a "Restart ATR1" in the "Restart Mode 5" is executed, following which, as the temperature rises, execution proceeds under "Restart Mode 5" via "Restart ATR2" and "Restart ATR3" to "Normal Startup SR."

On the other hand, in the series of restart mode control bands in "Restart Mode 5," for example, when a restart has been performed based on loss of flame at startup, the possibility is low that residual heat remaining in the fuel cell stack 14 or the reformer 20 can be used even if the reformer 20 temperature Tr(t) rose from the low temperature side of the restart ATR1 temperature band W403a (200° C.≦Tr(t)<250° C.) of the "Restart Mode 5" and was within these restart ATR temperature bands W403a-W403b, therefore "Restart ATR1" through "Restart ATR3" in the restart mode control band of the "Restart Mode 5" are prohibited, and execution starts with the "Combustion Operation" after ignition in "Normal Startup Mode 2" (see FIG. 18, S415 and S416).

Furthermore, the time t405 over which the transition from the "Normal Startup ATR3" of the "Restart Mode 5" to the "Normal Startup SR" occurs is also shorter than the time t105 over which the transition from the "Normal Startup ATR2" of the "Normal Startup Mode 2" to the "Normal Startup SR" occurs, and the startup time under restart is shorter compared to the startup time under normal startup.

In the restart control according to a fifth example of the restart control flow of the solid oxide fuel cell device (SOFC) in the above described embodiment, when the reformer 20 temperature Tr(t) is within the normal startup POX temperature band W102, having dropped from the high temperature side of the temperature band corresponding to the normal startup POX temperature band W102 (300° C.≦Tr(t)<600° C.; Ts<250° C.) of the "Normal Startup Mode 2" due to stopping of the operation of the fuel cell module 2, execution of "Normal Startup POX" in the normal startup mode POX control band B102 in the "Normal Startup Mode 2" can be skipped due to the active utilization of residual heat remaining in the fuel cell stack 14 or the reformer 20, even if the reformer 20 temperature Tr(t) is within the normal startup POX temperature band W102.

Then, in place of the skipped "Normal Startup POX" in the "Normal Startup Mode 2," it is possible in the restart ATR temperature bands W403a-W403b of the "Restart Mode 5" to execute a "Restart ATR1," then execute a "Restart ATR2" in which the "Reforming Air Flow Amount" is less than in the "Restart ATR1," then execute a "Restart ATR3" in which the "Reforming Air Flow Amount" is less than in the "Restart ATR2," then transition to "Normal Startup SR."

As a result, when compared to the case in which a normal startup POX is executed as is without skipping the execution of "Normal Startup POX" in the normal startup mode POX control band B102 of the "Normal Startup Mode 2," oxidation of the fuel cells 84 and the burden on the fuel cells 84 caused by anomalously high temperatures can be reduced, and the durability of the fuel cells 84 improved.

By causing the partial oxidation reforming reaction to become more prevalent than the steam reforming reaction by increasing the amount of air in the relatively low and unstable temperature band of the individual fuel cells 84 or the reformer 20 at the initial stage of restart, the temperature of the individual fuel cells 84 can be stably increased while restraining temperature drops in the reformer 20.

Since the amount of heat is greater in ATR than in POX, the "Normal Startup POX" in the "Normal Startup Mode 2" can be skipped and the "Restart Mode 5" executed by actively utilizing the residual heat remaining in the fuel cell stack 14 or the reformer 20, so that by executing the sequence from "Time of Ignition" to "Restart ATR1," "Restart ATR2," "Restart ATR3," and "Normal Startup SR," the transition from the time of ignition to ATR and SR can be speeded up. As a result, compared to the hypothetical case in which, upon startup, a "Normal Startup POX" of the "Normal Startup Mode 2" is executed within a temperature band corresponding to the normal startup POX temperature band W102 (300° C.≦Tr(t)<600° C.; Ts<250° C.) in a "Normal Startup Mode 2," the startup time needed to for restart can be greatly shortened.

On the other hand, when a restart is executed based on loss of flame at startup, "Restart ATR1" through "Restart ATR3" in the restart mode control band of the "Restart Mode 5" can be prohibited, therefore damage to the individual fuel cell unit 16 can be restrained.

Furthermore, in the restart control according to a fifth example of the startup control flow of the solid oxide fuel cell device (SOFC) in the present embodiment, execution at the time of restart in the "Restart Mode 5" of the sequence "Restart ATR1," "Restart ATR2," "Restart ATR3," and "Normal Startup SR" as the temperature of the reformer 20 rises from the "Time of Ignition" enables a stable temperature recovery in an optimal state without inducing temperature drops in the individual fuel cell units 16.

Note that in the restart control flow example 1 through 5 in the above-described solid oxide fuel cell device (SOFC) of the present embodiment, by setting the heating temperature at which the first heater 46 serving as oxidant gas heating means heats the oxidant gas (reforming air) supplied to the 20 higher than the heating temperature in each of the normal startup ATR control bands in the normal startup modes 1 and 2 and executing restart by ATR, temperature drops in the individual fuel cells 84 and the reformer 20 associated with the supply of pure water in ATR during restart can be restrained, and the temperature can be raised at an early stage.

Next a solid oxide fuel cell device (SOFC) according to another embodiment of the present invention will be explained.

Figure 20:
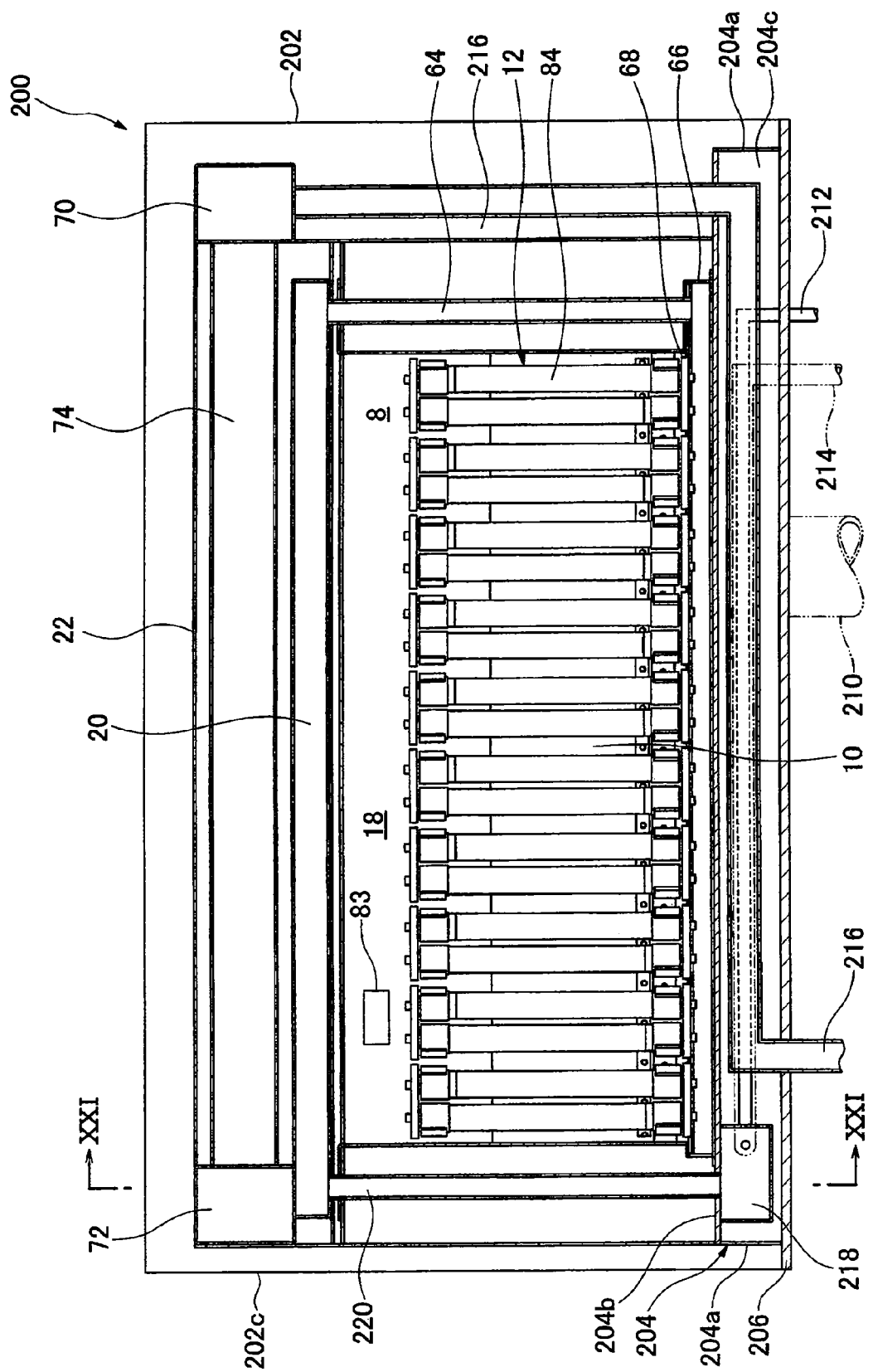
FIG. 20 is a front elevation view cross section showing a solid oxide fuel cell device (SOFC) fuel cell module according to another embodiment of the present invention.
Figure 21:
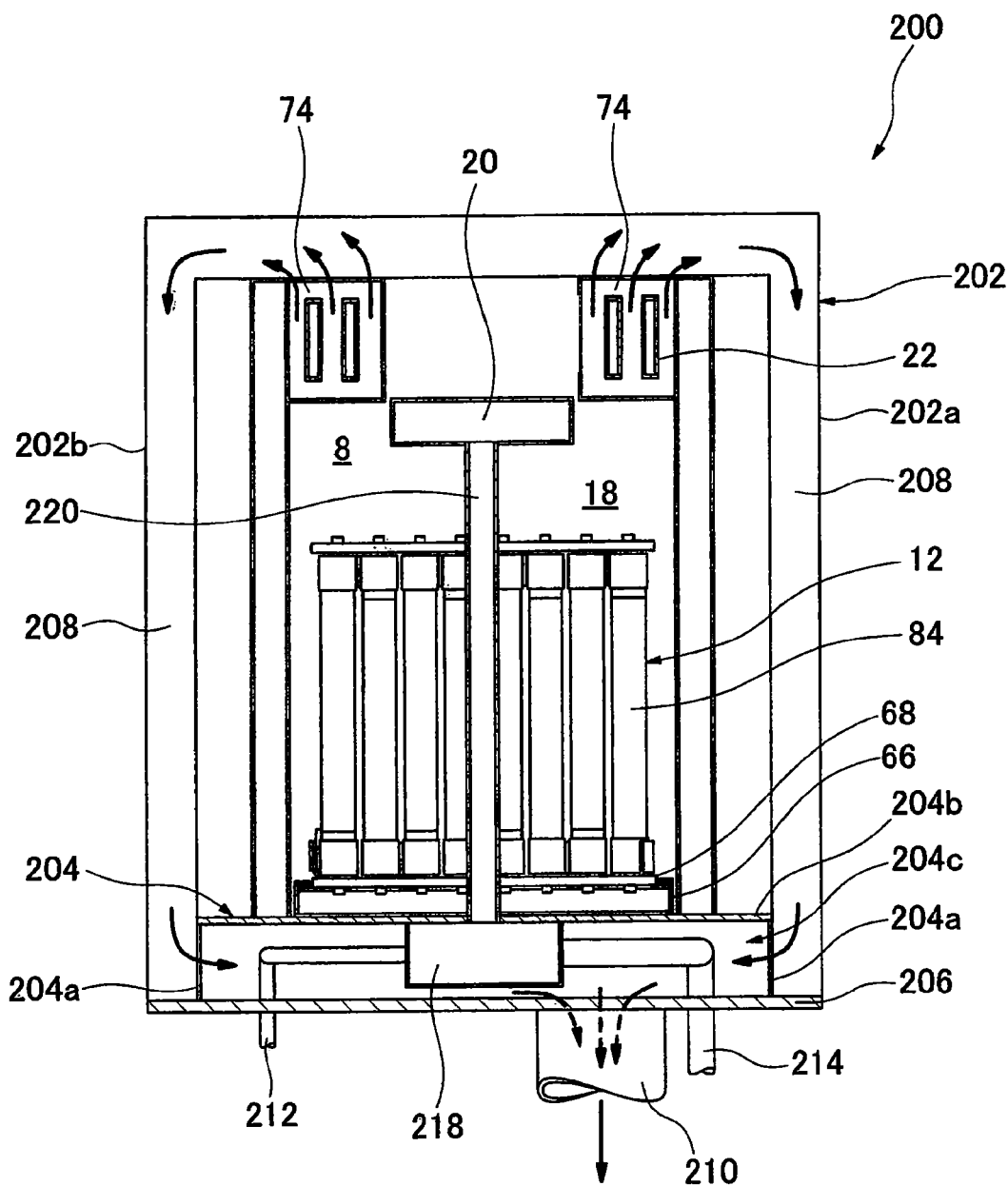
FIG. 21 is a sectional view along line XXI-XXI in FIG. 20.
Figure 22:
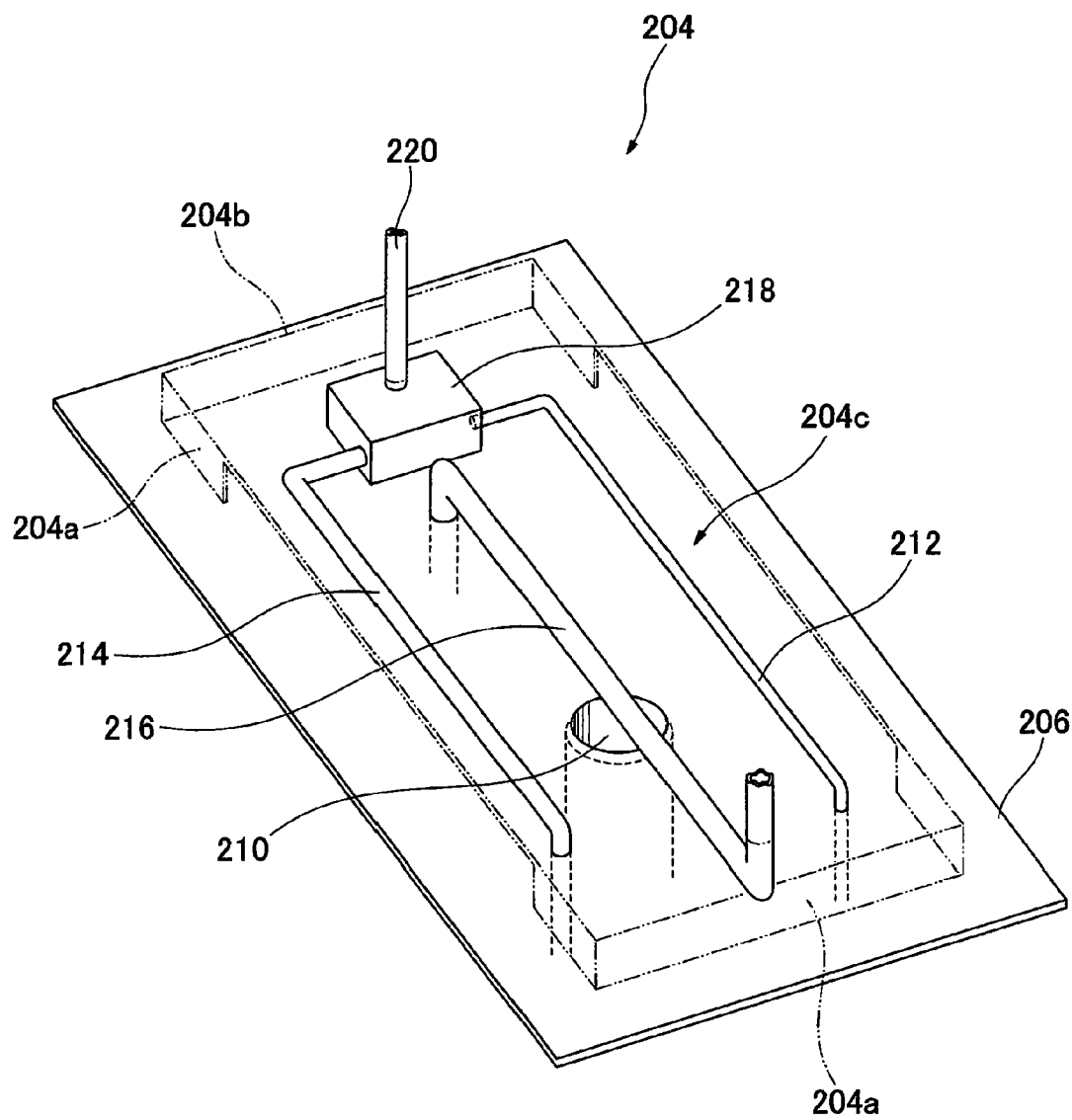
FIG. 22 is a perspective view seen diagonally from above of a solid oxide fuel cell device (SOFC) fuel cell module cell assembly support unit according to another embodiment of the present invention.

FIG. 20 is a front elevation cross section showing a solid oxide fuel cell device (SOFC) fuel cell module according to another embodiment of the present invention; FIG. 21 is a sectional diagram along line XXI-XXI in FIG. 20; FIG. 22 is a perspective view seen diagonally from above of the manifold portion in a fuel cell module of a solid oxide fuel cell device (SOFC) according to another embodiment of the present invention.

In FIGS. 20-22, the same reference numerals are used for the same parts of the solid oxide fuel cell device (SOFC) according to the above-described embodiment of the present invention, an explanation of those is here omitted.

As shown in FIGS. 20-22, a cell assembly support unit 204 for supporting the bottom portion of the fuel cell assembly 12 disposed at the bottom of the reformer 20 is provided inside the housing 202 of the fuel cell module 200.

This cell assembly support unit 204 is furnished with a support member 204a and a partitioning plate 204b.

The support members 204a are affixed to a base member 206 serving as the base portion of the fuel cell module 200, and support the two edge portions in the longitudinal direction of the partitioning plate 204b (the left edge portion and right edge portion of the partitioning plate 204b in FIG. 20) by placement at a predetermined spacing pointing upward from the base member 206.

The cell assembly support unit 204 forms an exhaust gas chamber 204c in the space with the base member 206.

Furthermore, as shown in FIG. 21, an exhaust gas conduit 208 extending upward and downward is formed on the inside of the front surface 202a and rear surface 202b, which are surfaces along the longitudinal direction of the housing 202; the bottom end of this exhaust gas conduit 208 connects with the exhaust gas chamber 204c.

An exhaust gas exhaust pipe 210 is connected to the bottom surface of the exhaust gas chamber 204c; the downstream end of this exhaust gas exhaust pipe 210 is connected to the above-described hot water production device 50, which is shown in FIG. 1.

In addition, disposed within the exhaust gas chamber 204c are a pure water intake pipe 212 for introducing pure water into the reformer 20, a reforming gas intake pipe 214 for introducing fuel gas to be reformed and reforming air, an air intake pipe 216 for introducing air residually heated by the electrical generating chamber 10, and a mixing chamber 218 to which the respective downstream ends of this pure water intake pipe 212 and reforming gas intake pipe 214 are connected.

In the mixing chamber 218, steam (pure water) supplied from the pure water intake pipe 212 is mixed with fuel gas to be reformed and reforming air supplied from the reforming gas intake pipe 214.

With respect to this pure water intake pipe 212 and reforming gas intake pipe 214, they are connected to the mixing chamber 218 by extending in the horizontal direction within the exhaust gas chamber 204c after extending upward to within the exhaust gas chamber 204c from the bottom side of the base member 206 on the fuel cell module 200; by running the pure water intake pipe 212 and the reforming gas intake pipe 214 through the exhaust gas chamber 204c, heat from the exhaust gas in the exhaust gas chamber 204c can be utilized, and the steam (pure water) or reforming air can be kept hot prior to being supplied to the reformer 20, thereby restraining drops in temperature.

A pipe 220 is connected so as to extend vertically between the mixing chamber 218 and the upstream side of the reformer 20; fuel gas and air into which steam (pure water) was mixed in the mixing chamber 218 is fed into the reformer 20 through the pipe 220 and reformed by means of the reforming catalyst which the reformer 20 is filled.

Furthermore, the pipe 220 is disposed adjacent to a side surface 202c (the left side surface of the housing 202 in FIG. 20), different from the opposing front surface 202a and rear surface 202b pair on the housing 202 which form the exhaust gas conduit 208; by keeping the steam (pure water) in the pipe 220 hot, drops in the temperature of the steam (pure water) and reforming air prior to supply to the reformer 20 can be restrained.

A fuel gas supply pipe 64 is connected to the downstream end of the reformer 20; this fuel gas supply pipe 64 extends downward, and further extends horizontally into a manifold 66 formed at the bottom of the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

In the solid oxide fuel cell according to another embodiment of the present invention described above, because the temperature of the steam (pure water) supplied to the reformer 20 through the pipe 220 from the pure water intake pipe 212 during restart is maintained at a high level by utilizing the heat of the exhaust gas in the exhaust gas chamber 204c, temperature drops in the individual fuel cells 84 or the reformer 20 associated with the supply of steam (pure water) in ATR at the time of restart can be restrained.

Also, in the solid oxide fuel cell according to another embodiment of the present invention described above, because heat exchange from the housing 202 can be accomplished with water only on other side surface 202c due to the separation of the pipe 220 from the exhaust gas conduit 208 with respect to the housing 202, the temperature of the water supplied from the pipe 220 to the reformer 20 upon startup can be maintained at a high level.

EXPLANATION OF REFERENCE NUMERALS

1: Solid oxide fuel cell device (SOFC)
2: Fuel cell module
4: Auxiliary unit
8: Sealed space
10: Electrical generating chamber
12: Fuel cell assembly
14: Fuel cell stack
16: Fuel cell unit
18: Combustion chamber
20: Reformer
22: Heat exchanger for air
24: Water supply source
26: Pure water tank
28: Water flow regulator unit
30: Fuel supply source
38: Fuel flow regulator unit
40: Air supply source
44: Reforming air flow regulator unit
45: Generating air flow regulator unit
46: First heater
48: Second heater
50: Hot water production device
52: Control box
54: Inverter
83: Ignition device
84: Fuel cells
110: Control section
112: Operating device
114: Display device
116: Warning device
126: Electrical power state detecting sensor
142: Generating chamber temperature sensor
150: Outside air temperature sensor

What is claimed is:

1. A solid oxide fuel cell device for generating electricity by causing an electro-chemical reaction of fuel gas and oxidant gas, comprising:
solid oxide fuel cells disposed within a solid oxide fuel cell module;
a reformer for reforming fuel gas and supplying the fuel gas to the fuel cells, by executing any one of a reforming reaction POX, wherein fuel gas is partial oxidation-reformed by causing a chemical reaction between a fuel gas and an oxidizing gas in a predetermined temperature band, a reforming reaction SR, wherein fuel gas is steam reformed by chemically reacting a fuel gas and steam, and a reforming reaction ATR, wherein fuel gas is autothermally reformed by the combined use of POX and SR;
a reforming state temperature detector for detecting a reforming state temperature in order to change a reforming state induced by the reformer; and
a controller for controlling an operation of the fuel cell module;
wherein the controller has a startup control device for controlling a startup of the operation of the fuel cell module, and a stop control device for controlling a stopping of the fuel cell module;
wherein the startup control device executes a combustion operation to rise a temperature of the reformer by a combustion heat of the fuel gas when after the fuel gas is ignited and caused to combust, the reforming state temperature detected by the reforming state temperature detector is lower than a POX starting temperature at which POX starts;
the startup control device executes a normal startup POX to raise the temperature of the reformer when the reforming state temperature is equal to or greater than the POX starting temperature and within a POX temperature band below the temperature at which steam reforming is possible;
the startup control device executes a normal startup ATR to raise the temperature of the reformer when the reforming state temperature is equal to or greater than the temperature at which steam reforming is possible, and is within the ATR temperature band below a predetermined steady state temperature; and
the startup control device executes a normal startup SR to raise the temperature of the reformer when the reforming state temperature is equal to or greater than a predetermined steady-state temperature;
wherein the startup control device further executes a restart control by the ATR, skipping a normal startup POX, if stop processing by a stop control device is executed in association with stopping of the fuel cell module from a high temperature state, and a restart of operation is executed when the reforming state temperature is within the POX temperature band.

2. The solid oxide fuel cell device according to claim 1, wherein the startup control device executes the restart control by the POX when the reforming state temperature is less than a predetermined temperature within the normal startup POX temperature band, and executes the restart control by the ATR when the reforming state temperature is equal to or greater than a predetermined temperature within the POX temperature band.

3. The solid oxide fuel cell device according to claim 1, wherein at least when the reforming state temperature is within the POX temperature band, the startup control device executes the restart control by the ATR rather than the POX used in normal startup, and at least a portion of the ATR executed in the restart control differs from the ATR at the normal startup.

4. The solid oxide fuel cell device according to claim 2, wherein at least when the reforming state temperature is within the POX temperature band, the startup control device executes the restart control by the ATR rather than the POX used in normal startup, and at least a portion of the ATR executed in the restart control differs from ATR at the normal startup.

5. The solid oxide fuel cell device according to claim 3, wherein the ATR executed by the restart control device increases the amount of fuel gas supplied compared to the ATR during the normal startup.

6. The solid oxide fuel cell device according to claim 3, wherein the ATR executed in the restart control increases the amount of oxidant gas supplied compared to ATR during the normal startup.

7. The solid oxide fuel cell device according to claim 3, wherein the ATR executed in the restart control decreases the amount of water supplied compared to ATR during the normal startup.

8. The solid oxide fuel cell device according to claim 3, wherein the ATR executed in the restart control is changed to the normal startup ATR at the point when the reforming state temperature rises to or above a predetermined temperature.

9. The solid oxide fuel cell device according to claim 3, wherein the startup control device executes the restart control by the ATR maintaining a predetermined fixed amount of fuel gas supply, oxidant gas supply, and water supply without variation.

10. The solid oxide fuel cell device according to claim 3, wherein the startup control device executes the restart control by a first ATR in the normal startup POX temperature band and a second ATR in the normal startup ATR temperature band, and the first ATR executed in the restart control reduces the amount of water supplied compared to the second ATR.

11. The solid oxide fuel cell device according to claim 9, wherein the ATR executed in the restart control is constituted so that the amount of oxidant gas supplied in the initial period is greater than the amount of oxidant gas supplied in the later period.

12. The solid oxide fuel cell device according to claim 1, wherein the solid oxide fuel cell device further comprises an oxidant gas heating device for heating the oxidant gas supplied from the oxidant gas supply device to the reformer, and the startup control device executes the restart control by the ATR setting the heating temperature at which the oxidant gas heating device heats the oxidant gas to be higher than the normal startup ATR.

13. The solid oxide fuel cell device according to claim 1, wherein the solid oxide fuel cell device further comprises a water supply device for producing pure water and supplying the pure water to the reformer, and the water supply device has a water pipe for introducing water to the reformer and a warming device for keeping the water pipe warm.

14. The solid oxide fuel cell device according to claim 13, wherein the solid oxide fuel cell device further comprises a cell assembly support device for supporting the lower portion of a cell assembly having a plurality of individual fuel cells, and for forming an exhaust gas chamber into which exhaust gas produced by the combustion of fuel gas and oxidant gas is discharged, and the warming device restrains temperature drops of the water supplied to the reformer by disposing the water pipe so that the water pipe passes through the exhaust gas chamber.

15. The solid oxide fuel cell device according to claim 14, wherein the solid oxide fuel cell device further comprises a housing member for containing the cell assembly, and an exhaust gas conduit for communicating with the exhaust gas chamber is disposed on the pair of opposing sides forming the housing member, and the water pipe conduit is disposed on the other side thereof.

16. A solid oxide fuel cell device for generating electricity by causing an electro-chemical reaction of fuel gas and oxidant gas, comprising:
   solid oxide fuel cells disposed within a solid oxide fuel cell module;
   means for reforming fuel gas and supplying the fuel gas to the fuel cells, by executing any one of a reforming reaction POX in a predetermined temperature band, wherein fuel gas is partial oxidation-reformed by causing a chemical reaction between a fuel gas and an oxidizing gas, a reforming reaction SR, wherein fuel gas is steam reformed by chemically reacting a fuel gas and steam, and a reforming reaction ATR, wherein fuel gas is autothermally reformed by the combined use of POX and SR;
   means for detecting a reforming state temperature in order to change a reforming state induced by the reforming means; and
   means for controlling a operation of the fuel cell module;
   wherein the controlling means has means for controlling a startup of the operation of the fuel cell module, and means for controlling a stopping of the fuel cell module;
   wherein the startup control means executes a combustion operation to rise a temperature of the reformer by a combustion heat of the fuel gas when after the fuel gas is ignited and caused to combust, the reforming state temperature detected by the reforming state temperature detecting means is lower than the POX starting temperature at which POX starts;
   the startup control means executes a normal startup POX to raise the temperature of the reforming means when the reforming state temperature is equal to or greater than a POX starting temperature and within a POX temperature band below a temperature at which steam reforming is possible;
   the startup control means executes a normal startup ATR to raise the temperature of the reformer when the reforming state temperature is equal to or greater than the temperature at which steam reforming is possible, and is within the ATR temperature band below a predetermined steady state temperature; and
   the startup control means executes a normal startup SR to raise the temperature of the reforming means when the reforming state temperature is equal to or greater than a predetermined steady-state temperature;
   wherein the startup control means further executes a restart control by the ATR, skipping the normal startup POX, if stop processing by a stop control means steady state temperature is executed in association with stopping of the fuel cell module from a high temperature state, and a restart of operation is executed when the reforming state temperature is within the POX temperature band.

\* \* \* \* \*